United States Patent
McKenzie et al.

(10) Patent No.: US 10,254,923 B2
(45) Date of Patent: Apr. 9, 2019

(54) GROUPING OF CARDS BY TIME PERIODS AND CONTENT TYPES

(71) Applicant: Google LLC, Mountain View, CA (US)

(72) Inventors: Chris McKenzie, Brooklyn, CA (US); Antonio Bernardo Monteiro Costa, San Francisco, CA (US); Richard Dennis The, New York, NY (US)

(73) Assignee: Google LLC, Mountain View, CA (US)

(*) Notice: Subject to any disclaimer, the term of this patent is extended or adjusted under 35 U.S.C. 154(b) by 537 days.

(21) Appl. No.: 14/975,668

(22) Filed: Dec. 18, 2015

(65) Prior Publication Data

US 2016/0188536 A1 Jun. 30, 2016

Related U.S. Application Data

(63) Continuation of application No. 13/861,217, filed on Apr. 11, 2013, now Pat. No. 9,250,769.

(Continued)

(51) Int. Cl.

| | |
|---|---|
| *G06F 3/14* | (2006.01) |
| *G06F 3/0482* | (2013.01) |
| *G06F 3/0484* | (2013.01) |
| *G06T 11/20* | (2006.01) |
| *G06F 3/0483* | (2013.01) |
| *G02B 27/01* | (2006.01) |
| *G06F 17/21* | (2006.01) |

(52) U.S. Cl.
CPC ....... *G06F 3/0482* (2013.01); *G02B 27/0172* (2013.01); *G06F 3/0483* (2013.01); *G06F 3/0484* (2013.01); *G06F 17/211* (2013.01); *G06T 11/206* (2013.01); *G02B 2027/0141* (2013.01); *G06F 2203/04806* (2013.01)

(58) Field of Classification Search
CPC ..................................... G06F 3/14; G06F 3/17
USPC .............................. 715/772; 345/8; 705/319
See application file for complete search history.

(56) References Cited

U.S. PATENT DOCUMENTS

| | | |
|---|---|---|
| 6,768,999 B2 | 7/2004 | Prager et al. |
| 6,785,667 B2 | 8/2004 | Orbanes |

(Continued)

OTHER PUBLICATIONS

International Searching Authority, International Search Report and Written Opinion dated Mar. 25, 2014, issued in connection with International Patent Application No. PCT/US2013/063582, filed on Oct. 4, 2013, 9 pages.

*Primary Examiner* — Ruay Ho
(74) *Attorney, Agent, or Firm* — McDonnell Boehnen Hulbert & Berghoff LLP

(57) ABSTRACT

Methods, apparatus, and computer-readable media are described herein related to a user interface (UI) for a computing device, such as head-mountable device (HMD). The UI allows a user of the HMD to navigate through a timeline of ordered screens or cards shown on the graphic display of the HMD. The cards on the timeline may be chronologically ordered based on times associated with each card. Numerous cards may be added to the timeline such that a user may scroll through the timeline to search for a specific card. The HMD may be configured to group cards on the timeline. The cards may be grouped by multiple time periods and by various content types within each respective time period. The cards may also be grouped based on durations between the present/on-going time period and each respective time period.

21 Claims, 30 Drawing Sheets

Related U.S. Application Data

(60) Provisional application No. 61/710,543, filed on Oct. 5, 2012.

(56) References Cited

U.S. PATENT DOCUMENTS

| | | |
|---|---|---|
| 8,099,680 B1 | 1/2012 | Kolde et al. |
| 8,160,400 B2 | 4/2012 | Snavely |
| 8,306,982 B2 | 11/2012 | Audet |
| 2005/0102634 A1 | 5/2005 | Sloo |
| 2005/0268237 A1 | 12/2005 | Crane et al. |
| 2006/0161868 A1 | 7/2006 | Van Dok et al. |
| 2010/0293105 A1* | 11/2010 | Blinn .................... G06Q 10/10 705/319 |
| 2012/0218303 A1 | 2/2012 | Nakada |
| 2013/0147686 A1* | 6/2013 | Clavin .................... G06F 3/013 345/8 |

* cited by examiner

Multi-Tiered User Model 400

Basic

| | |
|---|---|
| Tap | = Select |
| Swipe forward/away | = Choose next |
| Swipe backward/toward | = Choose previous |
| Swipe down | = Back/Home/Sleep |
| | |
| Voice | = Access voice menu |
| Camera button press | = Take a photo |

Intermediate

| | |
|---|---|
| Tap | = Select |
| Swipe forward/away | = Choose next |
| Swipe backward/toward | = Choose previous |
| Swipe down | = Back/Home/Sleep |
| | |
| Voice | = Access voice menu |
| Camera button press | = Take a photo |
| Camera button long press | = Capture menu |
| | |
| Two finger swipe forward/away | = Z-axis move away |
| Two finger swipe backward/toward | = Z-axis move toward |
| Two finger swipe down | = Sleep |

Advanced

| | |
|---|---|
| Tap | = Select |
| Swipe forward/away | = Choose next |
| Swipe backward/toward | = Choose previous |
| Swipe down | = Back/Home/Sleep |
| | |
| Voice | = Access to voice menu |
| Camera button press | = Take a photo |
| Camera button long press | = Capture menu |
| | |
| Two finger swipe forward/away | = Z-axis move away |
| Two finger swipe backward/toward | = Z-axis move toward |
| Two finger swipe down | = Sleep |
| | |
| Two finger press and hold | = The clutch |
| | |
| Nudge | = HMD wake / sleep |

FIG. 4

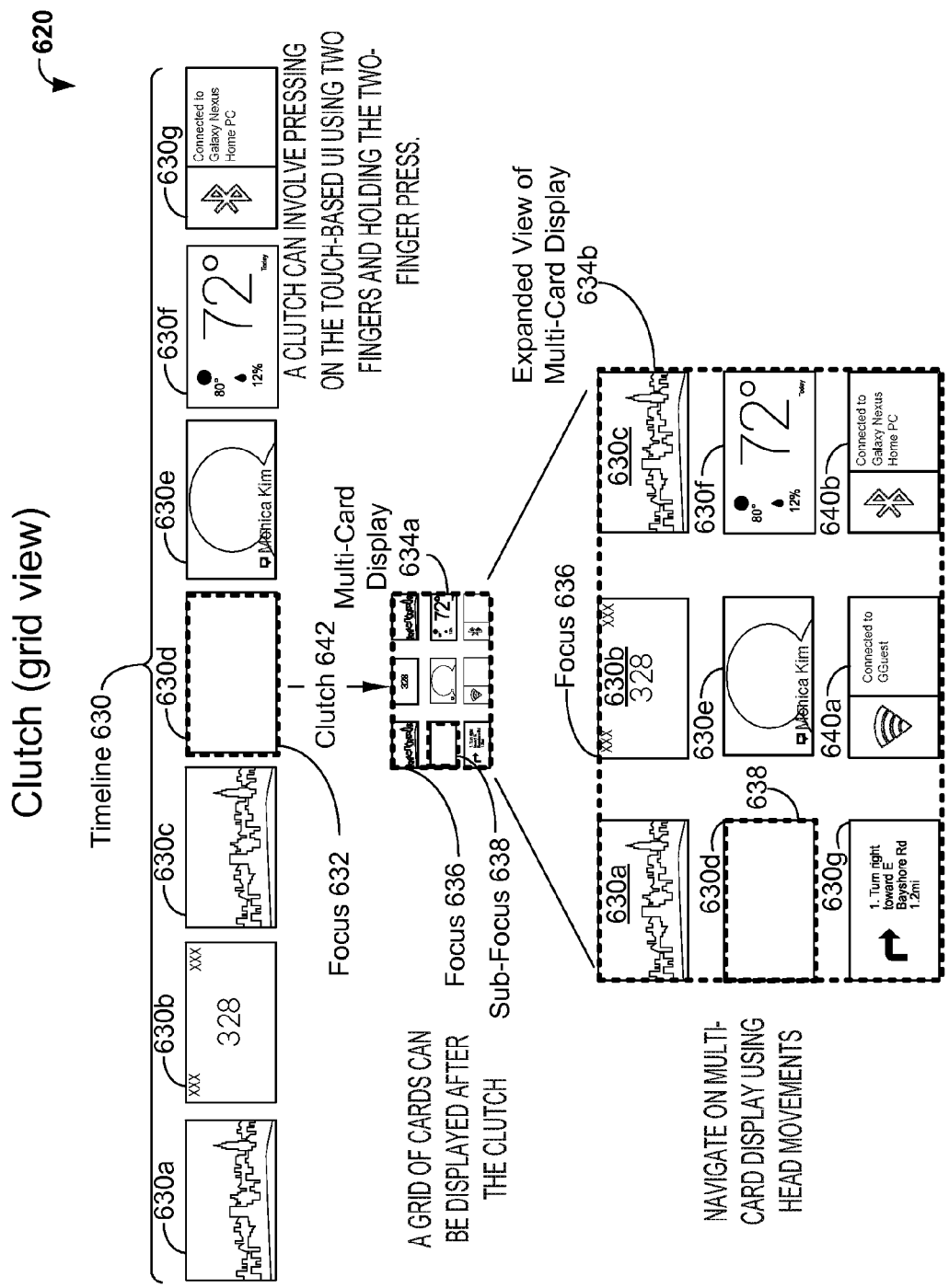

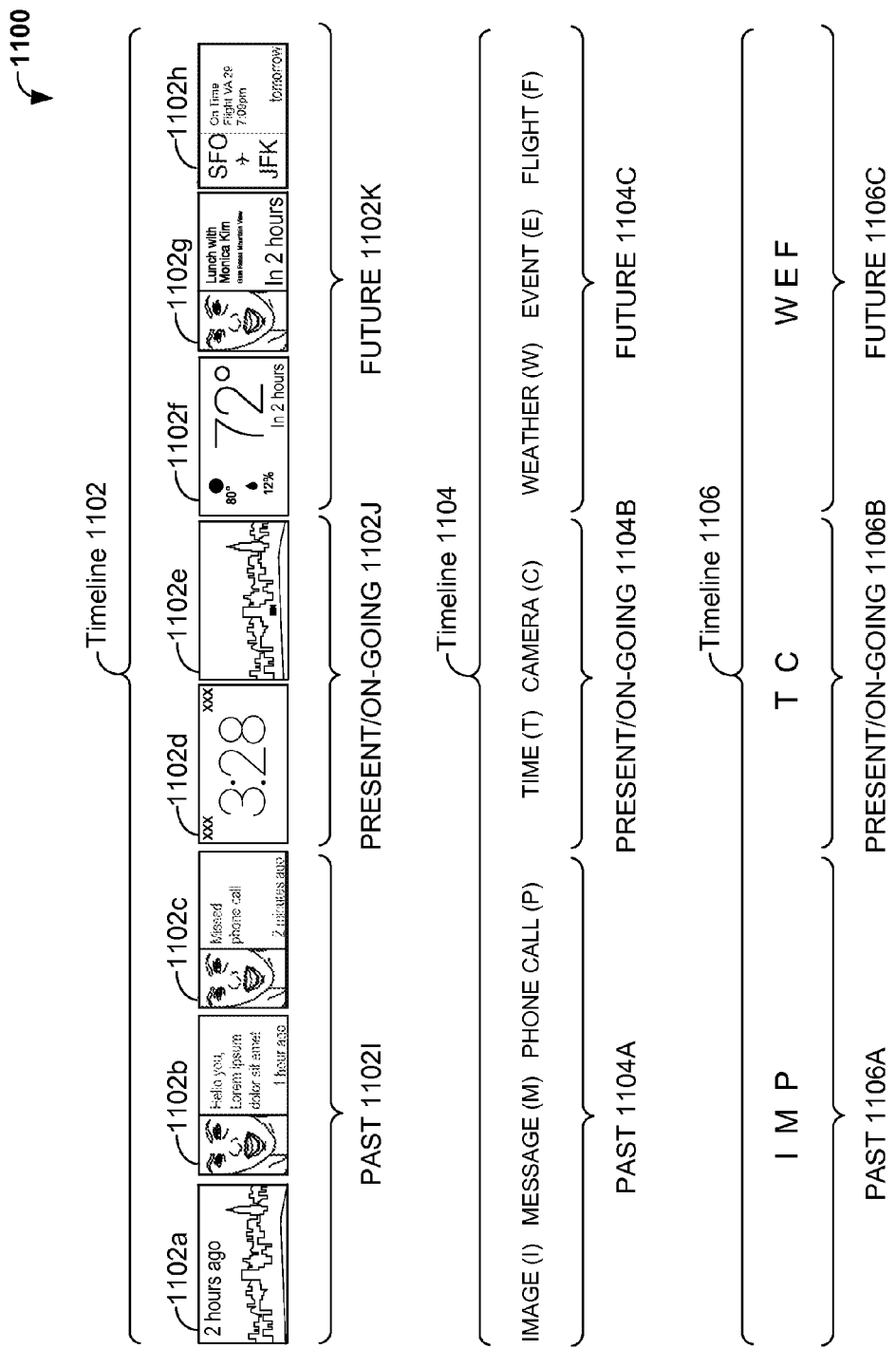

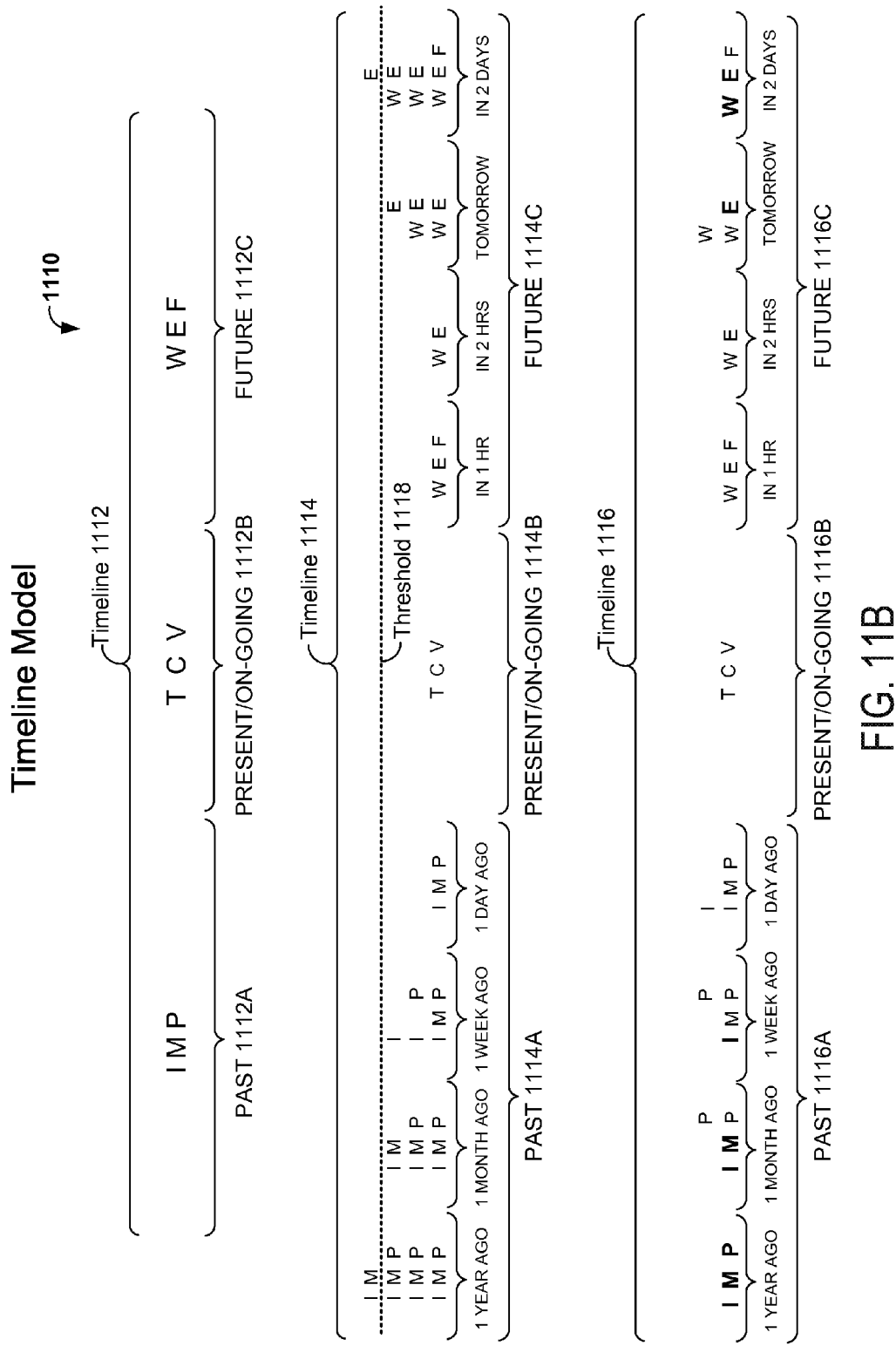

PRESENT/ON-GOING 1122

YESTERDAY / TOMORROW 1124

LAST WEEK / NEXT WEEK 1126

LAST MONTH / NEXT MONTH 1128

FIG. 11C

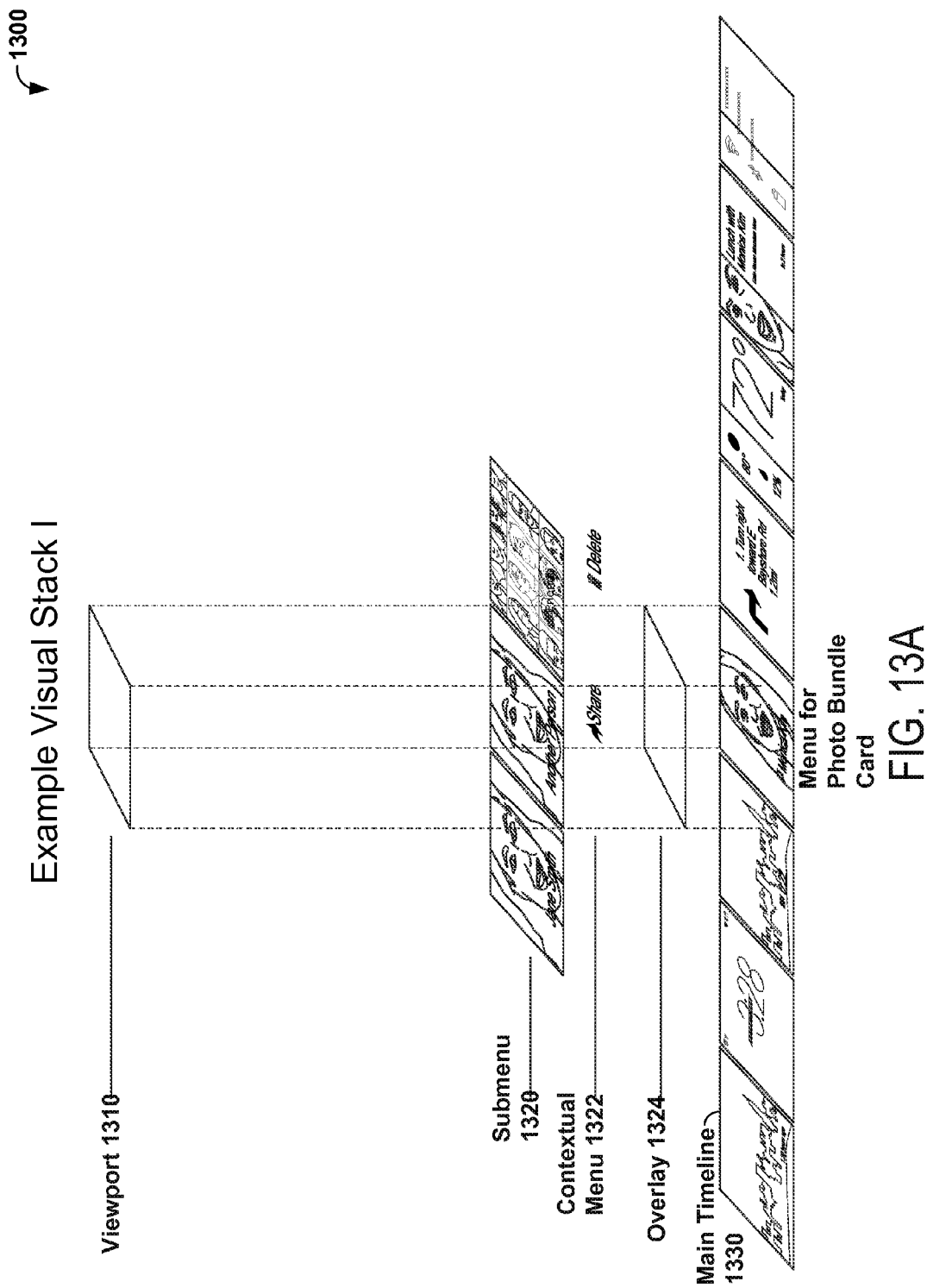

GROUPING OF CARDS BY TIME PERIODS AND CONTENT TYPES

CROSS-REFERENCE TO RELATED APPLICATIONS

This application claims priority to U.S. Patent App. No. 61/710,543, entitled "User Interfaces for Head-Mountable Devices," filed on Oct. 5, 2012, the contents of which are fully incorporated by referenced herein for all purposes.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

SUMMARY

An example a computing device with a graphic display may include a timeline feature that allows a user to navigate through a sequence of ordered screens or "cards" shown on the graphic display. The cards may be ordered based on times when each card was created on the timeline of cards. For example, cards may be chronologically ordered based on the times each card was added to the timeline and displayed side-by-side on the graphic display from left to right. In some instances, an example head-mountable display (HMD) with the timeline feature may allow a wearer to focus on a single card at any given time, possibly similar to a slide show. Further, the wearer may scroll or browse through the timeline of cards to search for a specific card. As cards are continuously added to the timeline, numerous cards may accumulate over a period of time. Accordingly, the HMD may be configured to group cards on the timeline. In some embodiments, the cards may be grouped into time-based groups, possibly representing multiple periods of time. In some instances, the cards may also be grouped by content or by content type. Further, the cards may be grouped by multiple time periods and by content types within each respective time period. Yet further, the cards may be grouped based on durations between the present/on-going time period and each respective time period. As such, various embodiments for grouping cards on a timeline may be employed.

In one aspect, a computer-implemented method may involve (a) generating, by a computing device, one or more time-stamped bundle cards that correspond to a group of cards from a plurality of time-stamped cards, and (b) displaying a user interface for navigation of a chronologically sorted timeline of cards that spans at least a current time period and a first time period, where the timeline includes the one or more time-stamped bundle cards and one or more non-bundle cards from the plurality of time-stamped cards, and where a frequency of bundle cards in the first time period is greater than a frequency of bundle cards in the current time period.

In another aspect, a computing device may include a processor and a non-transitory computer-readable medium. The non-transitory computer-readable medium may be configured to store program instructions that are executable by the processor to cause the computing device to carry out functions including: (a) generating one or more time-stamped bundle cards that correspond to a group of cards from a plurality of time-stamped cards, and (b) displaying a user interface for navigation of a chronologically sorted timeline of cards that spans at least a current time period and a first time period, where the timeline includes the one or more time-stamped bundle cards and one or more non-bundle cards from the plurality of time-stamped cards, and where a frequency of bundle cards in the first time period is greater than a frequency of bundle cards in the current time period.

In yet another aspect, a non-transitory computer readable medium may include program instructions that are executable by a processor of a computing device to cause the computing device to carry out functions including: (a) generating one or more time-stamped bundle cards that correspond to a group of cards from a plurality of time-stamped cards, and (b) displaying a user interface for navigation of a chronologically sorted timeline of cards that spans at least a current time period and a first time period, where the timeline includes the one or more time-stamped bundle cards and one or more non-bundle cards from the plurality of time-stamped cards, and where a frequency of bundle cards in the first time period is greater than a frequency of bundle cards in the current time period.

In a further aspect, a system may include: (a) a means for generating one or more time-stamped bundle cards that correspond to a group of cards from a plurality of time-stamped cards, and (b) a means for displaying a user interface for navigation of a chronologically sorted timeline of cards that spans at least a current time period and a first time period, where the timeline includes the one or more time-stamped bundle cards and one or more non-bundle cards from the plurality of time-stamped cards, and where a frequency of bundle cards in the first time period is greater than a frequency of bundle cards in the current time period.

In yet a further aspect, a computer-implemented method may involve: (a) determining, by a computing device, a plurality of time-stamped cards including one or more cards in a current time period and one or more cards in a first time period, (b) determining respective bundling thresholds for the current time period and the first time period, where a frequency of time-stamped bundle cards in the first time period is greater than a frequency of time-stamped bundle cards in the current time period, (c) bundling cards of at least one group from the plurality of time-stamped cards into at least one time-stamped bundle card, and (d) displaying a chronologically sorted timeline of cards that spans at least the current time period and the first time period, where the timeline includes at least one time-stamped bundle card and at least one time-stamped non-bundle card from the plurality of time-stamped cards.

In another aspect, a non-transitory computer readable medium may include program instructions that are executable by a processor of a computing device to cause the computing device to carry out functions including: (a) determining a plurality of time-stamped cards including one or more cards in a current time period and one or more cards in a first time period, (b) determining respective bundling thresholds for the current time period and the first time period, where a frequency of time-stamped bundle cards in the first time period is greater than a frequency of time-stamped bundle cards in the current time period, (c) bundling cards of at least one group from the plurality of time-stamped cards into at least one time-stamped bundle card, and (d) displaying a chronologically sorted timeline of cards that spans at least the current time period and the first time period, where the timeline includes at least one time-stamped bundle card and at least one time-stamped non-bundle card from the plurality of time-stamped cards.

In yet a another aspect, a system may include: (a) a means for determining a plurality of time-stamped cards including one or more cards in a current time period and one or more cards in a first time period, (b) a means for determining respective bundling thresholds for the current time period and the first time period, where a frequency of time-stamped bundle cards in the first time period is greater than a frequency of time-stamped bundle cards in the current time period, (c) a means for bundling cards of at least one group from the plurality of time-stamped cards into at least one time-stamped bundle card, and (d) a means for displaying a chronologically sorted timeline of cards that spans at least the current time period and the first time period, where the timeline includes at least one time-stamped bundle card and at least one time-stamped non-bundle card from the plurality of time-stamped cards.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 shows example operations of a multi-tiered user model for a user interface for a head-mountable device (HMD), according to an example embodiment.

FIG. 6B shows a scenario for using a clutch operation to generate a multi-card display, according to an example embodiment.

FIG. 11A shows a scenario with cards grouped on a timeline, according to an example embodiment.

FIG. 11B shows a scenario with cards grouped by bundling cards, according to an example embodiment.

FIG. 11C shows data capacity of a timeline, according to an example embodiment.

FIG. 13A shows an example visual stack, according to an example embodiment.

DETAILED DESCRIPTION

Figure 1A:
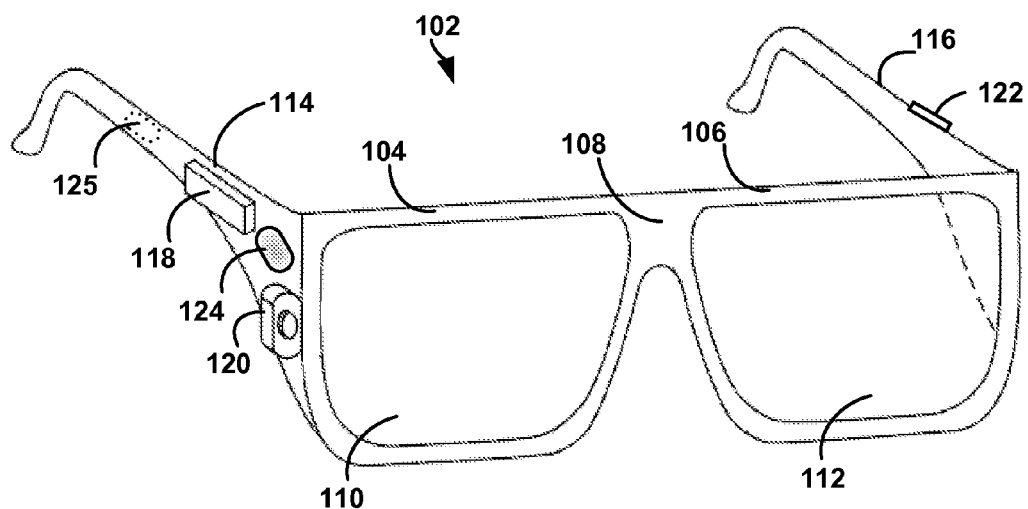
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments can be utilized, and other changes can be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. OVERVIEW

In an example embodiment, a UI for an HMD can include a timeline feature that allows the wearer to navigate through a sequence of ordered screens. In the context of such a timeline feature, each screen can be referred to as a "card." Among the sequence of cards, one or more cards can be displayed, and of the displayed card(s), one card can be "focused on" for possible selection. For example, the timeline can present one card for display at a time, and the card being displayed can also be the card focused on. In one embodiment, when a card is selected, the card can be displayed using a single-card view that occupies substantially all of the viewing area of the display.

Each card can be associated with a certain application, object, or operation. The cards can be ordered by a time associated with the card, application, object, or operation represented by the card. For example, if a card shows a photo captured by a wearer of the HMD at 2:57 PM, the time associated with the card is the time associated with the underlying photo object of 2:57 PM. As another example, a card representing a weather application can continuously update temperature, forecast, wind, and other weather-related information. As such, the time associated with the weather application can be the present time. As an additional example, a card representing a calendar application can show an appointment in 2 hours from now, and so the time associated with the card can be a time corresponding to the displayed appointment, or 2 hours in the future.

The timeline feature can allow the wearer to navigate through the cards according to their associated times. For example, a wearer could move their head to the left to navigate to cards with times prior to a time associated with the focused-on card, and to the right to navigate to cards with times after the time associated with the focused-on card. As another example, the wearer can use a touch pad or similar device as part of a touch-based UI to make a swiping motion in one direction on the touch-based UI to navigate to cards with times prior to the time associated with the focused-on card, and make a swiping motion in another direction to navigate to cards with times after the time associated with the focused-on card.

Upon power up, the HMD can display a "home card," also referred to as a home screen. The home card can display a clock, and be associated with a time of "now" or a present time. In some cases, the home card can display a clock, to reinforce the association between the home card and now. Then, cards associated with times before now can be viewed in the timeline as prior to the home card, and cards associated with times equal to or after now can be viewed in the timeline subsequent to the home card.

After viewing cards on the timeline, the wearer can choose to interact with some cards. To select a card on the timeline for interaction, the wearer can tap on the touch-based UI, also referred to as performing a "tap operation," to select the focused-on card for interaction. In some cases, a "contextual menu" can be used to interact with the selected card. For example, if the selected focused-on card shows a photo or an image captured by the HMD, the contextual menu can provide one or more options or operations for interacting with the selected photo, such as sharing the image with one or more people, or deleting the photo.

Different contextual menus can be used for different objects. For example, a contextual object for a contact or representation of information about a person can have options or operations such as call the contact, send a message to the contact, delete the contact, or review/update contact details such as telephone numbers, e-mail addresses, display names, etc.

Lists of some objects can be arranged by a different order other than the time-based order used by the timeline. For example, a list of contacts can be arranged by frequency of contact; e.g., a contact for the person most-communicated-with using the HMD can be displayed first in a list of contacts, the second-most-communicated-with contact can be displayed second in the list, and so on. Other orderings are possible as well.

A group of cards that share a relationship can be grouped into a "bundle," a "stack," and/or a "deck" of cards. The terms group of cards, bundle of cards, stack of cards, and deck of cards may be used interchangeably herein. A group of cards can include any cards that can be considered to be related for a certain purpose, related based on criteria, and/or a related combination of criteria. For example, a collection of photos captured within a certain span of time can be represented as a photo bundle. As another example, a collection of messages (e.g. an instant messaging session, SMS/text-message exchange, or e-mail chain) can be represented as a message group. A bundle card can be constructed for display on the timeline that represents the bundle or group of cards and, in some cases, summarizes the bundle or group; e.g., shows thumbnail photos of photos in a photo bundle or a photo group. In some cases, data related to the card can be used to track relationship(s) used to create bundles or groups, e.g., a location associated with a card, an indication that the card is a photo, message, or other kind of card, a name of an application that created the card, etc.

By organizing objects, applications, and operations into cards, the UI can provide a relatively simple interface to a large collection of possible data sources. Further, by enabling operation on a collection of cards arranged in a natural fashion—according to time in one example—the wearer can readily locate and then utilize cards stored by the HMD.

B. EXAMPLE WEARABLE COMPUTING DEVICES

Systems and devices in which example embodiments can be implemented will now be described in greater detail. In general, an example system can be implemented in or can take the form of a wearable computer (also referred to as a wearable computing device). In an example embodiment, a wearable computer takes the form of or includes a head-mountable device (HMD).

An example system can also be implemented in or take the form of other devices, such as a mobile phone, among other possibilities. Further, an example system can take the form of non-transitory computer readable medium, which has program instructions stored thereon that are executable by a processor to provide the functionality described herein. An example system can also take the form of a device such as a wearable computer or mobile phone, or a subsystem of such a device, which includes such a non-transitory computer readable medium having such program instructions stored thereon.

An HMD can generally be any display device that is capable of being worn on the head and places a display in front of one or both eyes of the wearer. An HMD can take various forms such as a helmet or eyeglasses. As such, references to "eyeglasses" or a "glasses-style" HMD should be understood to refer to an HMD that has a glasses-like frame so that it can be worn on the head. Further, example embodiments can be implemented by or in association with an HMD with a single display or with two displays, which can be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which can also be referred to as a head-mounted display). It should be understood, however, that example systems and devices can take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 can be formed of a solid structure of plastic and/or metal, or can be formed of a hollow structure of similar material so as to allow wiring and component interconnects to be internally routed through the HMD 102. Other materials can be possible as well.

One or more of each of the lens elements 110, 112 can be formed of any material that can suitably display a projected image or graphic. Each of the lens elements 110, 112 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 114, 116 can each be projections that extend away from the lens-frames 104, 106, respectively, and can be positioned behind a user's ears to secure the HMD 102 to the user. The extending side-arms 114, 116 can further secure the HMD 102 to the user by extending around a rear portion of the user's head. Additionally or alternatively, for example, the HMD 102 can connect to or be affixed within a head-mounted helmet structure. Other configurations for an HMD are also possible.

The HMD 102 can also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 can be provided on other parts of the HMD 102 or can be remotely positioned from the HMD 102 (e.g., the on-board computing system 118 could be wire- or wirelessly-connected to the HMD 102). The on-board computing system 118 can include a processor and memory, for example. The on-board computing system 118 can be configured to receive and analyze data from the image capture device 120 and the finger-operable touch pad 124 (and possibly from other sensory devices, user interfaces, or both) and generate images for output by the lens elements 110 and 112.

The image capture device 120 can be, for example, a camera that is configured to capture still images and/or to capture video. In the illustrated configuration, image capture device 120 is positioned on the extending side-arm 114 of the HMD 102; however, the image capture device 120 can be provided on other parts of the HMD 102. The image capture device 120 can be configured to capture images at various resolutions or at different frame rates. Many image capture devices with a small form-factor, such as the cameras used in mobile phones or webcams, for example, can be incorporated into an example of the HMD 102.

Further, although FIG. 1A illustrates one image capture device 120, more image capture devices can be used, and each can be configured to capture the same view, or to capture different views. For example, the image capture device 120 can be forward facing to capture at least a portion of the real-world view perceived by the user. This forward facing image captured by the image capture device 120 can then be used to generate an augmented reality where computer generated images appear to interact with or overlay the real-world view perceived by the user.

The sensor 122 is shown on the extending side-arm 116 of the HMD 102; however, the sensor 122 can be positioned on other parts of the HMD 102. For illustrative purposes, only one sensor 122 is shown. However, in an example embodiment, the HMD 102 can include multiple sensors. For example, an HMD 102 can include sensors 102 such as one or more gyroscopes, one or more accelerometers, one or more magnetometers, one or more light sensors, one or more infrared sensors, and/or one or more microphones. Other sensing devices can be included in addition or in the alternative to the sensors that are specifically identified herein.

The finger-operable touch pad 124 is shown on the extending side-arm 114 of the HMD 102. However, the finger-operable touch pad 124 can be positioned on other parts of the HMD 102. Also, more than one finger-operable touch pad can be present on the HMD 102. The finger-operable touch pad 124 can be used by a user to input commands. The finger-operable touch pad 124 can sense at least one of a pressure, position and/or a movement of one or more fingers via capacitive sensing, resistance sensing, or a surface acoustic wave process, among other possibilities. The finger-operable touch pad 124 can be capable of sensing movement of one or more fingers simultaneously, in addition to sensing movement in a direction parallel or planar to the pad surface, in a direction normal to the pad surface, or both, and can also be capable of sensing a level of pressure applied to the touch pad surface. In some embodiments, the finger-operable touch pad 124 can be formed of one or more translucent or transparent insulating layers and one or more translucent or transparent conducting layers. Edges of the finger-operable touch pad 124 can be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad can be operated independently, and can provide a different function.

In a further aspect, HMD 102 can be configured to receive user input in various ways, in addition or in the alternative to user input received via finger-operable touch pad 124. For example, on-board computing system 118 can implement a speech-to-text process and utilize a syntax that maps certain spoken commands to certain actions. In addition, HMD 102 can include one or more microphones via which a wearer's speech can be captured. Configured as such, HMD 102 can be operable to detect spoken commands and carry out various computing functions that correspond to the spoken commands.

As another example, HMD 102 can interpret certain head-movements as user input. For example, when HMD 102 is worn, HMD 102 can use one or more gyroscopes and/or one or more accelerometers to detect head movement. The HMD 102 can then interpret certain head-movements as being user input, such as nodding, or looking up, down, left, or right. An HMD 102 could also pan or scroll through graphics in a display according to movement. Other types of actions can also be mapped to head movement.

As yet another example, HMD 102 can interpret certain gestures (e.g., by a wearer's hand or hands) as user input. For example, HMD 102 can capture hand movements by analyzing image data from image capture device 120, and initiate actions that are defined as corresponding to certain hand movements.

As a further example, HMD 102 can interpret eye movement as user input. In particular, HMD 102 can include one or more inward-facing image capture devices and/or one or more other inward-facing sensors (not shown) that can be used to track eye movements and/or determine the direction of a wearer's gaze. As such, certain eye movements can be mapped to certain actions. For example, certain actions can be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 can be, for example, a vibration transducer or an electroacoustic transducer that produces sound in response to an electrical audio signal input. The frame of HMD 102 can be designed such that when a user wears HMD 102, the speaker 125 contacts the wearer. Alternatively, speaker 125 can be embedded within the frame of HMD 102 and positioned such that, when the HMD 102 is worn, speaker 125 vibrates a portion of the frame that contacts the wearer. In either case, HMD 102 can be configured to send an audio signal to speaker 125, so that vibration of the speaker can be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) can be implemented, depending upon the particular implementation. Generally, any component that is arranged to vibrate the HMD 102 can be incorporated as a vibration transducer. Yet further it should be understood that an HMD 102 can include a single speaker 125 or multiple speakers. In addition, the location(s) of speaker(s) on the HMD can vary, depending upon the implementation. For example, a speaker can be located proximate to a wearer's temple (as shown), behind the wearer's ear, proximate to the wearer's nose, and/or at any other location where the speaker 125 can vibrate the wearer's bone structure.

Figure 1B:
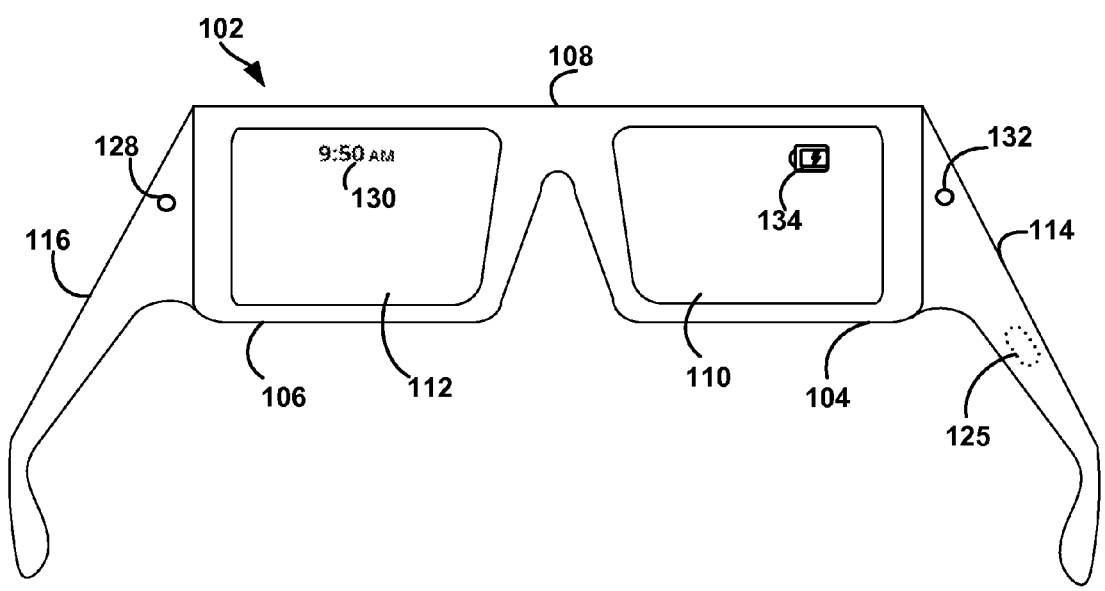
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 can act as display elements. The HMD 102 can include a first projector 128 coupled to an inside surface of the extending side-arm 116 and configured to project a display 130 onto an inside surface of the lens element 112. Additionally or alternatively, a second projector 132 can be coupled to an inside surface of the extending side-arm 114 and configured to project a display 134 onto an inside surface of the lens element 110.

The lens elements 110, 112 can act as a combiner in a light projection system and can include a coating that reflects the light projected onto them from the projectors 128, 132. In some embodiments, a reflective coating may not be used (e.g., when the projectors 128, 132 are scanning laser devices).

In alternative embodiments, other types of display elements can also be used. For example, the lens elements 110, 112 themselves can include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver can be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
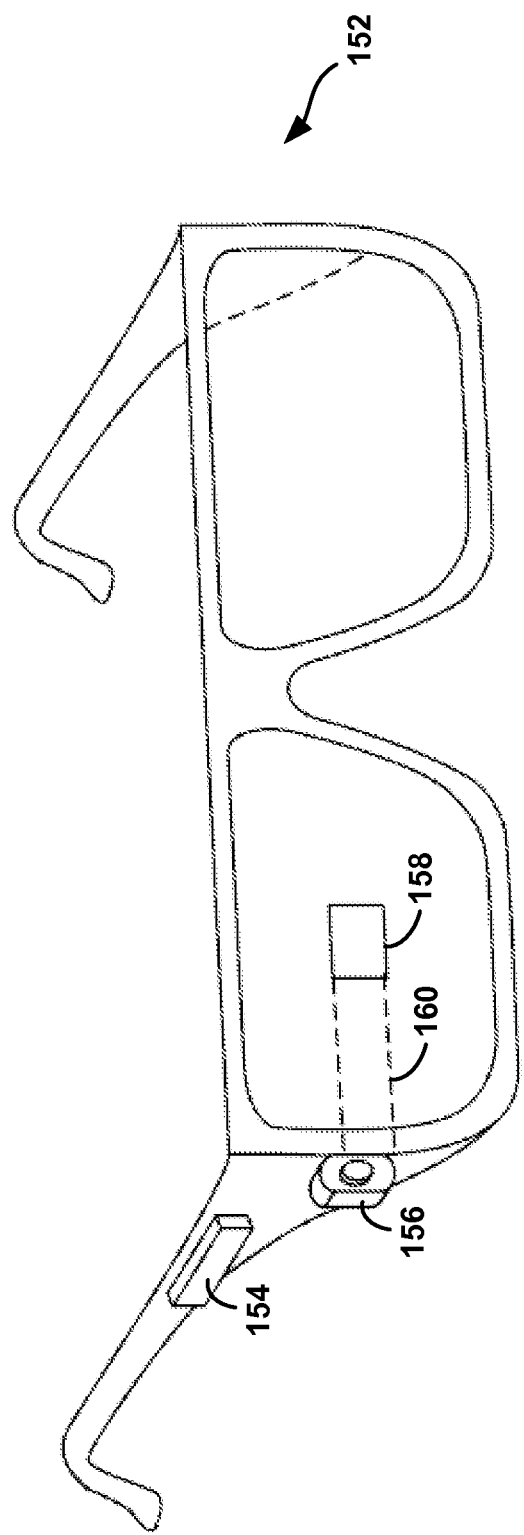
FIG. 1C illustrates another wearable computing system according to an example embodiment.

FIG. 1C illustrates another wearable computing system according to an example embodiment, which takes the form of an HMD 152. The HMD 152 can include frame elements and side-arms such as those described with respect to FIGS. 1A and 1B. The HMD 152 can additionally include an on-board computing system 154 and an image capture device 156, such as those described with respect to FIGS. 1A and 1B. The image capture device 156 is shown mounted on a frame of the HMD 152. However, the image capture device 156 can be mounted at other positions as well.

As shown in FIG. 1C, the HMD 152 can include a single display 158 which can be coupled to the device. The display 158 can be formed on one of the lens elements of the HMD 152, such as a lens element described with respect to FIGS. 1A and 1B, and can be configured to overlay computer-generated graphics in the user's view of the physical world. The display 158 is shown to be provided in a center of a lens of the HMD 152, however, the display 158 can be provided in other positions, such as for example towards either the upper or lower portions of the wearer's field of view. The display 158 is controllable via the computing system 154 that is coupled to the display 158 via an optical waveguide 160.

Figure 1D:
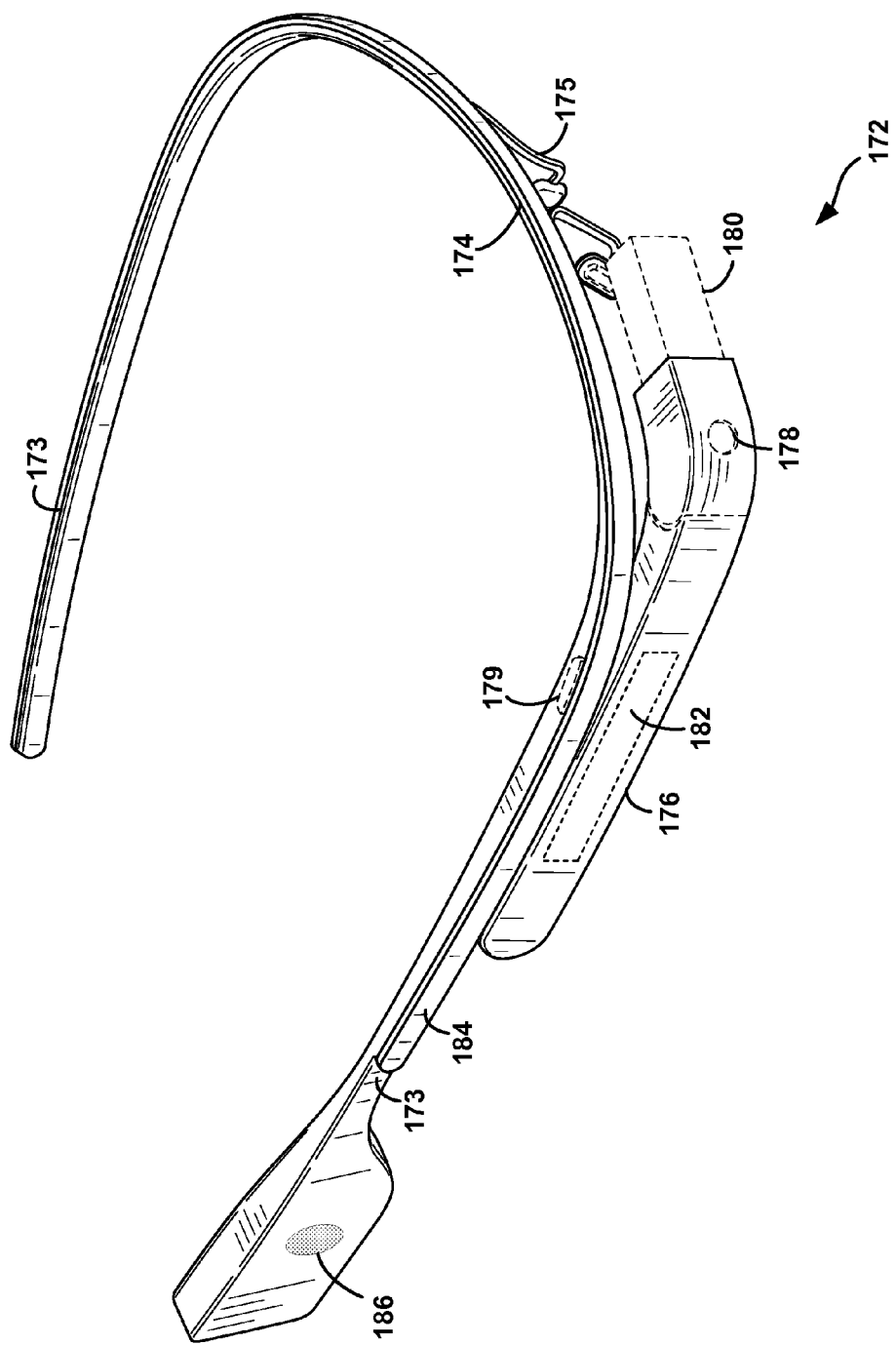
FIG. 1D illustrates another wearable computing system according to an example embodiment.

FIG. 1D illustrates another wearable computing system according to an example embodiment, which takes the form of a monocular HMD 172. The HMD 172 can include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 can additionally include a component housing 176, which can include an on-board computing system (not shown), an image capture device 178, and a button 179 for operating the image capture device 178 (and/or usable for other purposes). Component housing 176 can also include other electrical components and/or can be electrically connected to electrical components at other locations within or on the HMD. HMD 172 also includes a BCT 186.

The HMD 172 can include a single display 180, which can be coupled to one of the side-arms 173 via the component housing 176. In an example embodiment, the display 180 can be a see-through display, which is made of glass and/or another transparent or translucent material, such that the wearer can see their environment through the display 180. Further, the component housing 176 can include the light sources (not shown) for the display 180 and/or optical elements (not shown) to direct light from the light sources to the display 180. As such, display 180 can include optical features that direct light that is generated by such light sources towards the wearer's eye, when HMD 172 is being worn.

In a further aspect, HMD 172 can include a sliding feature 184, which can be used to adjust the length of the side-arms 173. Thus, sliding feature 184 can be used to adjust the fit of HMD 172. Further, an HMD can include other features that allow a wearer to adjust the fit of the HMD, without departing from the scope of the invention.

Figure 1E:
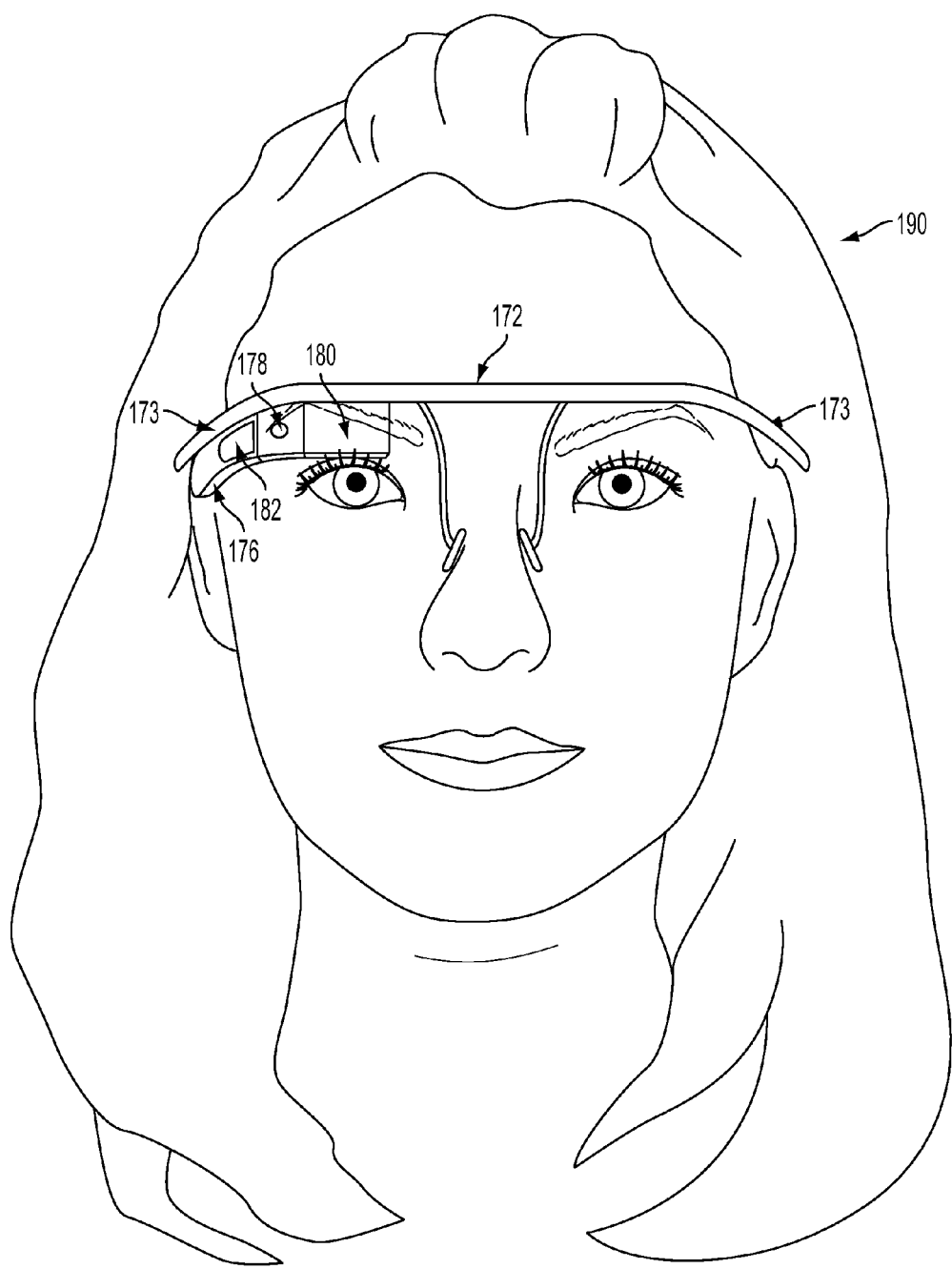
FIGS. 1E to 1G are simplified illustrations of the wearable computing system shown in FIG. 1D, being worn by a wearer.
Figure 1F:
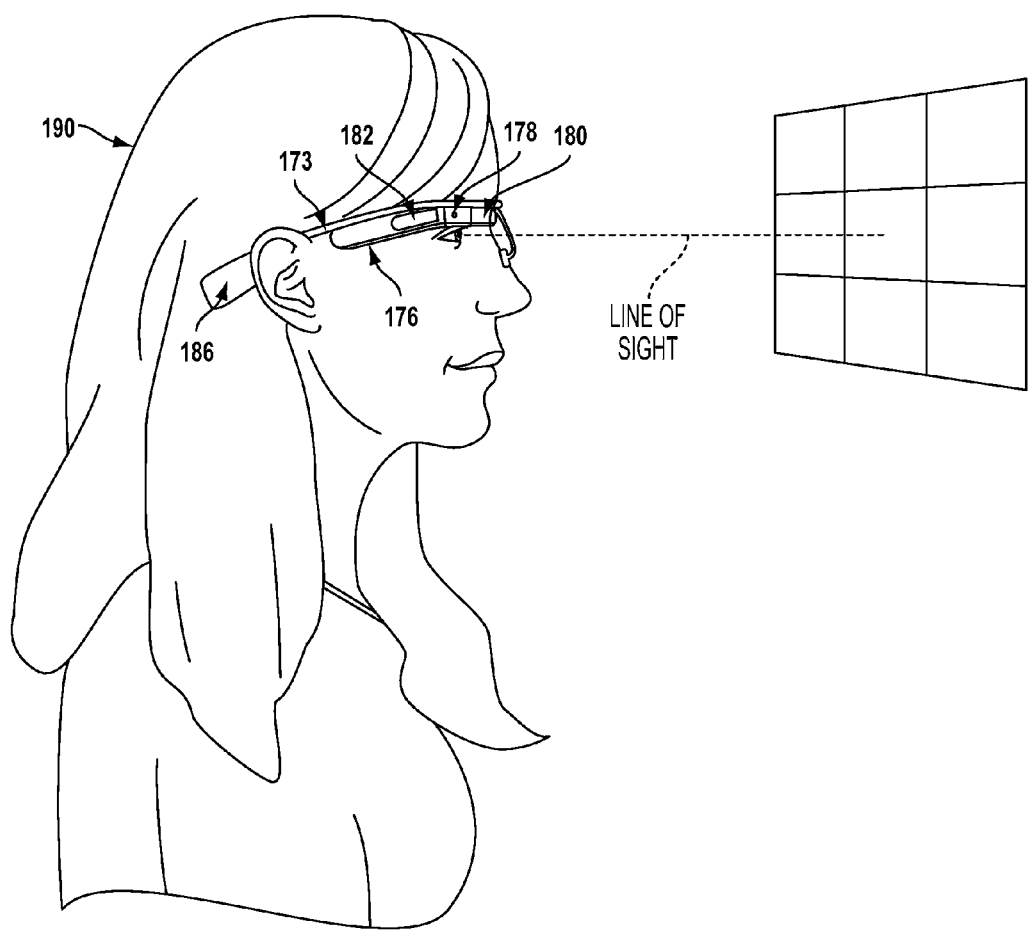
Figure 1G:
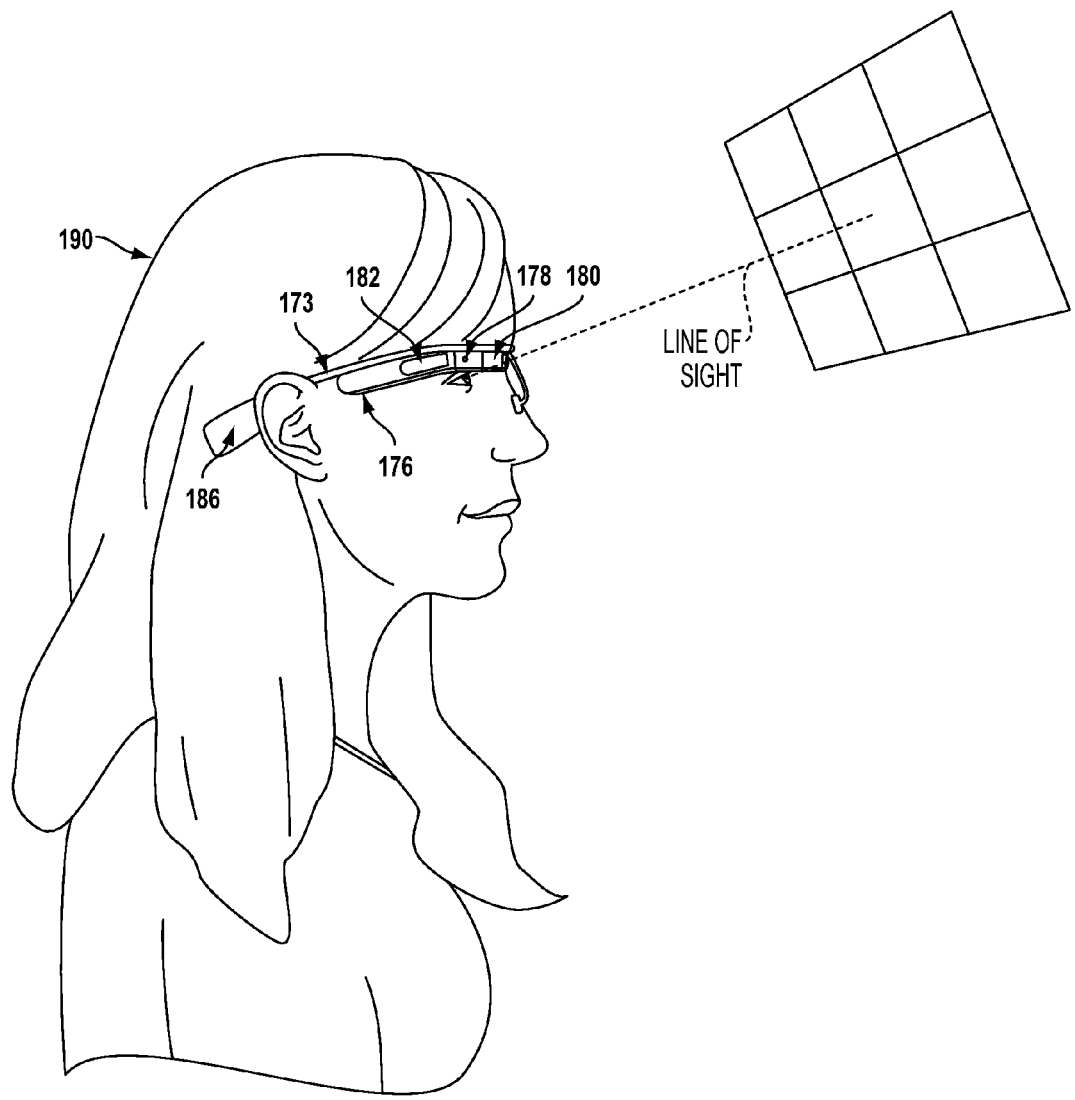

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 can be arranged such that when HMD 172 is worn, display 180 is positioned in front of or proximate to a user's eye when the HMD 172 is worn by a user. For example, display 180 can be positioned below the center frame support and above the center of the wearer's eye, as shown in FIG. 1E. Further, in the illustrated configuration, display 180 can be offset from the center of the wearer's eye (e.g., so that the center of display 180 is positioned to the right and above of the center of the wearer's eye, from the wearer's perspective).

Configured as shown in FIGS. 1E to 1G, display 180 can be located in the periphery of the field of view of the wearer 190, when HMD 172 is worn. Thus, as shown by FIG. 1F, when the wearer 190 looks forward, the wearer 190 can see the display 180 with their peripheral vision. As a result, display 180 can be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 can view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
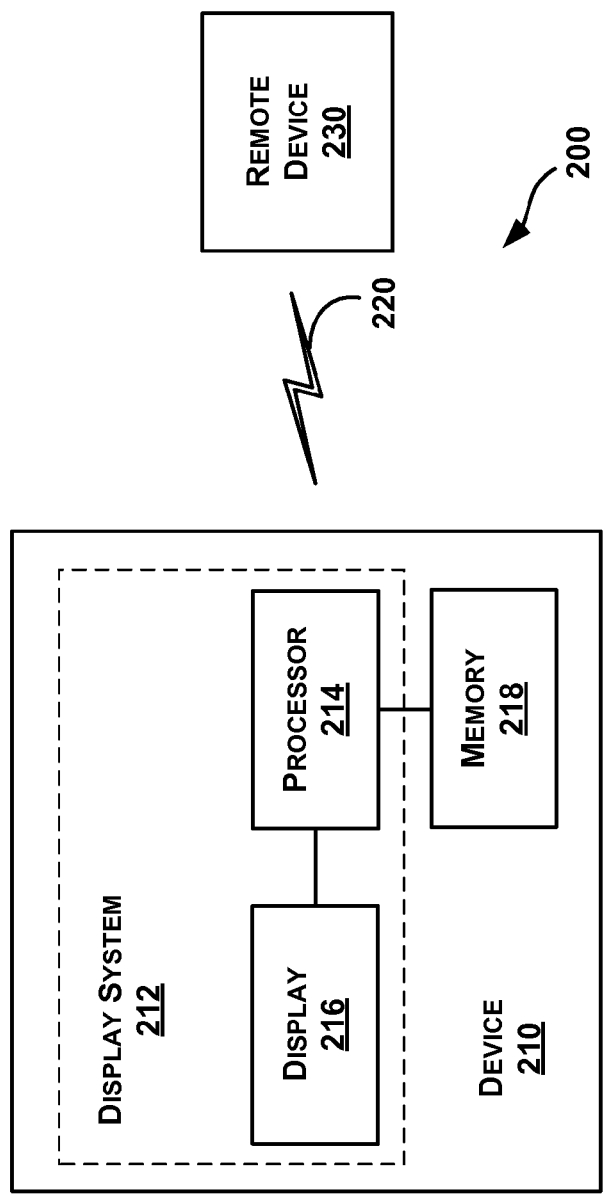
FIG. 2A illustrates a schematic drawing of a computing device according to an example embodiment.

FIG. 2A illustrates a schematic drawing of a computing device 210 according to an example embodiment. In an example embodiment, device 210 communicates using a communication link 220 (e.g., a wired or wireless connection) to a remote device 230. The device 210 can be any type of device that can receive data and display information corresponding to or associated with the data. For example, the device 210 can be a heads-up display system, such as the head-mounted devices 102, 152, or 172 described with reference to FIGS. 1A to 1G.

Thus, the device 210 can include a display system 212 including a processor 214 and a display 216. The display 216 can be, for example, an optical see-through display, an optical see-around display, or a video see-through display. The processor 214 can receive data from the remote device 230, and configure the data for display on the display 216. The processor 214 can be any type of processor, such as a micro-processor or a digital signal processor, for example.

The device 210 can further include on-board data storage, such as memory 218 coupled to the processor 214. The memory 218 can store software that can be accessed and executed by the processor 214, for example.

The remote device 230 can be any type of computing device or transmitter including a laptop computer, a mobile telephone, or tablet computing device, etc., that is configured to transmit data to the device 210. The remote device 230 and the device 210 can contain hardware to enable the communication link 220, such as processors, transmitters, receivers, antennas, etc.

Further, remote device 230 can take the form of or be implemented in a computing system that is in communication with and configured to perform functions on behalf of client device, such as computing device 210. Such a remote device 230 can receive data from another computing device 210 (e.g., an HMD 102, 152, or 172 or a mobile phone), perform certain processing functions on behalf of the device 210, and then send the resulting data back to device 210. This functionality can be referred to as "cloud" computing.

In FIG. 2A, the communication link 220 is illustrated as a wireless connection; however, wired connections can also be used. For example, the communication link 220 can be a wired serial bus such as a universal serial bus or a parallel bus. A wired connection can be a proprietary connection as well. The communication link 220 can also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 can be accessible via the Internet and can include a computing cluster associated with a particular web service (e.g., social-networking, photo sharing, address book, etc.).

C. EXAMPLE IMAGE PROJECTION

Figure 2B:
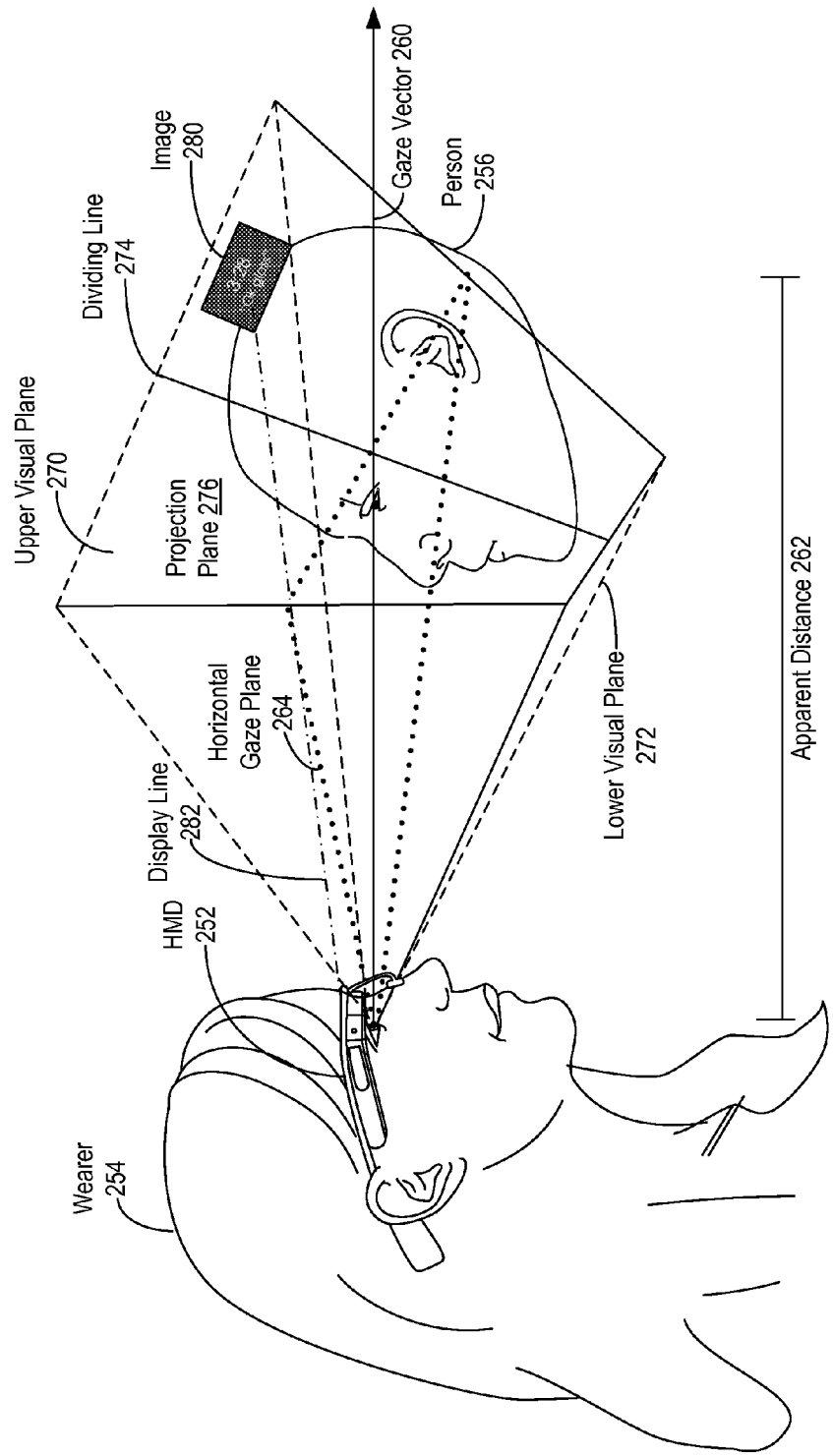
FIG. 2B shows an example projection of an image by an example head-mountable device (HMD), according to an example embodiment.

FIG. 2B shows an example projection of UI elements described herein via an image 280 by an example head-mountable device (HMD) 252, according to an example embodiment. Other configurations of an HMD can also be used to present the UI described herein via image 280. FIG. 2B shows wearer 254 of HMD 252 looking at an eye of person 256. As such, wearer 254's gaze, or direction of viewing, is along gaze vector 260. A horizontal plane, such as horizontal gaze plane 264 can then be used to divide space into three portions: space above horizontal gaze plane 264, space in horizontal gaze plane 264, and space below horizontal gaze plane 264. In the context of projection plane 276, horizontal gaze plane 260 appears as a line that divides projection plane into a subplane above the line of horizontal gaze plane 260, a subplane below the line of horizontal gaze plane 260, and the line where horizontal gaze plane 260 intersects projection plane 276. In FIG. 2B, horizontal gaze plane 264 is shown using dotted lines.

Additionally, a dividing plane, indicated using dividing line 274 can be drawn to separate space into three other portions: space to the left of the dividing plane, space on the dividing plane, and space to right of the dividing plane. In the context of projection plane 276, the dividing plane intersects projection plane 276 at dividing line 274. Thus, the dividing plane divides projection plane into: a subplane to the left of dividing line 274, a subplane to the right of dividing line 274, and dividing line 274. In FIG. 2B, dividing line 274 is shown as a solid line.

Humans, such wearer 254, when gazing in a gaze direction, can have limits on what objects can be seen above and below the gaze direction. FIG. 2B shows the upper visual plane 270 as the uppermost plane that wearer 254 can see while gazing along gaze vector 260, and shows lower visual plane 272 as the lowermost plane that wearer 254 can see while gazing along gaze vector 260. In FIG. 2B, upper visual plane 270 and lower visual plane 272 are shown using dashed lines.

The HMD can project an image for view by wearer 254 at some apparent distance 262 along display line 282, which is shown as a dotted and dashed line in FIG. 2B. For example, apparent distance 262 can be 1 meter, four feet, infinity, or some other distance. That is, HMD 252 can generate a display, such as image 280, which appears to be at the apparent distance 262 from the eye of wearer 254 and in projection plane 276. In this example, image 280 is shown between horizontal gaze plane 264 and upper visual plane 270; that is image 280 is projected above gaze vector 260. In this example, image 280 is also projected to the right of dividing line 274. As image 280 is projected above and to the right of gaze vector 260, wearer 254 can look at person 256 without image 280 obscuring their general view. In one example, the display element of the HMD 252 is translucent when not active (i.e. when image 280 is not being displayed), and so the wearer 254 can perceive objects in the real world along the vector of display line 282.

Other example locations for displaying image 280 can be used to permit wearer 254 to look along gaze vector 260 without obscuring the view of objects along the gaze vector. For example, in some embodiments, image 280 can be projected above horizontal gaze plane 264 near and/or just above upper visual plane 270 to keep image 280 from obscuring most of wearer 254's view. Then, when wearer 254 wants to view image 280, wearer 254 can move their eyes such that their gaze is directly toward image 280.

D. AN EXAMPLE USER INTERFACE FOR AN HMD

FIGS. 3 through 13B collectively describe aspects of an example user interface for an HMD such as discussed above at least in the context of FIGS. 1A through 2B. The HMD can be configured with a user interface (UI) controller receiving inputs from at least two user interfaces: a touch-based UI and a voice-based UI. The touch-based UI can include a touch pad and a button, configured to receive various touches, such as one-finger swipes in various directions, two-finger or multi-finger swipes in various directions, taps, button presses of various durations, and button releases.

Once a touch is received, the touch-based UI can report the touch; e.g., a "swipe forward" or "tap" to the HMD, or in some cases, to a component of the HMD such as a UI controller. In other embodiments, the HMD can act as the UI controller. As described herein, the HMD includes any necessary components, such as but not limited to one or more UI controllers, which are configured to perform and control the UI operations described herein.

The voice-based UI can include a microphone configured to receive various words, including commands, and to report the received words; e.g., "Call Mom," to the HMD. In some embodiments, the HMD can include a gaze-based UI that is configured to detect duration and/or direction of one or more gazes of a wearer of the HMD. For example, the gaze-based UI can be configured to detect "dwell time" or how long the wearer gazes in a fixed direction, the direction of the gaze, a rate of change of the gaze, and additional information related to wearer gazes. In some cases, the HMD can generate audible outputs; e.g., tones, words, songs, etc., that can be heard by the wearer via headphones, speakers, or bone conduction devices of the HMD.

Figure 3:
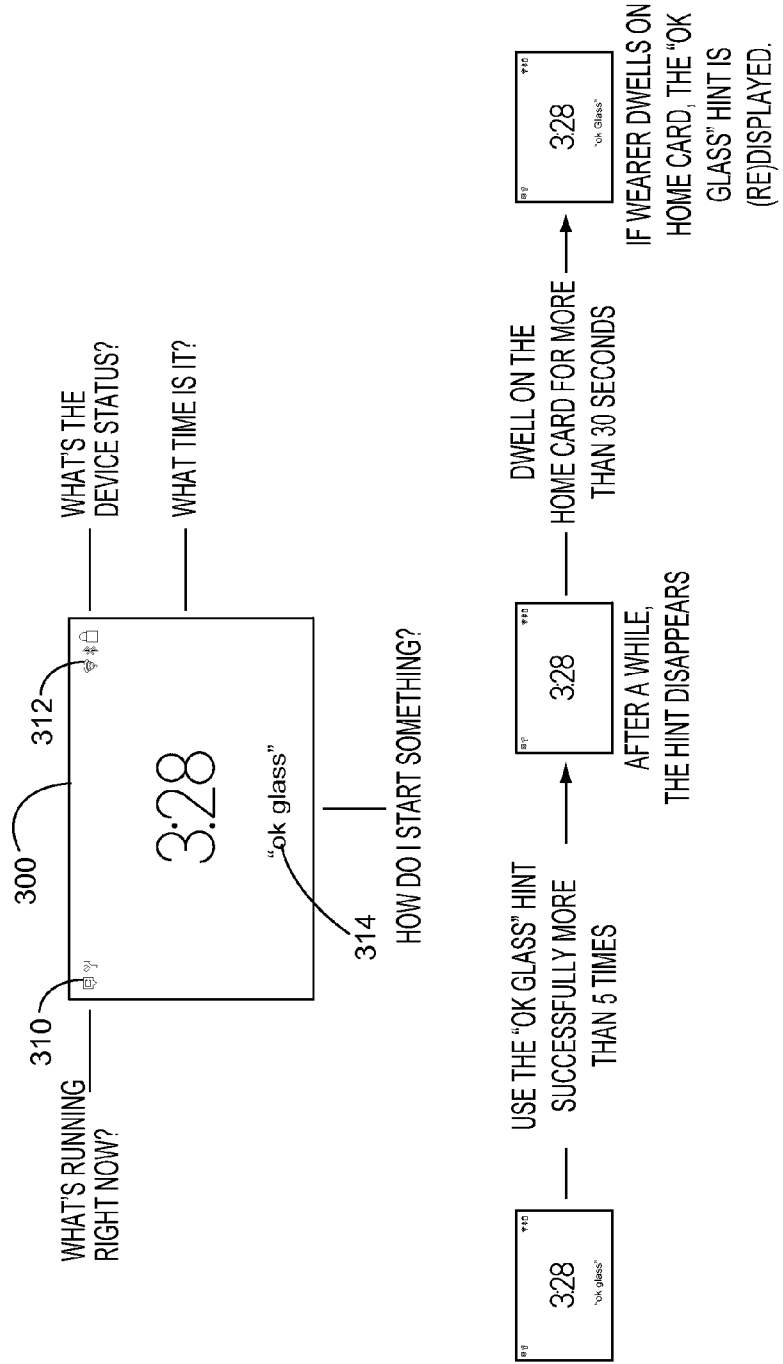
FIG. 3 shows an example home card of an example user interface for a HMD, according to an example embodiment.

The HMD can generate "cards," also referred to as screens or images, which are capable of occupying the full display of the HMD when selected. One card is a home card that is the first card displayed when UI is activated, for example shortly after HMD powers up or when the HMD wakes from a sleep or power-saving mode. FIG. 3 shows an example home card 300 of an example user interface, according to an example embodiment. Home card 300 includes application status indicators 310, device status indicators 312, hint 314 and a clock shown in large numerals indicating the present time in the center of home card 300. Application status indicators 310 can indicate which application(s) are operating on the HMD. As shown in FIG. 3, application status indicators 310 include camera and Y-shaped road icons to respectively indicate operation of a camera application and a navigation application. Such indicators can remind the wearer what applications or processes are presently running and/or consuming power and/or processor resources of the HMD.

Device status indicators 312 can indicate which device(s) are operating on the HMD and HMD status. As shown in FIG. 3, device status indicators 312 include icons for a wireless network and a Bluetooth network, respectively, that indicate the HMD is presently configured for communication via a wireless network and/or a Bluetooth network. In one embodiment, the HMD may not present device status indicators 312 on home card 300.

Hint 314 is shown in FIG. 3 as "ok glass." Hint 314 is shown in quotes to indicate that the hint is related to the voice-based UI of the HMD. In some embodiments, hint 314 can be related to the touch-based UI of the HMD. The words in hint 314 illustrated as "ok glass" indicate that a wearer should say the words "ok glass" to activate the voice-based UI of the HMD. In other words, "ok glass" in this instance is a word (that can also be referred to as "a hotword") that triggers activation of a voice-based UI. Other hotwords can also be used.

As also indicated in the lower portion of FIG. 3, if hint 314 is used successfully a number, e.g., 5, of times, the HMD can remove hint 314 from being displayed on home card 110. However, if the HMD has a gaze-based UI and detects that a dwell time of the wearer on the home card exceeds a threshold, such as a 30-second threshold, the HMD can add hint 314 back to home card 110 to remind the wearer about specific words, e.g., ok glass, used to activate the voice-based UI. In one embodiment, the hotword presented as hint 314 on home card 300 can be updated to make the user aware of other functionality of the HMD, or to suggest queries or actions based on the HMD's current geographic location or situational context.

The UI can accept as inputs certain operations performed using the touch-based UI. The UI can receive these operations and responsively perform actions to enable the wearer to interact with the HMD. These operations can be organized into tiers. FIG. 4 lists example operations of a multi-tiered user model 400 for a user interface for a head-mountable device (HMD), according to an example embodiment.

As shown in FIG. 4, multi-tiered user model 400 has three tiers: basic, intermediate, and advanced. The basic tier provides the smallest number of operations of any tier of multi-tiered user model 400. The intermediate tier includes all operations provided by the basic tier, along with additional operations not provided by the basic tier. Similarly, the advanced tier includes all operations provided by the basic and intermediate tiers, along with additional operations not provided by either the basic tier or intermediate tier.

FIG. 4 shows that the basic tier of multi-tiered user model 400 provides tap, swipe forward, swipe backward, voice, and camera button press operations. A tap operation can involve a single physical tap—that is, one quick, slight strike with one or more fingers on the touch pad of the touch-based UI. A swipe forward operation, sometimes termed a swipe right, can involve a movement forward by one or more fingers touching the touch pad, where forward is the general direction from the wearer's ear toward the wearer's eye when the wearer has the HMD on. A swipe backward operation, sometimes termed a "swipe left," can involve a movement backward by one or more fingers touching the touch pad, where backward is the general direction from the wearer's eye toward the wearer's ear when the wearer has the HMD on. A "swipe down" operation can involve a downward movement by one or more fingers touching the touch pad, where downward is the general direction from the top of the wearer's head toward the wearer's neck when the wearer has the HMD on.

While example embodiments in this description make reference to particular directions of touchpad input such as up, down, left, right, it should be understood that these are exemplary and that embodiments where certain operations can be triggered via different input directions are contemplated.

In one embodiment, the physical actions used by the wearer to perform some or all of the herein-described operations can be customized; e.g., by the wearer and/or other entity associated with the HMD. For example, suppose the wearer prefers to perform a physical action of a "double-tap"—that is, one physical tap quickly followed by a second physical tap—rather than the above-mentioned single physical tap, to perform a tap operation. In this embodiment, the wearer and/or other entity could configure the HMD to recognize a double-tap as a tap operation, such as by training or setting the HMD to associate the double-tap with the tap operation. As another example, suppose that the wearer would like to interchange the physical operations to perform swipe forward and backward operations; e.g., the swipe forward operation would be performed using a physical action described above as a swipe left and the swipe backward operation would be performed using a physical action described above as a swipe right. In this embodiment, the wearer could configure the HMD to recognize a physical swipe left as a swipe forward operation and physical swipe right as a swipe backward operation. Other customizations are possible as well; e.g., using a sequence of swipes to carry out the tap operation.

The tap operation can select a currently visible card. The swipe forward operation can remove the currently visible card from display and select a next card for display. The swipe backward operation can remove the currently visible card from display and select a previous card for display.

The swipe down operation can, depending on context, act to go back, go home, or sleep. Going back can remove the currently visible card from display and display a previously-visible card for display. For example, the previously-visible card can be the card that most recently viewed; e.g. if card A is currently visible and card B is previously-viewed card, then the swipe down operation can remove card A from visibility and display card B. Going home can replace the currently visible card from display and display the home card. Sleeping can cause part of the HMD, e.g., the display, or all of the HMD to be deactivated.

A voice operation can provide access to a voice menu of operations. A camera button press can instruct the HMD to take a photo using a camera associated with and/or part of the HMD.

FIG. 4 shows that the intermediate tier of multi-tiered user model 400 provides tap, swipe forward, swipe backward, voice, and camera button press operations as described above in the context of the basic tier. Also, the intermediate tier provides camera button long press, two finger swipe forward, two finger swipe backward, and two finger swipe down operations.

The camera button long press operation can instruct the HMD to provide a capture menu for display and use. The capture menu can provide one or more operations for using the camera associated with HMD.

The two finger swipe forward operation removes the currently visible card from display and selects a next card for display using a "zoomed scroll." The two finger swipe forward operation removes the currently visible card from display and selects the next card for display using a zoomed scroll. Zoomed scrolls are discussed in more detail in the context of at least FIG. 6A. The two finger swipe down causes the HMD to sleep at this position in a timeline.

FIG. 4 shows that the advanced tier of multi-tiered user model 400 provides tap, swipe forward, swipe backward, voice, and camera button press operations as described above in the context of the basic tier, as well as camera button long press, two finger swipe forward, two finger swipe backward, and two finger swipe down operations described above in the context of the intermediate tier. The advanced tier also provides one-finger press-and-holds, two-finger press-and-holds, and nudge operations.

The one-finger press-and-hold operation zooms, or expands, the display of the current card, or content related to the current card, starting when the wearer presses on the touch-based UI and continues to zoom as long as the wearer "holds" or keeps pressing on the touch-based UI.

The two-finger press-and-hold can provide a "clutch" operation, which can be performed by pressing on the touch-based UI in two separate spots using two fingers and holding the fingers in their respective positions on the touch-based UI. After the fingers are held in position on the touch-based UI, the clutch operation is engaged. In some embodiments, the HMD recognizes the clutch operation only after the fingers are held for at least a threshold period of time; e.g., one second. The clutch operation will stay engaged as long as the two fingers remain on the touch based UI. Clutch operations are discussed in more detail below in the context of at least FIGS. 6B and 6C.

The nudge operation can be performed using a short, slight nod of the wearer's head. For example, the HMD can be configured with accelerometers or other motion detectors that can detect the nudge and provide an indication of the nudge to the HMD. Upon receiving indication of a nudge, the HMD can toggle an activation state of the HMD. That is, if the HMD is active (e.g., displaying a card on the activated display) before the nudge, the HMD can deactivate itself (e.g., turn off the display) in response. Alternatively, if the HMD is inactive before the nudge but is active enough to detect nudges; e.g., within two or a few seconds of notification of message arrival, the HMD can activate itself in response.

By way of further example, in one scenario, the HMD is powered on with the display inactive. In response to the HMD receiving a new text message, an audible chime can be emitted by the HMD. Then, if the wearer nudges within a few seconds of the chime, the HMD can activate and present a card with the content of the text message. If, from the activated state, the user nudges again, the display will deactivate. Thus, in this example, the user can interact with the device in a completely hands-free manner.

Figure 5A:
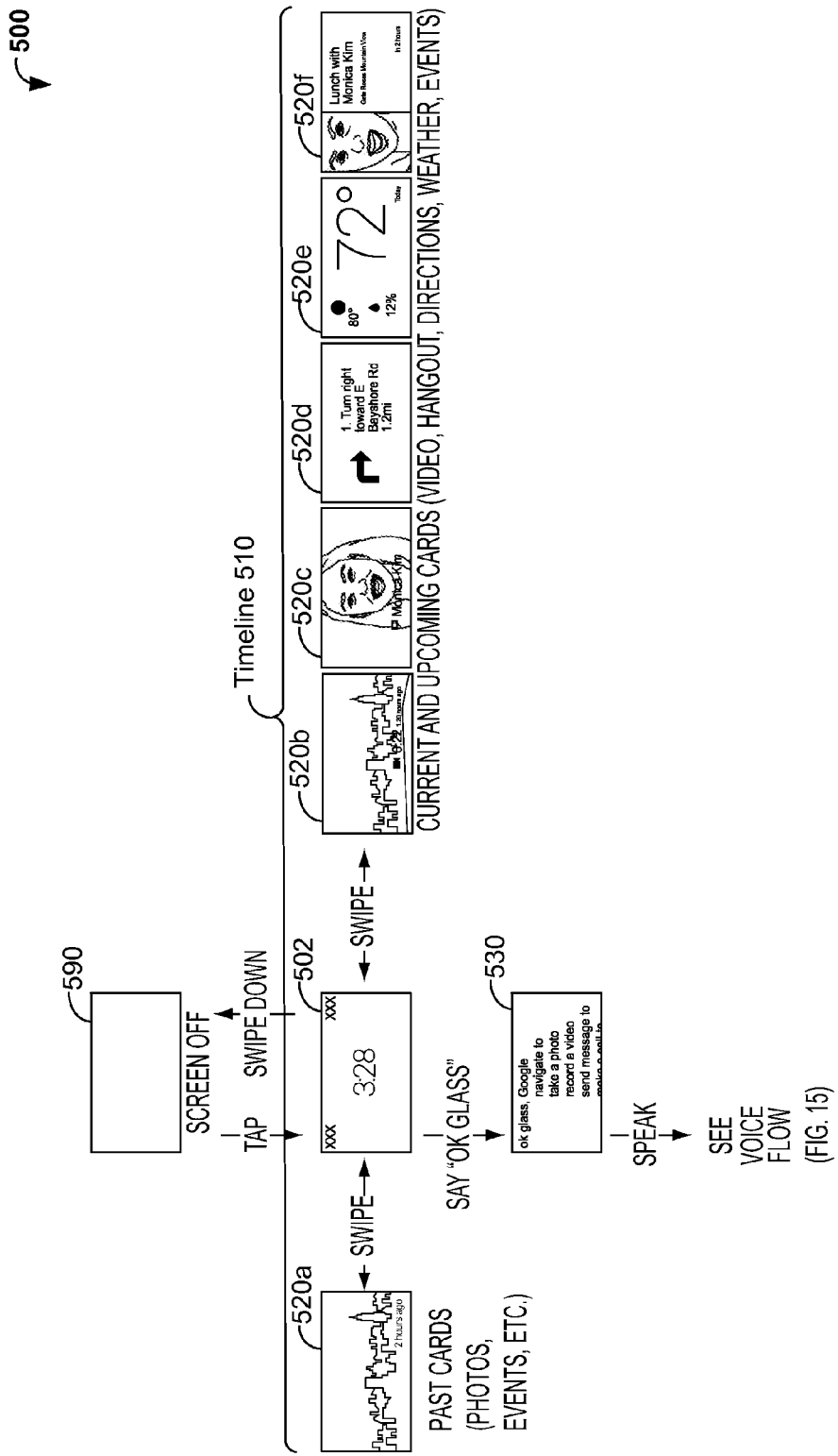
FIG. 5A shows a scenario of example timeline interactions, according to an example embodiment.

As mentioned above, the UI maintains a timeline or ordered sequence of cards that can be operated on using the operations described in FIG. 4 immediately above. FIG. 5A shows a scenario 500 of example timeline interactions, according to an example embodiment.

Scenario 500 begins with home card 502 being displayed by an HMD worn by a wearer. Home card 502 and cards 520a-520c can be arranged as a "timeline" or ordered sequence of cards. In the example shown in FIG. 5A, each card in timeline 510 has a specific time associated with the card. The timeline can be ordered based on the specific time associated with each card. In some cases, the specific time can be "now" or the present time. For example, home card 502 can be associated with the specific time of now. In other cases, the time can be a time associated with an event leading to the card. For example, FIG. 5A shows that card 520a represents a photo taken at a time 2 hours ago. Then, card 520a can be associated with the specific time of 1:28, which is 2 hours before the present time of 3:28 shown on home card 500.

Cards 520b-520f represent current cards, or cards associated with the specific time of now, or upcoming cards, or cards associated with a future time. For example, card 520b is a current card that includes an image currently generated by a camera associated with the HMD, card 520c is a current card that includes an image of a "hangout" or video conference call currently in-progress generated by an application of the HMD, card 520d is a current card that includes an image and text currently generated by a navigation application/process presently running on the HMD, card 520e is a current card that includes images and text currently generated by a weather application of the HMD, and 520f is an upcoming card that includes images and text generated by a calendar application of the HMD indicating an appointment for "Lunch with Monica Kim" in "2 hours."

In scenario 500, the HMD can enable navigation of the time line using swipe operations. For example, starting at home card 502, a swipe backward operation can cause the HMD to select and display a previous card, such as card 520a, and a swipe forward operation can cause the HMD to select and display a next card, such as card 520b. Upon displaying card 520b, the swipe forward operation can cause the HMD to select and display the previous card, which is home card 502, and the swipe backward operation can cause the HMD to select and display the next card, which is card 520c.

In scenario 500, there are no cards in timeline 510 that are previous to card 520a. In one embodiment, the timeline is represented as a circular timeline. For example, in response to a swipe backward operation on card 520a requesting a previous card for display, the HMD can select 520f for (re)display, as there are no cards in timeline 510 that are after card 520f during scenario 500. Similarly, in response to a swipe forward operation on card 520f requesting a next card for display, the HMD can select 520a for (re)display, as there are no cards in timeline 510 that are after card 520f during scenario 500.

In another embodiment, instead of a circular representation of the timeline, when the user navigates to the end of the timeline, a notification is generated to indicate to the user that there are no additional cards to navigate to in the instructed direction. Examples of such notifications could include any of or a combination of the following: a visual effect, an audible effect, a glowing effect on the edge of the card, a three dimensional animation twisting the edge of the card, a sound (e.g. a click), a textual or audible message indicating that the end of the timeline has been reached (e.g. "there are no cards older than this"). Alternatively, in one embodiment, an attempt by the user to navigate past a card in a direction where there are no additional cards could result in no effect, i.e. swiping right on card 520a results in no perceptible change to the display or card 520a.

While displaying home card 502, a wearer of the HMD can recite or utter a hotword, for example the words "ok glass" to activate the voice-based interface of the HMD. In response, the HMD can display card 530 that lists some of the commands that can be uttered by the wearer to interact with the voice-based interface. FIG. 5A shows example commands as "Google" to perform a search query, "navigate to" to find directions to a location, "take a photo" to capture an image using a camera associated with the HMD, "record a video" to capture a sequence of images and/or associated sounds, using a camera and/or a microphone associated with the HMD, and "send a message" to generate and send an e-mail, SMS message, instant message, or some other type of message.

While displaying card 530, the wearer can utter something in response, which can lead to voice interactions with the UI. The commands capable of triggering voice interactions are not necessarily limited to those presented on card 530 at the time the utterance is received. For example, as the user dwells on card 530, additional commands can be presented for other features. Further, such commands presented on card 530 can change over time through further use of the HMD, or can be remotely updated to surface additional features or content of the HMD. Still further, similar to the frequent contact aspects described herein, commands for frequently used functions of the HMD can be presented on card 530. As such, these commands can change over time based on use of the HMD by the wearer.

Figure 6A:
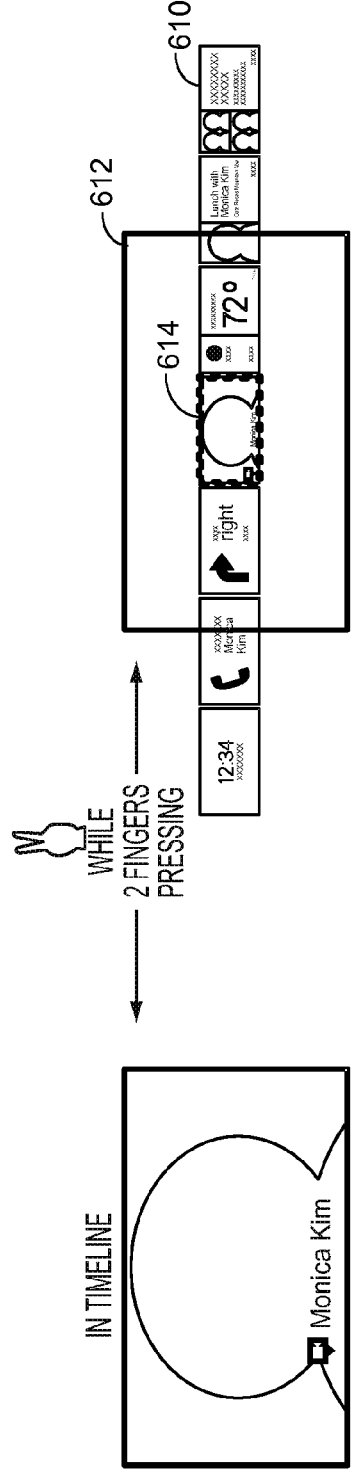
FIG. 6A shows an example of using a two-fingered swipe on a touch-based UI of an HMD for zoomed scrolling, according to an example embodiment.

In some examples, timelines can become lengthy. The UI provides operations for speedy use of the UI, such as two-fingered swipes and clutches, although other gestures to invoke such navigation operations are possible. FIG. 6A shows an example of using a two-fingered swipe on a touch-based UI of an HMD for zoomed scrolling, according to an example embodiment.

Figure 5B:
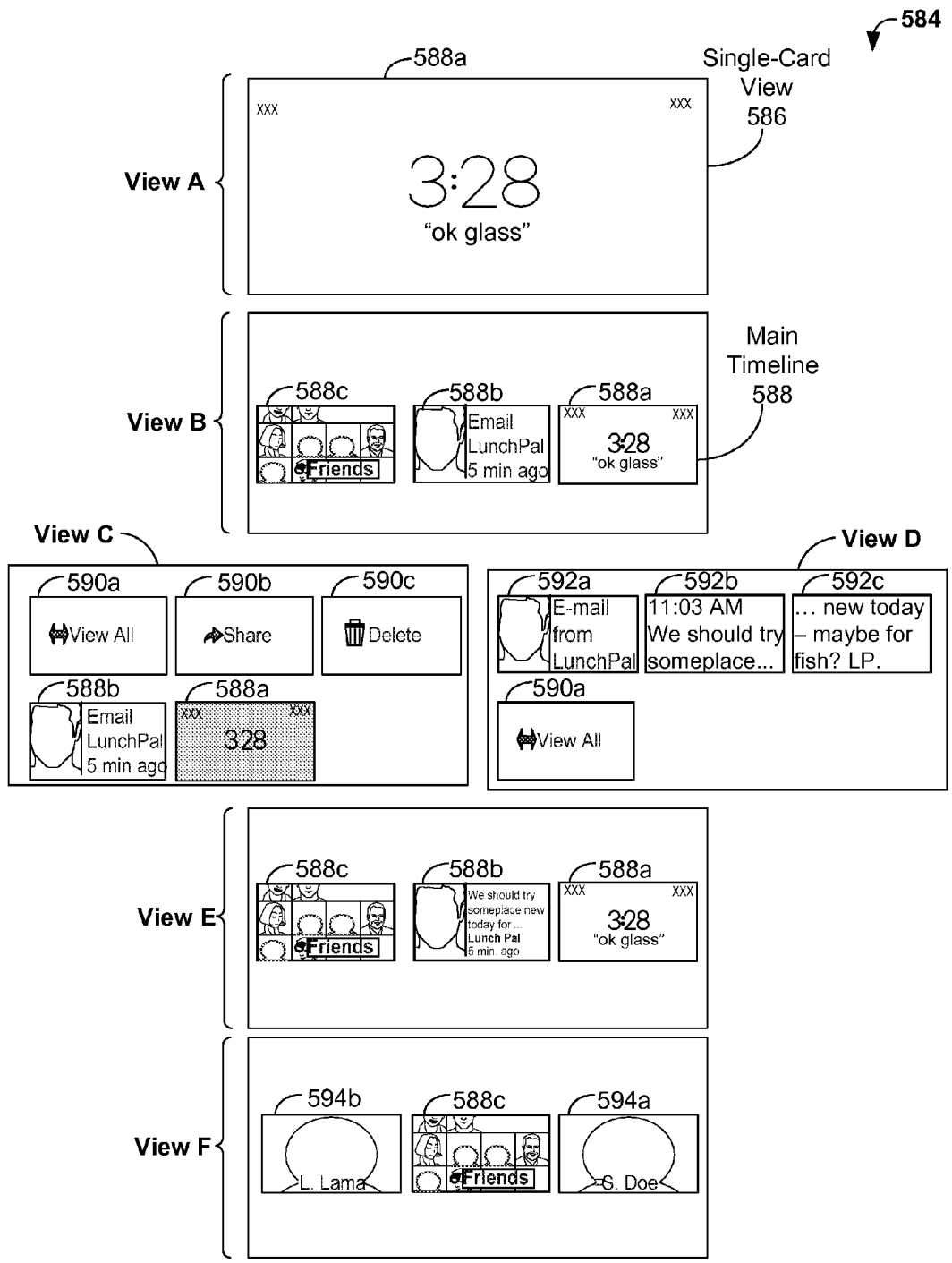
FIG. 5B shows a scenario for using a multi-timeline display, according to an example embodiment.

FIG. 5B shows scenario 584 using a multi-timeline display, according to an example embodiment. Scenario 584 begins with a wearer of an HMD using View A, shown at the top of FIG. 5B, that can be generated by the HMD to observe home card 588a displayed in single-card view 586. In scenario 584, a wearer of an HMD can switch from single-card view 586 into a multi-timeline view using a clutch operation. In other scenarios, a different operation or operations than a clutch can be performed to switch into the multi-timeline view.

In scenario 584, multiple cards of main timeline 588 can be displayed simultaneously upon entering the multi-timeline view. View B of FIG. 5B, shown just below View A, illustrates a multi-timeline view and shows three cards 588a,

588*b*, and 588*c* of main timeline 588 in a linear arrangement. Card 588*a* is a home card for main timeline 588, card 588*b* is a card representing an "Email" from "LunchPal" that arrived "5 min ago," and card 588*c* is a bundle card that shows a number of thumbnail images related to a bundle of contacts called "Friends."

In scenario 584, card 588*a* was shown in while in single-user view 586 and in an initial multi-timeline view. In some scenarios, the initial multi-timeline view can be centered on the card shown in a previous single-card view; e.g., home card 588*a*. In other scenarios, multiple timelines can be displayed as part of the initial multi-timeline view; for example, main timeline 588 can be accompanied by a one or more timelines showing card representing one or more contacts, photos, previous events, future events, and/or other cards.

In scenario 584, the wearer of the HMD can select a card for use by controlling a selection region. A given card, such as card 588*b*, can be selected when the selection region is aligned with the given card. In this context, the selection region can be aligned with a given card in a display when the selection region is placed over the given card in the display, the selection region substantially overlaps the given card in the display, and/or a UI action (e.g., a tap of a touchpad, a click of a mouse, a key press) is performed when the selection region overlaps the given card in the display. Other techniques for aligning a selection region and a given card are possible as well. In some embodiments, the selection region substantially overlaps the given card when at least 50% of the selection region overlaps the given card in the display. In some embodiments, the HMD can be configured to detect head movements and the selection region can be moved using the head movements.

In scenario 584, the wearer of the HMD selects card 588*b* and, after the selection of card 588*b*, View C can be generated, which is shown below and to the left of View B in FIG. 5B. View C shows card 588*b* of main timeline 588 and a linear arrangement of three action cards 590*a*, 590*b*, and 590*c* shown above card 588*b*; that is, View C shows multiple linear arrangements simultaneously. As shown in View C, the linear arrangement of action cards starts with card 590*a* that is directly above selected card 588*b*, and the linear arrangement of action cards is adjacent to, above, and parallel to main timeline 588. Card 588*a* is shown in View C as greyed out to indicate that card 588*a* is not selected.

Upon selection of action card 590*a* to "View All," the wearer can view the e-mail represented by card 588*b*. Selection of action card 590*b* to "Share" can enable the wearer to share; e.g., reply to, forward, post to a website, etc., the e-mail represented by card 588*b*. Selection of action card 590*c* to "Delete" can permit the wearer to delete the e-mail represented by card 588*b*.

In scenario 584, the wearer selects card 590*a* to view all of the e-mail represented by card 588*b*. After selection of card 590*a*, the content of the e-mail is shown using three content cards 592*a*, 592*b*, and 592*c* shown in View D as adjacent to and above selected card 590*a*. View D is shown directly to the right of View C in FIG. 5B.

View D also shows that the linear arrangement of contact cards begins with card 592*a*, which is shown directly above selected card 592*a*. View D does not show unselected action cards 590*b* and 590*c*; in some embodiments, unselected cards can be displayed. In particular scenarios, unselected but displayed card can be displayed in a visually distinct manner to indicate non-selection; e.g., shown with a grey background as for card 588*a* in View C.

Scenario 584 continues with the wearer of the HMD manipulating the selection region to return to the main timeline 588 and select card 588*c* as shown in View E. FIG. 5B shows View E below and to the left of View D. As mentioned above, card 588*c* is a bundle card representing a group of related cards; in this example, a group of contact cards. Each contact card can have an indication that the card is a contact card. In some embodiments, card represented by bundle card 588*c* can have an indication that the card is in the "Friends" bundle of cards/contacts. As such, the HMD can determine cards in the "Friends" bundle by searching for each card having an indication that the card is in the "Friends" group of cards.

Upon selection of card 588*c*, the HMD can generate View F, which shows contact cards 594*a* and 594*b* of the "Friends" bundle displayed the linear arrangement with main timeline 588. View F is shown in FIG. 5B directly below View E. Bundle card 588*b* is shown by View F as remaining in the linear arrangement with main timeline 588. In some scenarios, contact cards 594*a* and 594*b*, as well as additional cards in the "Friends" bundle can be shown in a linear arrangement adjacent to the linear arrangement showing a selected bundle card; e.g., card 588*c*. In other scenarios, upon selection of bundle card 588*c*, bundle card 588*c* is no longer displayed; rather, the bundle card can be considered to be replaced by the content of the bundle.

To speed movement in selecting next card(s) in the timeline, a wearer can swipe forward with two fingers, as shown in FIG. 6A, to perform a zoomed scroll to a next card. Similarly, to speed movement in selecting previous card(s) in the timeline, a wearer can swipe backward with two fingers, as also shown in FIG. 6, to perform a zoomed scroll to a previous card.

Upon receiving a UI operation for a zoomed scroll, for example, a two-fingered swipe forward, a reduced-size view of cards can be displayed in the resulting timeline 610. That is, as shown in FIG. 6A, multiple cards can be shown in example display 612 generated by the HMD. A swipe or drag operation associated with the zoomed scroll can move content faster, e.g., 4 times faster, than when performing a regular swipe or drag operation. Inertial free scrolling can be performed as part of zoomed scrolling. After the zoomed scroll completes, the focus for the UI is on card 614 of timeline 610. FIG. 6A shows card 614 outlined using a thick dashed line in the center of display 612.

A timeline that has been released after the zoomed scroll can stay zoomed out, or can continue with reduced image views, until a minimum velocity threshold for the timeline is reached. After the minimum velocity threshold is reached, display 612 can be instructed to zoom to the card that is closest to the center of display 612; e.g., display 612 can zoom to card 614. That is, the HMD can show card 614 as large as possible within display 612.

Figure 6C:
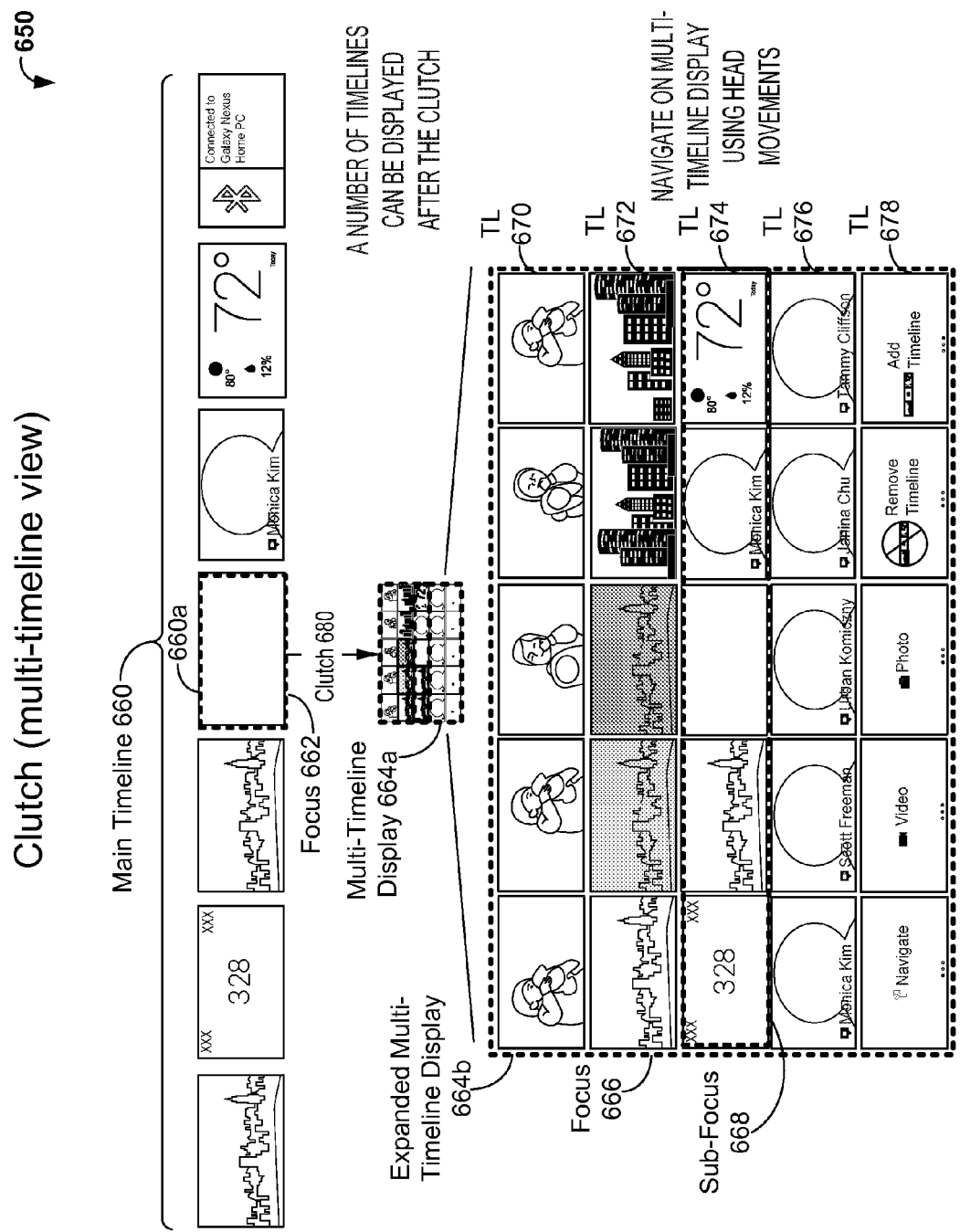
FIG. 6C shows a scenario for using a clutch operation to generate a multi-timeline display, according to an example embodiment.

Additional techniques for rapid movement within a timeline and between timelines can be provided by the UI. For example, a clutch operation can lead to generation and display of a multi-card display, such as shown in FIG. 6B, or a multi-timeline display, such as shown in FIG. 6C. Navigation within the multi-card display and/or multi-timeline display can, in some embodiments, be performed using head movements. In other embodiments, the multi-card display or multi-timeline display in toto can be focused on, or displayed by the HMD. Thus, to aid navigation, a sub-focus can be implemented to highlight a card or a timeline within a multi-card or multi-timeline display.

FIG. 6B shows a scenario 620 for using clutch operation 642 to generate a multi-card display 634*a*, according to an example embodiment. Scenario 620 begins with an HMD having timeline 630 with cards 630a through 630g, and with a focus on card 630d. During scenario 620, prior to clutch 642, the HMD displays cards in the timeline using a single-card view, while solely displaying a focused-upon card. As the focus is on card 630d, which FIG. 6 shows as a photo of a woman's face, the HMD displays a single-card view of card 630d.

Scenario 620 continues with a wearer of the HMD performing clutch operation 642 using the touch-based UI of the HMD. A clutch operation can involve pressing on the touch-based UI of the HMD using two fingers and holding the two-finger press until the HMD recognizes the clutch operation 642 has been performed. Other gestures, techniques, inputs or time thresholds can be used to trigger the clutch operation. For example, in certain embodiments, a three-finger gesture or a voice-action could be used to engage and/or disengage the clutch operation.

Upon recognition of clutch operation 642, in scenario 620, the HMD can generate and display multi-card display 634a, which is shown in an expanded view as multi-card display 634b. In some embodiments, the HMD can focus on the entire multi-card display 634a using focus 636. In other embodiments, the HMD can focus a subset of cards, such as but not limited to, a single card, a row of cards, a column of cards, a block of cards, or some other selection of cards, within multi-card display 634a using sub-focus 638. For example, in scenario 620, the HMD is configured to display sub-focus 638 on a single card. In some embodiments, the sub-focus can remain on one or more cards at or near the center of the display.

As shown in FIG. 6B using expanded multi-card display 634b, the multi-card display shows nine cards: cards 630a through 630g of timeline 630 and two other cards 640a and 640b not shown as part of timeline 630. The wearer of the HMD can navigate around multi-card display 634a, 634b using head movements, such as moving the wearer's head up, down, left, and/or right. In some embodiments, gaze tracking can be used in place of or in addition to head movements for navigating around multi-card display 634a, 634b and/or multi-timeline display 664a, 664b.

In scenario 620, "wrap-around" movements, or moving off the end of a row or column to the respective other end of the row or column, are enabled. Then, in response to respective movements upward, downward, leftward, or rightward by the head of the wearer, the sub-focus 638 can move from card 630d, as shown in FIG. 6B, to respective cards 630a, 630g, 630f, or 630e. In particular embodiments, wrap-around can be inhibited, so moving the wearer's head leftward will not move sub-focus 638 from card 630d to card 630f, but rather sub-focus 638 will stay on card 630d or move to the left-end of the middle row.

In some embodiments, in response to respective movements diagonally up-and-left, up-and-right, down-and-left, and down-and-right by the head of the wearer, the sub-focus 638 can move from card 630d, as shown in FIG. 6B, to respective cards 630c, 630b, 640b, or 640c. Other types of head movements and/or UI operations can be used as well or instead with multi-card display 634a, 634b, including but not limited to head movements and/or UI operations that move the focus faster than and/or slower than one card at a time, zooming in and out, reshaping sub-focus 638, selecting card(s), and deselecting card(s).

In some embodiments, sub-focus 638 may not be used. For example, in these embodiments, a leftward head movement can move each of cards 630b, 630c, 630e, 630f, 640a, and 640b to the left by one card and bring in new cards to the "right" of these cards (new cards not shown in FIG. 6B) on to multi-card displays 634a and 634b. The new cards can be displayed in the respective positions of card 630c, 630f, and 640b, and remove cards 630a, 630d, and 630g from multi-card display 634a and 634b. Also, a rightward head movement can move each of cards 630a, 630b, 630d, 630e, 630g, and 640a to the right by one card, bring in new cards to the "right" of these cards (not shown in FIG. 4) on to multi-card displays 634a and 634b. The new cards can be displayed in the respective positions of card 630a, 630d, and 640g, and remove cards 630c, 630f, and 640b multi-card displays 634a and 634b.

In these embodiments, an upward head movement can: (1) bring a new row of cards considered to be "above" the top row of cards; e.g., cards in the positions of cards 630a, 630b, 630c of multi-card displays 634a and 634b, (2) display the new row of cards on the top row of multi-card displays 634a and 634b, (3) move the top row of cards down to be displayed as the middle row of cards; e.g. display cards 630a, 630b, and 630c in the positions of cards 630d, 630e, and 630f of multi-card displays 634a and 634b, (4) move the middle row of cards down to the bottom row of cards e.g. display cards 630d, 630e, and 630f in the positions of cards 630g, 640a, and 640b of multi-card displays 634a and 634b, thus removing the bottom row of cards; e.g., cards 630g, 640a, and 640b, from view on multi-card displays 634a and 634b.

In these embodiments, a downward head movement can: (1) bring a new row of cards considered to be "below" the bottom row of cards of multi-card displays 634a and 634b, (2) display the new row of cards on the bottom row of multi-card displays 634a and 634b, (3) move the bottom row of cards up to be displayed as the middle row of cards; e.g. display cards 630g, 640a, and 640b in the positions of cards 630d, 630e, and 630f of multi-card displays 634a and 634b, (4) move the middle row of cards up to the top row of cards e.g. display cards 630d, 630e, and 630f in the positions of cards 630a, 630b, and 630c of multi-card displays 634a and 634b, thus removing the top row of cards; e.g., cards 630a, 630b, and 630c, from view on multi-card displays 634a and 634b.

Scenario 620 continues with clutch 642 being released while sub-focus 638 is on card 630g. Clutch 642 can be released by the wearer removing one or both of their fingers from the touch-based UI of the HMD. After clutch 642 is released, the HMD can use a single-user view to display either (a) card 630c, as the card being focused on before clutch operation 642 began, or (b) card 630g, as the card focused on using sub-focus 638 just prior to release of clutch 642. In response to clutch 642 being released for HMD embodiments not using sub-focus 638, the HMD can use a single-user view to display card 630c.

FIG. 6C shows a scenario 650 for using clutch operation 680 to generate a multi-timeline display 664a, according to an example embodiment. Scenario 650 begins with an HMD displaying main timeline 660 with a focus on card 660a. During scenario 650 prior to clutch 680, the HMD displays cards in main timeline 660 using a single-card view, displaying a focused-upon card. As the focus is on card 660a, the HMD displays a single-card view of card 660a.

Scenario 650 continues with a wearer of the HMD performing clutch operation 680. Upon recognition of clutch operation 680, in scenario 650, the HMD can generate and display multi-timeline display 664a, which is shown in an expanded view as multi-timeline display 664b. In some embodiments, the HMD can focus on the entire multi-timeline display 664a using focus 666. In other embodiments, the HMD can focus a subset of cards and/or timelines, such as, but not limited to, a single card, one, some, or all cards on a timeline, a column of cards across one or more timelines, a block of cards across multiple timelines, a single timeline, a group of timelines, or some other selection of cards and/or timelines, within multi-card display 664a using sub-focus 668.

As shown in FIG. 6C using expanded multi-timeline display 664b, the multi-timeline displays five timelines (TLs): timelines 670, 672, 674, 676, and 678. The multi-timeline display displays five cards for each of displayed timelines 670, 672, 674, 676, and 678. The timelines can be selected for display based on a type of object displayed in a card; e.g., a timeline having only photos, only photo bundles, only messages, only message bundles, only cards representing active applications. Additional criteria can be used to further select items for a timeline; e.g., for photo objects, some criteria can be: only photos taken before (or after) a predetermined date, within a date range, at a location, as part of a photo bundle, photos that were shared, photos that were shared and with one or more messages received in response, etc. Other criteria for photo objects and/or other types of objects are possible as well for selection in a timeline. For example, in scenario 650, all of the cards in timeline 670 represent photos in a photo bundle, all of the cards in timeline 672 represent photos taken in a given city location, and all of the cards in timeline 678 represent contacts that do not have associated photos/images.

The additional timelines presented can represent different user accounts associated with the HMD, for example, a first timeline could be cards generated by a user's work account, e.g., photos, events, contacts, email, messages, sent to or received by his/her work account, e.g., user@google.com. In this example, the HMD could be configured to allow access to multiple user accounts, such as the user's personal account, e.g. user@gmail.com; such that a second timeline accessible from the grid view could be cards generated by the user's personal account, e.g., photos, events, contacts, email, messages, sent to or received by his/her personal account. This way, the user can easily interact with the HMD via different profiles or personas, such as work or personal.

The timelines can be selected to be part or all of the main timeline; for example, FIG. 6C shows that timeline 674 includes five cards selected from main timeline 660. Cards can be selected from main timeline 660 randomly, based on focus 662, based on a type of object represented on the main timeline; e.g., select only cards representing active applications visible from the main timeline, and/or based on other criteria. For example, in scenario 650, timeline 674 includes card 660a, which was the focused-on card prior to clutch 680, and the two cards on each side of card 660a in main timeline 660. Other criteria for selecting cards from a main timeline are possible as well.

One or more timelines can act as contextual menu(s) for multi-timeline display 664a, including possible operations that can be performed from multi-timeline display 664a, operations on multi-timeline display 664a, and/or other operations. For example, timeline 678 includes a menu of operations including navigate, take a video, take a photo, remove a timeline option, and add a timeline. Other operations are possible as well. For example, if clutch is engaged from card 660a in main timeline 660, the multi-timeline display 664a could present a contextual menu of operations that could be executed based off of the presently selected card 660a, e.g. share this card, delete the card, remove from timeline, add to bundle, etc.

In one embodiment, the wearer of the HMD can navigate around multi-timeline display 664a, 664b using head movements. For example, in scenario 650, the HMD is configured to display sub-focus 668, shown as a dotted line on both multi-timeline displays 664a and 664b, shown focusing on a single timeline; e.g., timeline 668.

In one example of scenario 650, "wrap-around" movements, or moving off the end of a row or column to the respective other end of the row or column, are enabled. Then, in response to respective movements upward, downward, leftward, or rightward by the head of the wearer, the sub-focus 668 can move from timeline 674, as shown in FIG. 6C, to respective timelines 672, 676, 672, or 676. In particular embodiments, wrap-around can be inhibited, so moving the head of the wearer leftward will not move sub-focus 668 from timeline 674 to timeline 672 and moving the head of the wearer rightward will not move sub-focus 668 from timeline 674 to timeline 676 but rather sub-focus 668 will stay on timeline 674 in response to either the leftward or the rightward movement.

In some embodiments, in response to respective movements diagonally up-and-left, up-and-right, down-and-left, and down-and-right by the head of the wearer with wrap-around enabled, the sub-focus 668 can move from timeline 674, as shown in FIG. 6C, to respective cards 672, 672, 676, and 676. In particular embodiments, wrap-around can be inhibited, but as each of the diagonal movements has an up or down components, movement to a respective timeline will succeed when sub-focus 668 is on timeline 674.

In some embodiments, sub-focus 668 may not be used. For example, in these embodiments, a leftward head movement can move each of timelines 670, 672, 674, 676, 678 to the left on multi-timeline display 664b by one or more cards and a rightward head movement can move each of timelines 670, 672, 674, 676, 678 to the right on multi-timeline display 664b by one or more cards. Also in these embodiments, an upward head movement can bring a time "above" timeline 670 (not shown in FIG. 6C) into view as a top-most timeline on multi-timeline displays 664a and 664b, move down each of timelines 670, 672, 674, 676 by one time line on multi-timeline displays 664a and 664b, and remove timeline 678 from view. Further, an upward head movement can bring a time "below" timeline 678 (not shown in FIG. 6C) into view as a bottom-most timeline on multi-timeline displays 664a and 664b, move up each of timelines 672, 674, 676, 678 by one timeline on multi-timeline displays 664a and 664b, and remove timeline 670 from view.

Other types of head movements and/or UI operations can be used as well or instead with multi-timeline display 664a, 664b, including but not limited to head movements and/or UI operations that move the focus faster than and/or slower than one timeline at a time, enable navigation of cards within a timeline, which can include some or all of the navigation techniques discussed above regarding multi-card displays 634a and 634b, zooming in and out, reshaping sub-focus 668, selecting card(s)/timeline(s), and deselecting card(s)/timeline(s).

Scenario 650 continues with clutch 680 being released while sub-focus 668 is on timeline 670. After clutch 680 is released, the HMD can use a single-card view to display a card on selected timeline 670.

Figure 7:
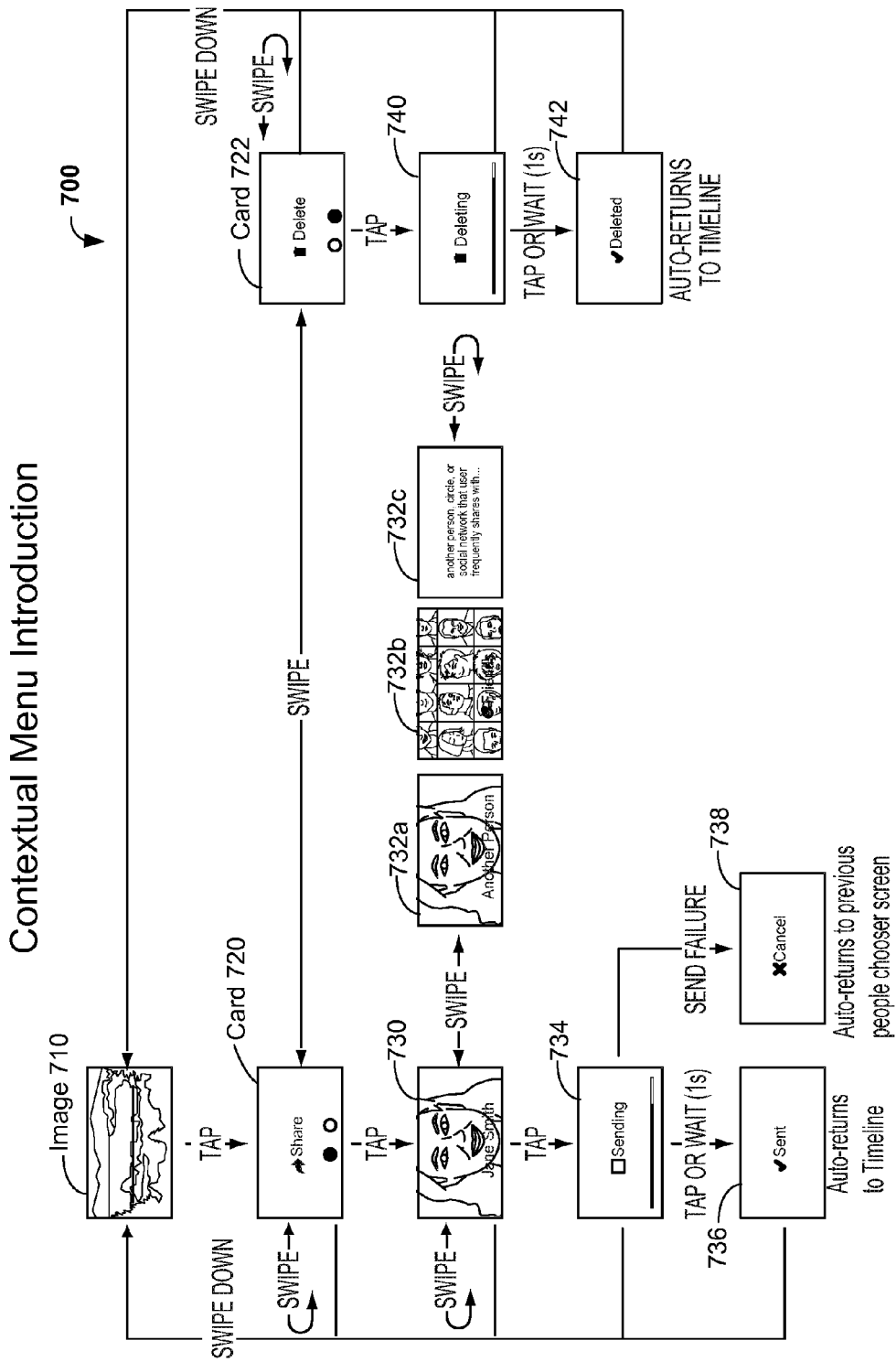
FIG. 7 shows a user-interface scenario including contextual menus, according to an example embodiment.

The user interface can use contextual menus to designate operations for specific objects, applications, and/or cards. FIG. 7 shows user-interface scenario 700 including contextual menus, according to an example embodiment. A contextual menu is a menu of operations or other possible selections based on a card. In some instances, a contextual menu may be based on the content provided by the card or a content type of the card. For example, if the card includes video content, a contextual menu can include operations such as sharing the video, editing the video, watching the video, deleting the video, adding the video to a "video bundle" or collection of videos, annotating the video, adding, deleting and/or editing sound associated with the video, and/or other operations related to the video, including but not limited more or fewer options.

Scenario 700 begins with the HMD receiving a tap while displaying image 710. In some embodiments, image 710 is part of a timeline. In response to the tap, the HMD can select operations for a contextual menu, such as sharing and deleting the photo, based on the displayed card; e.g., image 710. To display the contextual menu, the HMD can then display card 720 to indicate that a share operation can be performed on image 710. Card 720 also shows two dots to indicate that the current contextual menu has two options, with the leftmost dot being black and the rightmost dot being white to indicate that the current Share option is the first option of the two options.

To select the other option in the contextual menu, a wearer can perform a swipe operation while card 720 is displayed. In response to the swipe operation, card 722 can be displayed, where card 722 is associated with a delete operation for image. As with card 720, card 722 shows two dots to indicate that the current contextual menu has two options, with the leftmost dot being white and the rightmost dot being black to indicate that the current Delete option is the second option of the two options. A swipe operation while displaying card 722 causes (re)display of card 720.

If a tap operation is received while displaying card 720, the HMD can interpret the tap operation as selection of the Share option of the contextual menu. In response, a "people chooser" can be used to select a first person for sharing.

The people chooser can display card 730, which includes an image and a name of a first contact. FIG. 7 shows that card 730 indicates the first person as "Jane Smith." In response to viewing card 730, the wearer can instruct the people chooser to show other possible recipients of photo 710 via swiping through a list of contacts. In scenario 700, the list of contacts can be represented by cards that include: card 732*a* showing "Another Person," card 732*b* showing "Friends," and card 732*c* indicating other person(s), circle(s), and/or social network(s) for sharing photos. People choosers are also discussed in more detail at least in the context of FIG. 8.

FIG. 7 shows that swiping left while card 732*c* is displayed to request a next possible recipient can lead to re-displaying card 730 associated with Jane Smith. Similarly, FIG. 7 shows that swiping right while card 730 is displayed to request a previous possible recipient can lead to card 732*c*.

In scenario 700, the wearer taps on the touch-based UI while card 730 is displayed, indicating that the wearer wishes to share image 710 with Jane Smith. In response to this tap, card 734 is displayed, which includes the word "Sending" and a progress bar. In scenario 700, the HMD is configured to wait for a "grace period," such as one or a few second(s), before carrying sending or deleting images, to give the wearer a brief interval to cancel sending or deleting the image.

The progress bar on card 734 can show the passing of the time of the grace period for sending image 710. Once the grace period expires or a tap is received, the HMD can send image 710, e.g., via e-mail or multi-media message, to Jane Smith. If image 710 is sent successfully, the HMD can display card 736 with text of "Sent" to indicate that image 710 was indeed successfully sent to Jane Smith. After displaying card 736, the HMD can return to a timeline display, such as discussed above in the context of at least FIG. 5A.

If image 710 is not sent successfully or was cancelled, such as by the wearer performing a swipe down operation during the grace period, the HMD can display card 738 to indicate to the wearer that the HMD was unsuccessful in sending image 710 sent to Jane Smith. After displaying card 738, the HMD can return to a timeline display, such as discussed above in the context of at least FIG. 5A.

If a tap operation is received while displaying card 722, which FIG. 7 shows is the "Delete" card, the HMD can interpret the tap operation as selection of the Delete option of the contextual menu. In response to this tap, the HMD can display card 740 with text of "Deleting" and a progress bar for a grace period that has to expire before the HMD will delete image 710. Once the grace period expires or a tap is received, the HMD can delete image 710. Once image 710 is deleted, the HMD can display card 742 to indicate to the wearer that image 710 was indeed deleted. After displaying card 742, the HMD can return to a timeline display, such as discussed above in the context of at least FIG. 5A.

FIG. 7 also shows that at any time while displaying cards 720, 722, 730, 732*a*-732*c*, 734, 736, 740, and 742, a swipe down operation can be performed. In response, the HMD can stop the current operation; e.g., send or delete, and return to displaying image 710.

Figure 8:
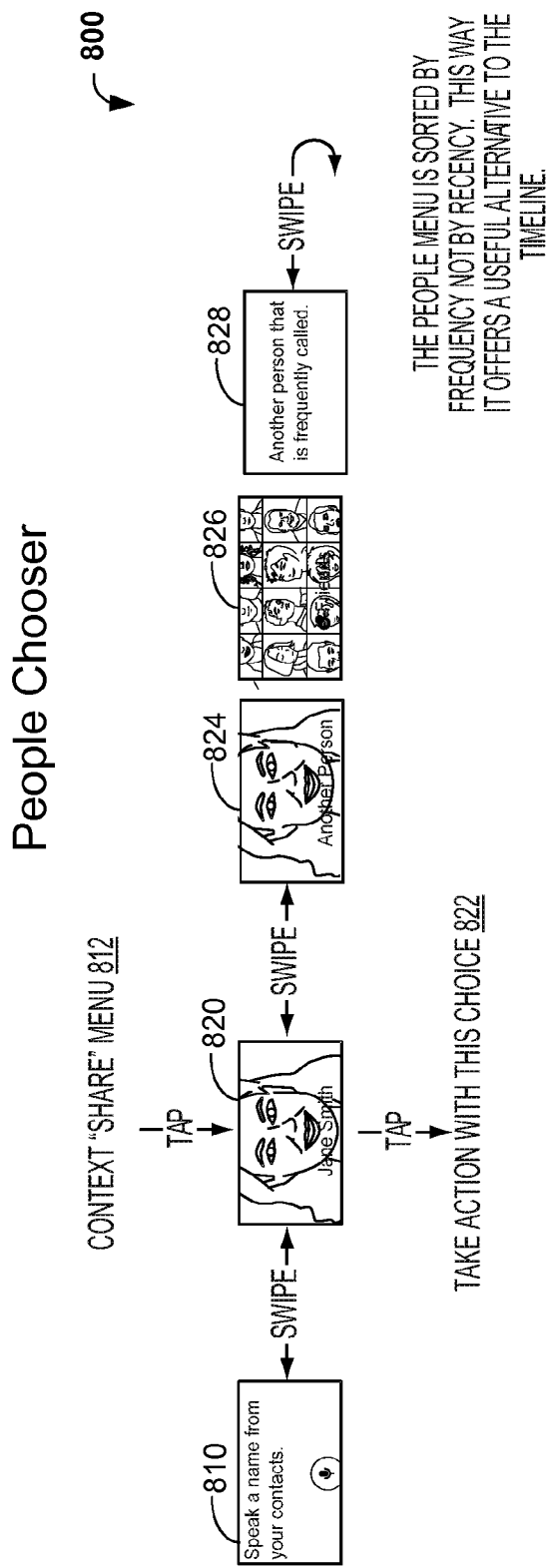
FIG. 8 shows a user-interface scenario including a people chooser, according to an example embodiment.

The UI can utilize "people choosers" or software configured to help a wearer find a person from among the wearer's contacts, such as when the wearer wants to contact that the person. FIG. 8 shows a user-interface scenario 800 including a people chooser, according to an example embodiment. In scenario 800, two techniques are shown for invoking the people chooser. While card 810 is displayed, a wearer of an HMD can use a voice interface that requests that the wearer "Speak a name from your contacts." Also or instead, at 812, the HMD can be in a contextual menu with a "Share" option that is selected.

After either card 810 or 812 is displayed, the people chooser is invoked to permit selection of a person or "contact" as a destination for sharing, being called, looked up in a contact directory, or some other activity. The people chooser sorts contacts by frequency of use, rather than by time of use; e.g., recently chosen contacts, to be a useful alternative to the timeline.

FIG. 8 shows that card 820 is selected for display by the people chooser. Card 820 represents "Jane Smith." In scenario 800, Jane Smith is the most frequently used contact. Card 820 includes the contact's name, Jane Smith, and an image related to the contact, e.g., a picture of Jane Smith. After reviewing the card shown at 820, the wearer of the HMD can either tap or swipe the touch-based UI to select "Jane Smith" as the person selected for the activity; e.g., sharing, calling, etc., that can lead to invocation of the people chooser.

If a tap is received while card 820 is shown, the HMD can then take action 822 with the choice. If a swipe is received while card 820 is displayed, then another card can be displayed for a next-most recent contact; e.g., card 824 for "Another Person." To select "Another Person" for the action while card 824 is displayed, a wearer can either tap the HMD using the touch-based UI or say the person's name, e.g., "Another Person," using the voice-based interface. If "Another Person" is selected, the HMD can carry out the action with "Another Person."

Otherwise, "Another Person" is not selected. Then, the wearer can swipe again, and another card can be displayed for a group of contacts, such as card 826 for "Friends." To select a "Friend" for the action while card 826 is displayed, a wearer can either tap the HMD using the touch-based UI or say the person's name, e.g., "Friend," using the voice-based interface. If the "Friends" group is selected, the HMD can provide cards in the "Friends" group in response to swipe actions until either a contact in the "Friends" group is selected or the "Friends" group is exhausted without the wearer making a selection. Each item in the "Friends" group, or friend, can be a contact or other representation of a person, organization, group, family, etc. that the wearer has designated as a friend. In one embodiment, the "Friends" group can be a bundle or folder that enables access to the items or friends within the bundle or folder. In one embodiment, the "Friends" group can be a group of friends ordered based on time of friend designation, most recent access, or by some other criteria.

Otherwise, "Friends" are not selected. Then, the wearer can swipe while card 826 is displayed to bring up card 828, representing another contact frequently called by the wearer. Scenario 800 can continue with swipes that show contacts until either a contact is selected or until all contacts have been displayed. If all contacts have been displayed, after displaying the last selected contact, the HMD can "wrap-around" or return to the first selected card; e.g., card 820 representing "Jane Smith."

Figure 9:
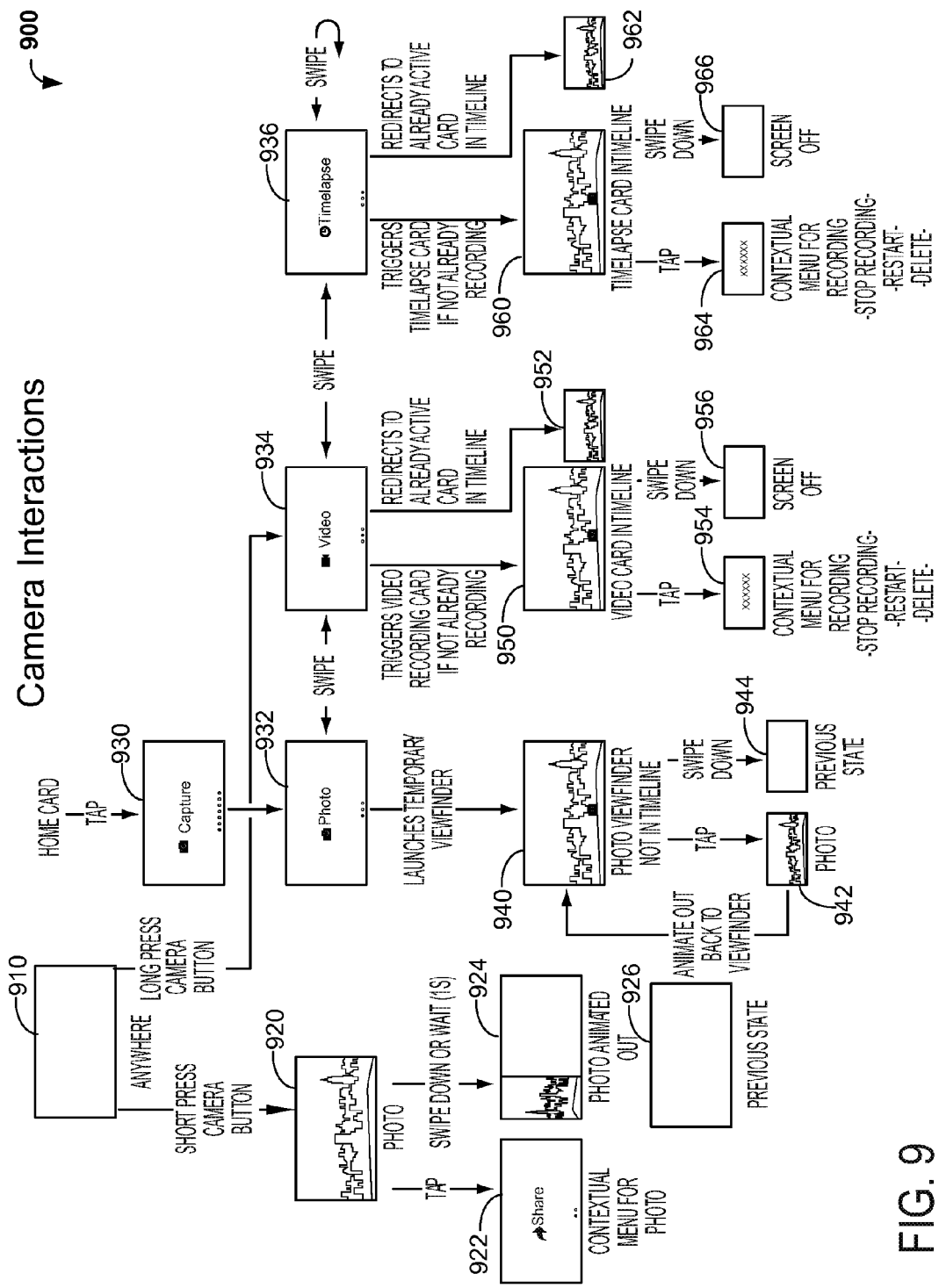
FIG. 9 shows a user-interface scenario with camera interactions, according to an example embodiment.

As mentioned above, the HMD can be configured with a camera, and the UI can aid wearer interaction with the camera. FIG. 9 shows a user-interface scenario 900 with camera interactions, according to an example embodiment. Scenario 900 can begin by displaying card 910 or card 930 for an HMD configured with one or more cameras that can perform at least the activities described herein.

While displaying card 910, at any point while utilizing the UI of the HMD, the camera button; e.g., button 179 of HMD 172 shown in FIG. 1D, can be pressed for either a short time; e.g., less than one second, or a long time; e.g., longer than the short time. If the camera button is pressed for the short time, also referred to as a "short press" of the camera button, scenario 900 continues by displaying card 920. Otherwise, if the camera button is pressed for the long time, also referred to as a "long press" of the camera button, scenario 900 continues by displaying card 934.

In response to the short press of the camera button, a photo or still image is captured using the camera—an example image capture is shown as card 920. If, after capturing the photo, a tap is received, scenario 900 continues by displaying card 922; otherwise, if either a swipe down is received or no interaction with the touch-based UI is recorded during a wait interval; e.g., one second, scenario 900 continues by displaying card 924.

Card 922 is part of a contextual menu with options for operating on the captured photo. The contextual menu can include options such as a share option for the captured photo; e.g., as indicated by the "Share" card shown at 922, a delete option for the captured photo, and other options for the captured photo (e.g., editing the photo).

Card 924 shows the captured photo as "animated out"; that is, the image of the captured photo is replaced with a blank card shown as card 926 via an animated transition. After displaying card 926, the HMD can return to a previous state; e.g., a position in the timeline being displayed at 910 before receiving the short press of the camera button.

After displaying a home card, such as card 300 shown in FIG. 3, a tap can be received via the touch-based UI. In response to the tap, the HMD can display a "Capture" card, such as card 930. After displaying card 930, scenario 900 can continue with a display of card 932.

Card 932 is shown in FIG. 9 as a "Photo" card, indicating that to the wearer that a photo or still image can be captured using the camera. If a swipe is received while displaying card 932, scenario 900 can continue by displaying card 934; otherwise, scenario 900 can continue at 950.

Card 934 is shown in FIG. 9 as a "Video" card to indicate to the wearer that a video can be captured using the camera. If a swipe is received while displaying card 934, scenario 900 can continue by displaying card 936. In one embodiment, multiple camera operations can occur simultaneously; e.g., the HMD can perform some or all of recording video, capturing still images, capturing timelapse images, and conducting video conferencing at the same time. In more particular embodiments, the HMD can perform the multiple camera operations and/or multiple telephone operations simultaneously; e.g., the HMD can, while perform multiple camera operations, conduct one or more two-party or multi-party voice calls, dial one or more parties, have one or more voice calls on hold, forward one or more voice call, and other telephone operations.

Otherwise, the HMD can determine whether a new video session is to be started to capture the requested video or if a pending video session is to be rejoined. If the new video session is to be started, the HMD can trigger the camera to start recording images (if not already recording) and scenario 900 can continue by displaying card 950. If the pending video session is to be rejoined, the HMD can redirect to, or request display of, an already-existing card for the pending video session and scenario 900 can continue by displaying a card for the pending video session, shown in FIG. 9 as card 952.

Card 936 is shown in FIG. 9 as a "Timelapse" card to indicate to the wearer that a timelapse image can be captured using the camera. If, a swipe is received while displaying card 936, scenario 900 can continue by displaying card 932.

Otherwise, the HMD can determine whether a new timelapse session is to be started to capture the requested timelapse image or if a pending timelapse session is to be rejoined. If the new timelapse session is to be started, the HMD can trigger a timelapse card to start displaying a timelapse image being captured by the camera (if not already recording) and scenario 900 can continue by displaying card 960. If the pending timelapse session is to be rejoined, the HMD can redirect to an already-existing card for the pending timelapse session and scenario 900 can continue by displaying a card for the pending timelapse session, shown in FIG. 9 as card 962.

Upon displaying card 940, the HMD can launch a temporary view finder and instruct the camera to begin capturing images. Upon capturing each image, the HMD can display the image. While displaying the image, the wearer can either (a) provide a tap to the HMD and scenario 900 can continue by displaying card 942 or (b) provide a swipe down using the HMD and scenario 900 can continue by displaying card 944.

Upon displaying card 942, the HMD can capture an image using the camera. Once captured, the HMD can display the captured image for a short period of time; e.g., one or a few seconds. After displaying the captured image for the short period, scenario 900 can proceed to display card 940.

Upon displaying card 944, which is a blank card, any image for possible capture, e.g., card 940, animates out. In some embodiments, the camera can be deactivated after animating out the image, if no other application; e.g., video, is using the camera. After displaying card 944, the HMD can return to a previous state; e.g., a position in the timeline being displayed at 910 before reaching 944.

Card 950 can be a card representing the new video session. While the video session is active, the HMD can capture images and, in some embodiments, sound, and store the captured video. Upon capturing each image for the video session, the HMD can display the captured image using card 950, which represents the new video session. While displaying the images for the video session using card 950, the wearer can either (a) provide a tap to the HMD and scenario 900 can continue by displaying card 954 or (b) provide a swipe down using the HMD and scenario 900 can continue by displaying card 956.

Card 952 can be a card representing the pending video session. While the video session is active, the HMD can capture images, and in some embodiments, sound, and store the captured video. Upon capturing each image for the video session, the HMD can display the captured image using the card 952, which represents the pending video session. While displaying the images for the video session using card 952, the wearer can either (a) provide a tap to the HMD and scenario 900 can continue by displaying card 954 or (b) provide a swipe down using the HMD and scenario 900 can continue by displaying card 956.

Card 954 can represent a contextual menu with options for the captured video. The contextual menu can include options for the captured video, such as a stop recording option, restart recording option, delete video option, and other options.

Card 956 can be a blank card indicating to the wearer that the video session has terminated. In some embodiments, the captured video can be deleted after the video session is stopped, while in other embodiments, the captured video or audio video can remain in storage after the video session is stopped. In some embodiments, the camera can be deactivated if no other application; e.g., a timelapse photo capture, is using the camera. In other embodiments, after displaying the blank card, the HMD can return to a previous state; e.g., a position in the timeline being displayed using card 910 before card 956 was ever displayed.

Card 960 can represent the new timelapse session. While the new timelapse session is active, the HMD can capture images for addition to the timelapse image. Upon capturing each image for the timelapse session, the HMD can display image(s) related to the new timelapse session using card 960. While displaying card 960, the wearer can either (a) provide a tap to the HMD and scenario 900 can continue by displaying card 964 or (b) provide a swipe down using the HMD and scenario 900 can continue by displaying card 966.

Card 962 can represent the pending timelapse session. While the pending timelapse session is active, the HMD can capture images for addition to the timelapse image. Upon capturing each image for the timelapse session, the HMD can display image(s) related to the pending timelapse session using card 962. While displaying card 962, the wearer can either (a) provide a tap to the HMD and scenario 900 can continue by displaying card 964 or (b) provide a swipe down using the HMD and scenario 900 can continue by displaying card 966.

Card 964 can represent a contextual menu with options for the captured timelapse image. The contextual menu can include options for the captured timelapse image, such as a stop timelapse option, a timelapse frequency option, a restart timelapse option, and other options.

Card 966 can be a blank card that indicates to the wearer that the timelapse session has terminated. In some embodiments, the captured timelapse image can be deleted after the timelapse session is stopped, while in other embodiments, the captured timelapse image can remain in storage after the timelapse session is stopped. In some embodiments, the camera can be deactivated if no other application; e.g., video is using the camera. In other embodiments, after displaying the blank card, the HMD can return to a previous state; e.g., a position in the timeline being displayed using card 910 before card 966 was ever displayed.

Figure 10A:
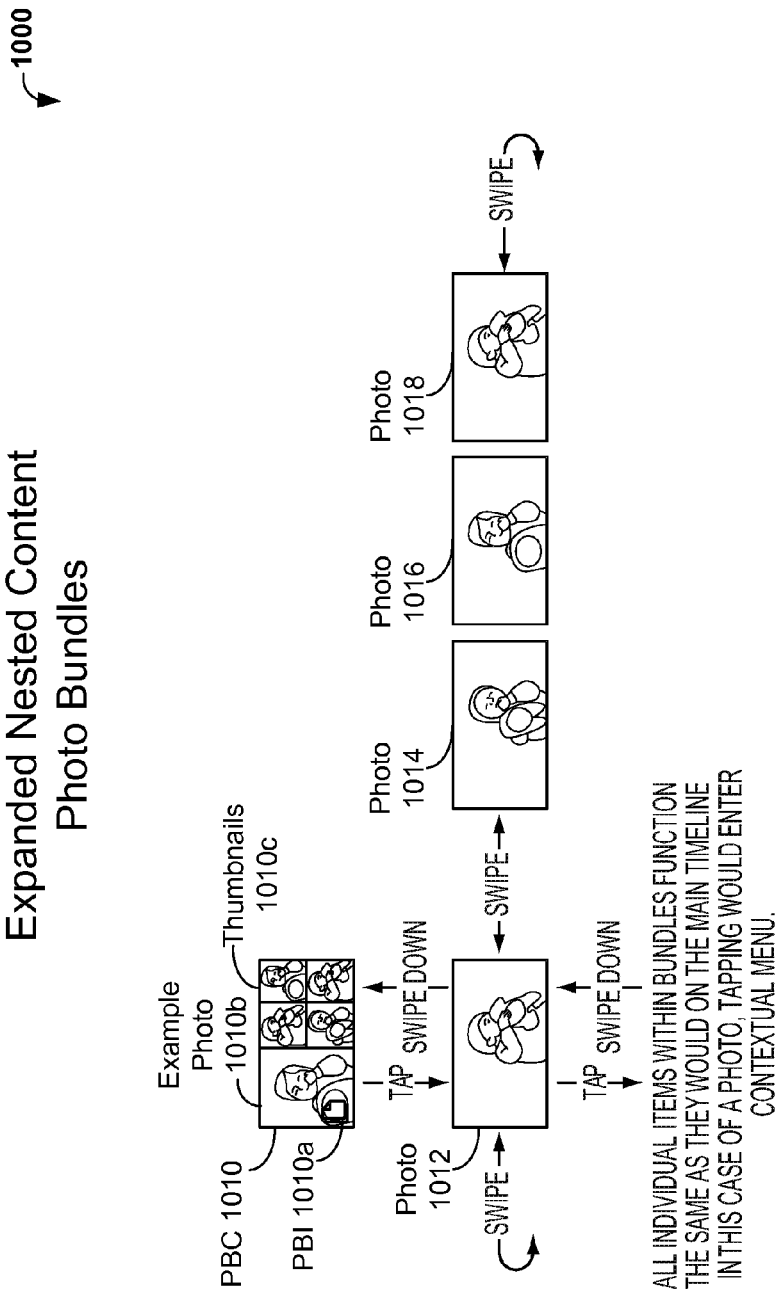
FIG. 10A shows a user-interface scenario with photo bundles, according to an example embodiment.

Objects, such as photos and messages, can be grouped or bundled by the UI to simplify interactions with these bundles. FIG. 10A shows user-interface scenario 1000 with photo bundles, according to an example embodiment. Scenario 1000 begins with an HMD displaying photo bundle card (PBC) 1010 in a timeline. Photo bundle card 1010 includes photo bundle indicator (PBI) 1010a, example photo 1010b, and thumbnails 1010c. Photo bundle indicator 1010a, shown in FIG. 10A as a page with a turned-down corner, indicates that a "photo bundle" or collection of photos is associated with photo bundle card 1010. Example photo 1010b, shown in FIG. 10A as occupying roughly one-half of photo bundle card 1010, provides a relatively large image of an example photo in the photo bundle. Thumbnails 1010c, shown in FIG. 10A as collectively occupying roughly one-half of photo bundle card 1010, provides four relatively small images of four example photos in the photo bundle.

While displaying photo bundle card 1010, the wearer of the HMD can tap on a touch-based UI to instruct the HMD to display the photos in the photo bundle. During scenario 1000, while displaying photo bundle card 1010, the HMD can receive a tap and subsequently display a card with photo 1012.

Each individual item within a bundle, e.g., a photo within a photo bundle, functions the same with respect to the user interface as it would if the item were displayed on the timeline. For example, in the case of a photo, such as photo 1012, tapping on the touch-based UI would enter a contextual menu for the photo, and swiping down while in the contextual menu would return to photo 1012.

While displaying photo 1012, the HMD can receive a swipe forward to display the next photo in the bundle or a swipe backward to display the previous photo in the bundle. In scenario 1000 as shown in FIG. 10A, the next photo can be photo 1014. As photo 1012 is the first photo in the bundle, the previous photo is the last photo in the bundle, or photo 1018.

During scenario 1000, the HMD receives a swipe backward while displaying photo 1012. In response to the swipe backward, the HMD can display photo 1018 as discussed above. Scenario 1000 continues with the HMD receiving two more swipes backwards. In response, the HMD can first display photo 1016 which is the previous photo to photo 1018, and, after receiving the second swipe backward, display photo 1014 which is the previous photo to photo 1016 as shown in FIG. 10A.

While displaying photo 1014, the HMD can receive a tap. In response to the tap, the HMD can display photo bundle card 1010 and scenario 1000 can end.

Figure 10B:
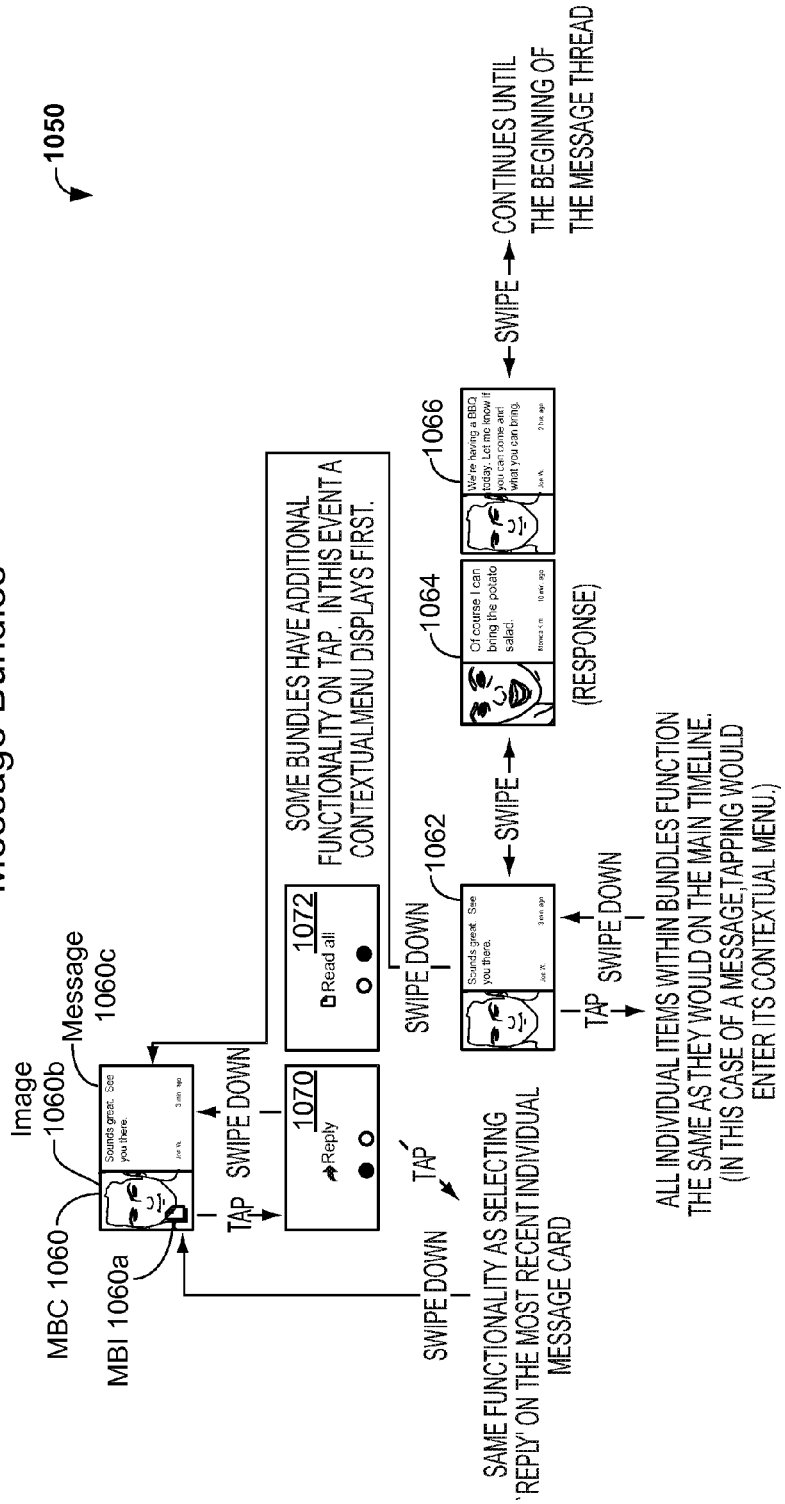
FIG. 10B shows a user-interface scenario with message bundles, according to an example embodiment.

FIG. 10B shows user-interface scenario 1050 with message bundles, according to an example embodiment. Scenario 1050 begins with an HMD displaying message bundle card (MBC) 1060 in a timeline. Message bundle card 1060 includes message bundle indicator (MBI) 1060a and a most-recent message in the message bundle, which includes image 1060b and message 1060c. Message bundle indicator 1060a, shown in FIG. 10B as a page with a turned-down corner, indicates that a "message bundle" or collection of messages is associated with message bundle card 1060. Image 1060*b* can be an image associated with the sender of the most-recent message in the message bundle. Message 1060*c* can include text, and in some embodiments, other type(s) of data, that is sent with the most-recent message in the message bundle. As shown in FIG. 10B, image 1060*b* occupies roughly one-third of message bundle card 1060, is an image of "Joe W." who sent message 1060*c*, which occupies roughly two-thirds of message bundle card 1060. Message 1060*c* includes text that says "Sounds great. See you there," and was sent three minutes ago.

In scenario 1050, while displaying message bundle card 1060, the wearer of the HMD can tap on a touch-based UI. Some bundles have additional functionality, specific to the bundle, associated with a tap. In the example of the message bundle, a contextual menu can be displayed in response to the tap. FIG. 10B shows two options in the contextual menu: a reply option associated with card 1070 and a read-all option associated with card 1072.

While card 1070 associated with the reply option is displayed, the HMD can receive a tap. In response, the HMD can interpret the tap as a selection to reply to the most recently displayed message card. While card 1072 associated with the read all option is displayed, the HMD can receive a tap, which can be interpreted to read the messages in the message bundle, starting with the most recent. In one embodiment, the HMD can start with the first message in the message bundle rather than the most recent. In response to receiving a swipe down while in the contextual menu for message bundles, the HMD can select message bundle card 1060 for display.

Each individual item within a bundle, e.g., a message within a message bundle, functions the same with respect to the user interface as it would if the item were displayed on the timeline. For example, in the case of a message, such as message 1062, tapping on the touch-based UI would enter a contextual menu for the message, and swiping down while in the contextual menu for the message would return to message 1062.

While displaying message 1062, the HMD can receive a swipe forward to display the next message in the bundle or a swipe backward to display the previous message in the bundle. In scenario 1050 as shown in FIG. 10B, the previous message can be message 1064. As message 1062 is the first message in the bundle, there is no "next" message, so the last message in the bundle, or message 1066, can be displayed instead.

During scenario 1050, the HMD receives a swipe forward while displaying message 1062. In response to the swipe forward, the HMD can display message 1066 as discussed above. Scenario 1050 continues with the HMD receiving two more swipe forwards. In response, the HMD can first display message 1064 which is the next message to message 1066, and, after receiving the second swipe forward, display message 1062, which is the next message to message 1064 as shown in FIG. 10B.

While displaying message 1062, the HMD can receive a tap. In response to the tap, the HMD can enter a contextual menu for message 1062 and scenario 1050 can end.

E. GROUPING OF CARDS BY TIME PERIODS AND CONTENT TYPES

Cards may be grouped by timeline grouping methods and algorithms. For illustration, consider a timeline grouping algorithm for a chess game application. In practice, a chess game may involve various moves made by a player and an opponent. In some instances, the player may be playing two separate games simultaneously against two different opponents. As such, a timeline of moves may illustrate the player's moves made against the first opponent and the player's moves made against the second opponent. Further, the timeline may group the player's moves made against the first opponent separately from the player's moves made against the second opponent. In addition, the player's moves made against the first opponent (e.g., three different moves) may be combined into one bundle card on the timeline. Further, the player's moves made against the second opponent (e.g., five different moves) may be combined into a separate bundle card on the timeline.

In addition, a timeline can include various types of content. For example, the timeline of moves described above may be expanded to also include cards representing past games played (e.g., the player versus previous opponents), different types of games played (e.g., checkers, backgammon, and cards), and even actions associated with the player (e.g., activities before each game). In some instances, the timeline may include cards related to the player's activities throughout a given time period. For example, a card may be added to the timeline for each activity the player is involved in throughout the day.

Cards associated with a timeline may be grouped by time. FIG. 11A shows a scenario with cards grouped on a timeline, according to an example embodiment. In particular, scenario 1100 illustrates timeline 1102 with cards provided side-by-side, possibly through an electronic display, such as an HMD. In some instances, an order for a plurality of cards may be determined. In particular, cards 1102*a*-1102*h* can be arranged in timeline 1102 with each card time-stamped such that each card is associated with a specific time. For example, cards 1102*a*-1102*h* may be chronologically ordered from left to right based on specific time-stamps for each card. In particular, the cards may be ordered based on the times when each card was added to timeline 1102. As such, card 1102*a* may have been created before any of cards 1102*b*-1102*h*, card 1102*b* may have been created after card 1102*a* and before card 1102*c*, card 1102*c* may have been created after card 1102*b* and before card 1102*d*, and so on.

In some embodiments, cards associated with the timeline may be grouped by a time period. In some instances, cards on a timeline may be grouped by multiple time periods. For example, cards on a timeline may be grouped by a past time period, a present/on-going time period possibly including the current time, and a future time period. As such, FIG. 11A illustrates timeline 1102 with cards 1102*a*-1102*h* grouped by a past time period 1102I, a present/on-going time period 1102J, and a future time period 1102K. In some embodiments, groups of cards may be referred to as "decks" of cards. For example, the groups of cards associated with timeline 1102 may also be referred to as past deck 1102I, present/on-going deck 1102J, and future deck 1102K.

As such, cards 1102*a*-1102*c* may be associated with past time period 1102I and may be referred to as being grouped in past deck 1102I. Further, cards 1102*d* and 1102*e* may be associated with present/on-going time period 1102J and may be referred to as being grouped in present/on-going deck 1102J. Yet further, cards 1102*f*-1102*h* may be associated with future time period 1102K and may be referred to as being grouped in future deck 1102K. In addition, card 1102*d* may be a home card illustrating the present time of 3:28. Card 1102*a* may represent a previous photo taken, perhaps captured during a specific time of 1:28, which 2 hours prior to the present time of 3:28 illustrated on card 1102*d*. Further, card 1102*h* may represent a scheduled flight that the user may be scheduled to board tomorrow at 7:09 p.m.

It should be noted that cards from one time period may move to another time period. In some instances, cards from present/on-going deck 1102J may move to either past deck 1102I or future deck 1102K. For example, cards from present/on-going deck 1102J may move to past deck 1102I after each day (e.g., 24 hours after the time each card is added to timeline 1102). Further, cards from present/on-going deck 1102) that are associated with a future time may move to future deck 1102K immediately after being viewed on timeline 1102 (e.g., after being shown on a display). For example, card 1102*h* may be in present/on-going deck 1102) when initially added to timeline 1102, providing flight information for "Flight VA 29" at "7:09 p.m." Since the calendar entry is associated with a future time (e.g., tomorrow at 7:09 p.m.), card 1102*h* may be moved from present/on-going deck 1102J to future deck 1102K immediately after being shown on timeline 1102. Yet further, cards from present/on-going deck 1102J may move to either past deck 1102I or future deck 1102K due to additional cards being added to timeline 1102, possibly due to cards crowding the view on a display. In addition, cards may move to either past deck 1102I or future deck 1102K due to the passage of time.

In some embodiments, a card may be associated with a content type. For example, an application of a card may be associated with at least one content type. As shown, timeline 1104 illustrates various content types provided by cards 1102*a*-1102*h* or by an application associated with the cards. In particular, timeline 1102 illustrates the following content types: an image content type for card 1102*a*, possibly captured by a camera associated with the HMD, a message content type for card 1102*b*, possibly received by an electronic messaging application of the HMD, and a phone call content type for card 1102*c*, possibly generated by a phone call application of the HMD.

In addition, other content types may include: a time content type for card 1102*d*, possibly providing the present time, and a camera content type for card 1102*e*, possibly capturing an image relative to the present time. Further, additional content types may include: a weather content type for card 1102*f*, possibly representing weather forecast information at a time two hours from the present time, an event content type for card 1102*g*, possibly representing a scheduled event for "Lunch with Monica Kim" in two hours, and as noted, a flight content type for card 1102*h*.

It should be noted that cards 1102*a*-1102*h* may have the similar content types as other cards described above (e.g., cards illustrated in FIGS. 5A, 5B, and 7) but may also have different content types as well. For example, there may be a content type for "settings" such that the HMD may be calibrated or initialized with appropriate configurations suitable for a wearer of the HMD. Yet further, sub-content types may be described herein. For example, "location" may include sub-content types for navigation, GPS tracking, and saved locations such as home, school, work, and/or landmarks such as the Golden Gate Bridge. Yet further, "events" may include sub-content types for activities/occasions such as sporting events, live hangout sessions, calendar events, and holidays, among other possibilities. Still further, "video" may include interactive video conferencing, video streaming including voice recordings and voice activation, and video uploads. Many other content types and sub-content types are possible as well.

To illustrate the grouping of cards by content type, cards may be represented by an associated content type. For example, timeline 1104 illustrates that each card of cards 1102*a*-1102*h* on timeline 1102 may relate to at least one content type. As such, past deck 1104A illustrates that the content of card 1102*a* includes an "Image (I)," the content of card 1102*b* includes a "Message (M)," and the content of card 1102*c* includes a "Phone call (P)." Further, present/on-going deck 1104B illustrates that the content of card 1102*d* includes a "Time (T)" and the content of card 1102*e* includes "Camera (C)" information. Yet further, future deck 1104C illustrates that the content of card 1102*f* includes "Weather (W)" information, the content of card 1102*g* includes "Event (E)" information, and the content of card 1102*h* includes "Flight (F)" information.

Further, to illustrate the grouping of cards by content type, cards may be represented by letters or symbols designating content types. For example, timeline 1106 illustrates the types of content identified from timeline 1104. In particular, timeline 1106 represents different content types using letters. For instance, timeline 1106 illustrates "I M P" in past deck 1106A to represent the cards in past deck 1104A with the content types of an "Image (I)," a "Message (M)," and a "Phone call (P)." Further, the "T C" in present/on-going deck 1106B represents the cards in present/on-going deck 1104B with the content types of "Time (T)" and "Camera (C)" information. Yet further, the "W E F" letters in future deck 1106C represent the cards of future deck 1104C with the content types of a "Weather (W)," "Event (E)," and "Flight (F)" information.

In some embodiments, cards in a group may be bundled or combined to determine a time-stamped bundle card. A time-stamped bundled card may also be referred to as a bundle card for simplicity. FIG. 11B shows scenario 1110 of bundling cards, according to an example embodiment. In particular, scenario 1110 illustrates a timeline 1112 representing cards with various types of content that may be provided by an HMD. Similar to timeline 1106 of FIG. 11A, timeline 1112 illustrates letters for representing cards by content type. For example, past deck 1112A includes one "I" representing one card with an image content type, one "M" representing one card each with a message content type, one "P" representing one card with the a phone call content type. In some instances, the image card, message card, and the phone call card of past deck 1112A may be combined into a bundle card on timeline 1112, possibly representing cards in past deck 1112A.

In some instances, cards may not be combined into a bundle card. For example, present/on-going deck 1112B includes cards T, C, and W, representing three cards with different content types of time, camera, and weather information, respectively. Since there is only one card for each content type, combining these cards may not be necessary. Further, future deck 1112C includes W, E, and F, representing three cards with content types of weather information, an event, and a flight. Since there is only one card for each content type, combining these cards may also not be necessary. However, it should be noted that the cards in future deck 1112C may be combined into a bundle card on timeline 112 to represent cards of future deck 1112A.

In some embodiments, cards may be grouped by time periods and/or corresponding decks of cards. Cards may also be placed into sub-groups possibly referred to as "stacks" of cards. For example, timeline 1114 is another timeline with additional cards represented. In particular, past deck 1114A may be organized with sub-groups or stacks of cards associated with periods of time represented by a "1 Year Ago" stack, a "1 Month Ago" stack, a "1 Week Ago" stack, and a "1 Day Ago" stack. Further, future deck 1114C may be organized with sub-groups associated with periods of time, such as an "In 1 Hour" stack, an "In 2 Hours" stack, a "Tomorrow" stack, and in "In 2 Days" stack. Although not illustrated in FIG. 11B for simplicity, the present/on-going deck 1114B may also include stacks such as a "Present Time" stack, a "Five Minutes Ago" stack, and/or an "In 5 Minutes" stack, among other possibilities.

In some embodiments, cards may be grouped by time periods and by content type. For example, the cards represented in past deck 1114A are grouped into the "1 Year Ago" stack, the "1 Month Ago" stack, the "1 Week Ago" stack, and the "1 Day Ago" stack, and further by content types represented by the letters of I, M, and P. Further, the cards represented in the future deck 1114C are grouped by the "In 1 Hour" stack, the "In 2 Hours" stack, the "Tomorrow" stack, and the "In 2 Days" stack, and are further grouped by content types represented by the letters W, E, and F.

It should be noted that the cards represented in the "1 Day Ago" stack of past deck 1114A may correspond to the same cards as shown in past deck 1112A. Further, the cards represented in present/on-going deck 1114B may correspond to the same cards as shown in present/on-going deck 1112B. Yet further, the cards represented in the "In 1 Hour" stack of future deck 1114C may illustrate the same cards as shown in future deck 1112C. As such, timeline 1112 may illustrate cards of timeline 1114 that may be displayed on an HMD at a given time.

In some embodiments, cards grouped by time periods may further be combined or bundled by content type. In some instances, cards grouped by time periods may be bundled to determine a bundle card. For example, timeline 1116 of FIG. 11B is yet another timeline with a representation of cards. In particular, timeline 1116 illustrates the representation of cards in timeline 1114 such that three or more cards of a given content type are bundled in their respective time periods. As such, bundling of cards may determine, establish, and/or create a corresponding bundle card. As such, timeline 1116 illustrates an example of a bundling threshold number of three cards with a given content type that may be used to bundle the cards for a given time period. It should be noted that a bundling threshold number may simply be referred to as a threshold number, a bundling threshold, and a bundling number, among other possibilities.

Considering cards in the "1 Year Ago" stack of past deck 1114A, there are at least three cards for each of the content types. Thus, these cards may be bundled by the respective I, M, and P content types. As such, each letter, I, M, and P, in the "1 Year Ago" stack of past deck 1116A appears in boldface letters indicating that at least three cards were bundled for each content type. As such, individual bundle cards replace the three or more cards for each content type. The cards with content types of I and M exceed three-card threshold but the fourth card for these content types may also be bundled in each respective bundle card as well. In other embodiments, the fourth cards for these content types may not be bundled in each respective bundle card and may be displayed separately as non-bundle cards.

Further, considering cards in the "1 Month Ago" stack of past deck 1114A, there are at least three cards for the I and M content types, but not for the P content type. Thus, the cards with I and M content types are bundled by content type. As such, both letters of I and M in the "1 Month Ago" stack of past deck 1116A appear in boldface letters indicating that at least three cards were bundled to create bundle cards for these content types. Since there are only two cards for the P content type, the two P cards are not bundled and are displayed separately as non-bundle cards.

Yet further, there are at least three cards for the I content type in the "1 Week Ago" stack of past deck 1114A. Thus, only these cards are bundled and the letter I in the "1 Week Ago" stack of past deck 1116A appears in bold indicating that at least three cards were bundled to create the bundle card for the I content type. Since there is only one card for the M content type and only two cards for the P content type, these cards are displayed separately as non-bundle cards. Additionally, for cards in the "1 Day Ago" stack of past deck 1114A, there is less than the threshold number of three cards for each content type. Thus, none of the cards are bundled and these cards are displayed separately as non-bundle cards in the "1 Day Ago" stack of past deck 1116B. Present/on-going deck 1114B includes letters T, C, and V, and since there are less than three cards for each content type, none of the cards are bundled and these cards are also displayed separately as non-bundle cards in present/on-going deck 1116B.

Further, considering cards of the "In 1 Hour" and "In 2 Hours" stacks of the future deck 1114C, there are less than three cards for each content type. As the number of cards for each content type is under the threshold number, none of the cards are bundled and these cards are displayed separately as non-bundle cards in respective stacks of future deck 1116C. For cards in the "Tomorrow" stack of the future deck 1114C, there are at least three cards for the E content type. Thus, the cards with the E content type in the "Tomorrow" stack of future deck 1116C are bundled. As such, the letter E appears in bold indicating that at least three cards were bundled to create the bundle card for the E content type. Since there are only two cards for the W content type, the two W cards are not bundled and are displayed separately as non-bundle cards.

In addition, for the "In 2 Days" stack of future deck 1114C, there is at least the threshold number of three cards for both the W and E content types. Thus, the cards for the W and E content types in the "In 2 Days" stack of future deck 1116C are bundled such that the letters W and E appear in bold. This indicates that at least three cards were bundled to create the bundle cards for the W and E content types. The cards with the E content type exceed the three-card threshold, but the fourth E card may also be bundled as well. In other instances, the fourth E card may not be bundled in its respective bundle card and may be displayed separately along with the non-bundled F card.

As mentioned above, cards in the same stack and of a given content type may be bundled if the number of cards meets or exceeds the threshold number. In the examples provided above for timelines 1114 and 1116, a threshold number of three cards for a given content type may result in bundling the cards. As illustrated in timeline 1114 of FIG. 11B, a threshold function 1118 may determine the threshold number of cards required for bundling cards. Threshold function 1118 is illustrated as a straight line for requiring the number of cards to meet or exceed a constant number of cards, e.g., three, for bundling the cards.

Threshold function 1118 may take other forms as well. For example, threshold function 1118 may take the form of a step function, applying a different threshold value for each stack. For instance, threshold function 1118 may require three cards of the same content type for bundling cards in the "1 Month Ago" stack and only two cards of the same content type for bundling cards in the "1 Year Ago" stack. In another example not shown in FIG. 11B, threshold function 1118 may require zero cards for present/on-going deck 1114B, indicating that cards are not bundled for present/on-going deck 1114B. Further, threshold function 118 may require three cards for each of the "1 Day Ago" and "In 1 Hour" stacks, four cards for each of the "1 Week Ago" and "In 2 Hours" stacks, eight cards for each of the "1 Month Ago" and "Tomorrow" stacks, and sixteen cards for each of the "In 2 Days" and "1 Year Ago" stacks.

As noted previously, cards may move from between decks with the passage of time. Further, cards may move from one stack to another stack with the passage of time. For example, cards from present/on-going deck 1114B may move to the "1 Day Ago" stack of past deck 1114A twenty-four hours after the cards were added to timeline 1114. Further, cards from the "1 Day Ago" stack may move to the "1 Week Ago" stack one week after the cards were added to timeline 1114. Yet further, cards from the "1 Week Ago" stack may move to the "1 Month Ago" stack one month after the cards were added to timeline 1114, and so on.

In some instances, cards may move from present/on-going deck 1114B to various stacks of future deck 1114C. In some instances, cards may move from present/on-going deck 1114B to one of the stacks in future deck 1114C immediately after the cards are added to timeline 1114. Yet, in some instances, cards may move to the stacks in future deck 1114C upon being viewed or focused on by a computing device such as an HMD. In addition, cards may move to the stacks in future deck 1114C after they are no longer viewable without scrolling through cards on the HMD due to additional cards being added to timeline 1114.

In some embodiments, cards moving from one group to another group may cause a threshold function to adjust the threshold numbers. For example, threshold function 1118 may change threshold numbers as timeline 1114 accumulates more cards. In particular, more cards may be added to the "1 Year Ago" stack and the "In 2 Days" stack. In some instances, the "1 Year Ago" stack may also include cards that were created more than one year ago. Further, the "In 2 Days" stack may include cards that are associated with future times more than two days from the present time. Thus, as the number of cards in the stacks increase, threshold function 1118 may increase or decrease threshold numbers for these stacks.

Further, in some instances, threshold function 1118 may change threshold values depending on content type. For example, the "1 Year Ago" stack shown in timeline 1114 may accumulate several image cards but very few message cards. As such, threshold function 118 may maintain the three-card threshold number for image cards but reduce the threshold number for message cards to a two-card threshold number. It should be understood that threshold function 1118 may also be based on an algorithm, an equation, and/or take the form of a function, such as a logarithmic function, for example. Further examples of threshold functions are also described for FIG. 11D.

It should be noted that the grouping methods described herein may bundle cards for various timelines, regardless of the length of the timeline and/or the number of cards on the timeline. In practice, perhaps related to initialization of the timeline, some timelines may contain a couple cards or a few cards. Nonetheless, a threshold function may adjust thresholds according to each timeline and determine threshold numbers based on the number of cards on the timeline. In some instances, the threshold function may have high threshold numbers for timelines with a lower number of cards (e.g., 10-15 cards). However, the threshold function may reduce threshold numbers for timelines with a high number of cards (e.g., 50-100 cards). In addition, the dynamic features of the threshold function may facilitate data storage of the timeline.

Data may be stored in accordance with a timeline. FIG. 11C illustrates data capacity of a timeline, according to an example embodiment. In some embodiments, data capacities may be illustrated for each time period. As demonstrated in FIG. 11C, data capacities for each time period may vary in size. For example, the data capacity illustrated for present/on-going time 1122, yesterday/tomorrow 1124, and last week/next week 1126 appear nominal compared to the data capacity for last month/next month 1128.

In some embodiments, the data capacity and/or usage associated with each time period may vary according to the length of each time period. For example, the bars illustrated in FIG. 11C may represent the data capacity for storing cards in each time period. In some instances, data capacity associated with a timeline may substantially increase as illustrated from present/on-going deck 1122 to yesterday/tomorrow deck 1124. Additional increases in data capacity may be illustrated by comparing the data associated with yesterday/tomorrow deck 1124 to last week/next week deck 1126. Yet further, a greater increase in data capacity as time increases may be demonstrated by comparing the data associated with last week/next week deck 1126 to last month/next month deck 1128. In some instances, such increases in data may be attributed to the number of cards that may be associated with each time period.

In some embodiments, data storage capacity for each time period may vary according to the size of each time period. For example, the bars illustrated in FIG. 11C may represent the storage capacity of data for each time period. As such, present/on-going card deck 1122 may have the smallest storage capacity for data, followed by the yesterday/tomorrow deck 1124. Further, the last week/next week deck 1126 may have the next largest storage capacity for data, followed by largest storage capacity for last month/next month deck 1128.

In some instances, when the data storage of present/on-going deck 1122 reaches its maximum data capacity, cards associated with present/on-going deck 1122 may be moved to yesterday/tomorrow deck 1124. Further, when the data storage of yesterday/tomorrow deck 1124 reaches its maximum data capacity, cards associated with yesterday/tomorrow deck 1124 may be moved to last week/next week deck 1126. Similarly, cards associated with last week/next week deck 1126 may be moved to last month/next month 1128. Therefore, last month/next month 1128 may have the largest storage capacity due the additions of cards over time.

In some instances, storage capacities may vary in accordance with individual cards moving between card decks or stacks. As noted, cards in present/on-going deck 1122 may be moved to in yesterday/tomorrow deck 1124 on a daily basis (e.g., twenty-four hours after the time a card is added to a timeline). Further, cards from yesterday/tomorrow deck 1124 may be moved to last week/next week deck 1126 also on a weekly basis. Yet further, cards from last week/next week deck 1126 may be moved to last month/next month deck 1128 on a monthly basis. As indicated, numerous cards may be accumulated in the last month/next month deck 1128, utilizing a larger data capacity than the other card decks. Therefore, storage capacities in accordance with the time periods may change (e.g., storage may be allocated and/or reallocated) to store cards moving between and into individual card decks.

It should be noted that some cards (e.g., the data of present/on-going deck 1122 and yesterday/tomorrow deck 1124) may be stored in non-transitory computer-readable media (e.g., register memory, processor cache, and/or random access memory (RAM)). Further, the computer readable media may also include non-volatile non-transitory computer readable media. For example, flash memory, writable read-only memory (ROM), and/or magnetic media may be used to store some cards (e.g., data of last week/next week deck 1126 and last month/next month deck 1128). In some instances, all data associated with the card decks may be stored using on-board data storage (e.g., memory 218 from FIG. 2A) and the on-board data storage may be allocated according to varying storage capacities due to cards moving between card decks and/or stacks. In other instances, some or all cards can be stored using off-board storage devices not resident on the HMD. Other possibilities may also exist.

Figure 11D:
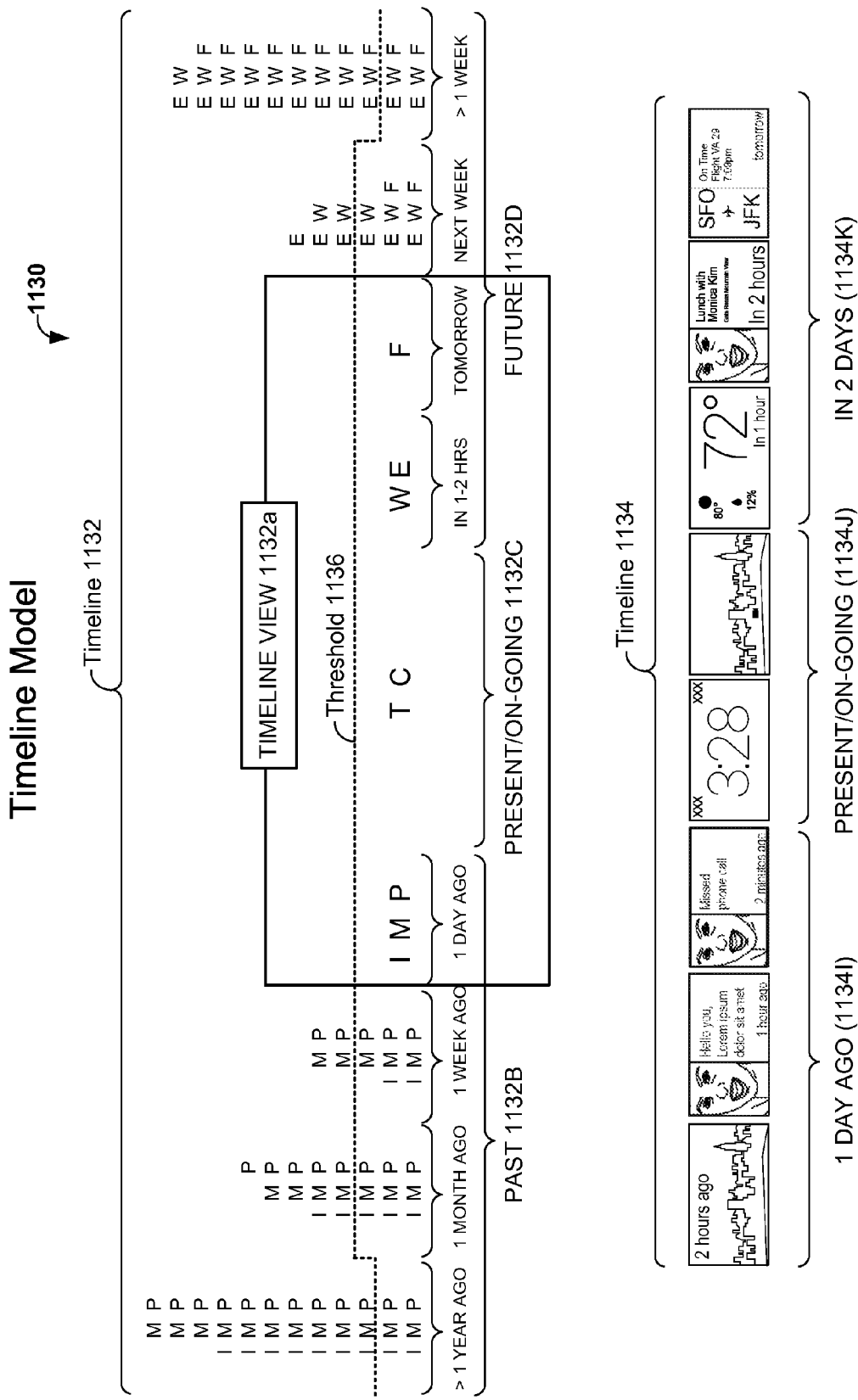
FIG. 11D shows a scenario with cards grouped on a timeline and the timeline as provided by an HMD, according to an example embodiment.

In some embodiments, the number of cards grouped for a given time period may depend on or vary with the duration between the present/on-going time period and the given period. In some instances, the frequency of grouping cards into bundle cards may vary with the duration between the present time and the first time period. In particular, the number of cards grouped may increase proportionally with an increase in the duration between present time and the given time period. FIG. 11D shows a scenario with cards grouped on a timeline and the timeline as provided by an HMD, according to an example embodiment. In particular, scenario 1130 illustrates timeline 1132 with past deck 1132B, present/on-going deck 1132C, and future deck 1132D.

As illustrated, time periods that are a longer duration away from present/on-going time period 1132C may have more cards than time periods closer to present/on-going time period 1132C. For example, the ">1 Year Ago" time period is the longest duration away from present/on-going time period 1132C. As such, the ">1 Year Ago" stack includes more cards than any other stack illustrated in FIG. 11D. Further, the "1 Month Ago" stack is the second farthest away from the present/on-going time period 1132C and the "1 Month Ago" stack has more cards than the "1 Week Ago" stack or the "1 Day Ago" stack.

Further, time periods in future time 1132D that are longer durations away from present/on-going time period 1132C may also have more cards than time periods that are closer to present/on-going time period 1132C. For example, the ">1 Week" time period is the longest duration away from present/on-going time period 1132C than the other time periods of future time period 1132D. As such, the ">1 Week" stack includes more cards than any other stack illustrated in future stack 1132D. Further, a decrease in the number of cards for each stack is illustrated when moving from the ">1 Week" stack to the "In 1-2 Hrs" stack.

In some embodiments, the number of cards bundled in a given time period may increase proportionally based on the duration between the present/on-going time period and the given time period. For example, considering the past time period 1132B, the number of cards bundled in the ">1 Year Ago" stack will be greater than the other stacks of the past time period 1132. Alternatively, the number of cards bundled for the ">1 Week" stack will be greater than the other stacks in the future time period 1132D. In some instances, threshold function 1136 and/or 1118 may determine the threshold numbers for the number of cards required to combine cards.

In some instances, different threshold numbers may be applied to cards in time periods a given duration away from the present/on-going time period. In some instances, threshold numbers may be based on these durations between the present/on-going time period and other time periods. For example, threshold function 1136 may apply a different threshold number for the ">1 Year Ago" stack (e.g., a two-card threshold number) than the "1 Month Ago" stack (e.g., a three-card threshold number), for example. In other examples, threshold function 1136 and/or 1118 can be expressed by an equation. For instance, threshold function 1136 and/or 1118 may be expressed by one or more of the following expressions:

$$T(\text{stack}) = k1(\text{stack}) * \text{diff}(\text{stack}),$$

$$T(\text{stack}) = k2(\text{stack}) * N(\text{stack}), \text{ and}$$

$$T(\text{stack}) = k3(\text{stack}) * (N(\text{stack}) / \text{diff}(\text{stack})).$$

The variables above may be defined by the following expressions:
T(stack) is the threshold number for a given stack,
k1(stack), k2(stack) kn(stack) are functions or constants, possibly for determining proportionality values for each stack,
diff(stack)=duration or difference between the present/on-going time period and the time period corresponding to the stack, and
N(stack)=number of cards in the stack.

It should be noted that other variables, constants, linear equations, non-linear equations, as well as other types of functions can be used in determining threshold function 1136 and/or 1118.

In some embodiments, the probability of a card being included in a group may be determined. For example, the probability of one card associated with past time 1132B being included in the "1 Day Ago" stack may be greater than the probability of one card associated with present/on-going time 1132C being included in the "1 Day Ago" stack. Further, consider two cards in present/on-going deck 1132C: The cards represented by the "T" and "C" where card T is associated with a future time in future time 1132D, e.g., upon creating a future calendar event associated by card T. As such, card T has a greater probability than card C of being included in future deck 1132D, possibly after an intervening time period.

In some embodiments, a card may be associated with more than one time on a timeline. In such instances, the card may be grouped into more than one group on the timeline. Further, in some instances, the probability of the card being grouped may be determined. For example, consider a scenario with two cards: Card A and card B. Card A may be associated with past time 1132B and future time 1132D (e.g., the card was added to timeline 1132 during a time associated with past time 1132B and relates to an event in future time 1132D). Card B may be associated with present/on-going time 1132C and future time 1132D (e.g., card B was recently added to the timeline and relates to an event in future time 1132D). When grouping cards for past deck 1132B, card A may have a greater probability than card B of being grouped in past deck 1132B. Further, Card B may have a greater probability than card A of being grouped in present/on-going deck 1132C. Yet further, card A and card B may have equal probabilities of being in grouped in future deck 1132D.

In some embodiments, bundle cards may be outside the view of a timeline. In some instances, the HMD may display the present/on-going time period and time periods near the present/on-going time period, excluding bundle cards in time periods a given duration away from the present/on-going time period. For example, in FIG. 11D, timeline view 1132a may correspond to timeline 1134 as displayed on an HMD. In particular, timeline 1134 may be displayed on the HMD without further instructions by the wearer to view other cards on timeline 1134. Thus, cards of the "1 Day Ago"

stack, the present/on-going deck 1132C, the "In 1-2 Hrs" stack, and the "Tomorrow" stack of timeline 1132 are displayed in timeline view 1132a. However, cards in the ">1 Year Ago" stack, "1 Month Ago" stack, "1 Week Ago" stack, "Next Week" stack, and the ">1 Week stack" may not be part of timeline view 1132a and may not be displayed on timeline 1134.

As illustrated in FIG. 11D, the cards of the "1 Day Ago" stack are displayed in timeline 1134 as cards in the "1 Day Ago" deck 1134I. Further, cards in present/on-going deck 1132C are displayed as cards in present/on-going deck 1134J. Yet further, cards in the "In 1-2 Hrs" stack and the "Tomorrow" stack are displayed as cards in the "In 2 Days" deck 1134K. The particular arrangements shown in the FIGS. 11A-11D should not be viewed as limiting. It should be understood that other embodiments can include more or less of each element shown in a given figure. Further, some of the illustrated elements can be combined or omitted. Yet further, an example embodiment can include elements that are not illustrated in the figures.

Figure 11E:
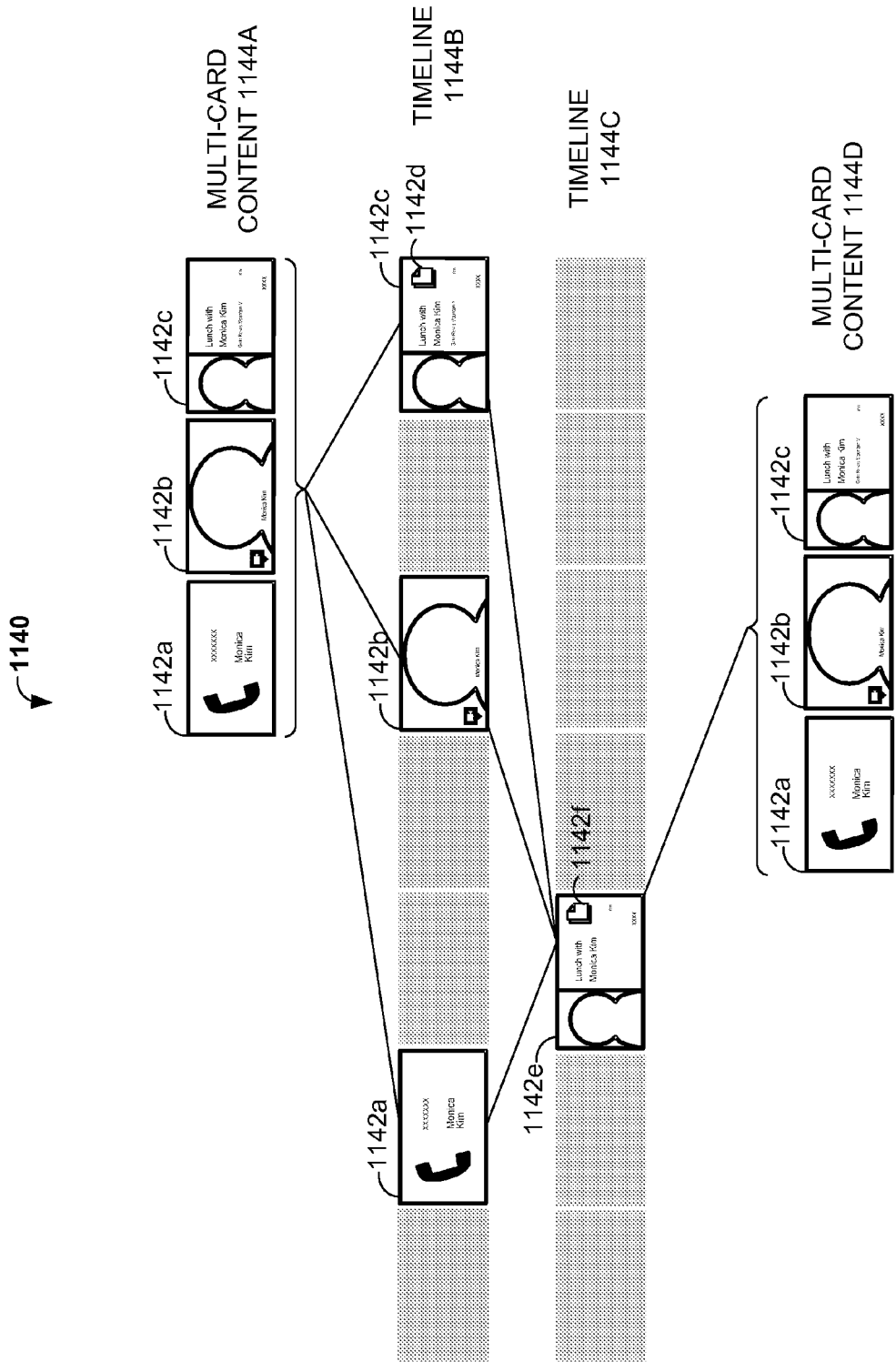
FIG. 11E shows a scenario of a timeline with groups of cards available on the timeline, according to an example embodiment.

In some embodiments, bundle cards and other cards may be simultaneously viewed on a timeline. FIG. 11E shows a scenario of a timeline with groups of cards available on the timeline, according to an example embodiment. In scenario 1140, cards 1142a, 1142b, and 1142c may be provided on timeline 1144B through a computing device with a viewable display, such as an HMD. In particular, card 1142a may be associated with a past time period, card 1142b may be associated with a present/on-going time period, and 1142c may be associated with a future time period. In some instances, cards 1142a, 1142b, and 1142c may be spread out along timeline 1144B such that all three cards are not visible at any given time when viewing timeline 1144B through the HMD. More specifically, card 1142a may have been added to timeline 1144B three years ago from the present time or present/on-going time period, card 1142b may have been added to timeline 1144B one minute ago from the present time, and card 1142c may relate to an event that is scheduled to occur in one year from the present time. However, bundle card 1142c may make groups of cards accessible without scrolling through timeline 1144B. Thus, upon selecting a card with a bundle card indicator 1142d on card 1142c, cards 1142a, 1142b, and 1142c may be provided through multi-card content 1144A displayed on the HMD.

In some embodiments, bundle cards may be related to dedicated timelines. As illustrated by timeline 1144C, bundle card 1142e with bundle card indicator 1142f may be one of many bundle cards provided by timeline 1144C. In some embodiments, bundle card 1142e may provide some or all of the same information as bundle card 1142c. Thus, by selecting bundle card 1142e, cards 1142a, 1142b, and 1142c may be provided through multi-card content 1144D. Bundle cards 1142c and 1142e may consolidate cards on timelines. In some instances, timeline 1144C may be displayed on smaller graphic displays such as HMDs, whereas timeline 1144B may be displayed on larger graphic displays, such as computer monitors.

Figure 11F:
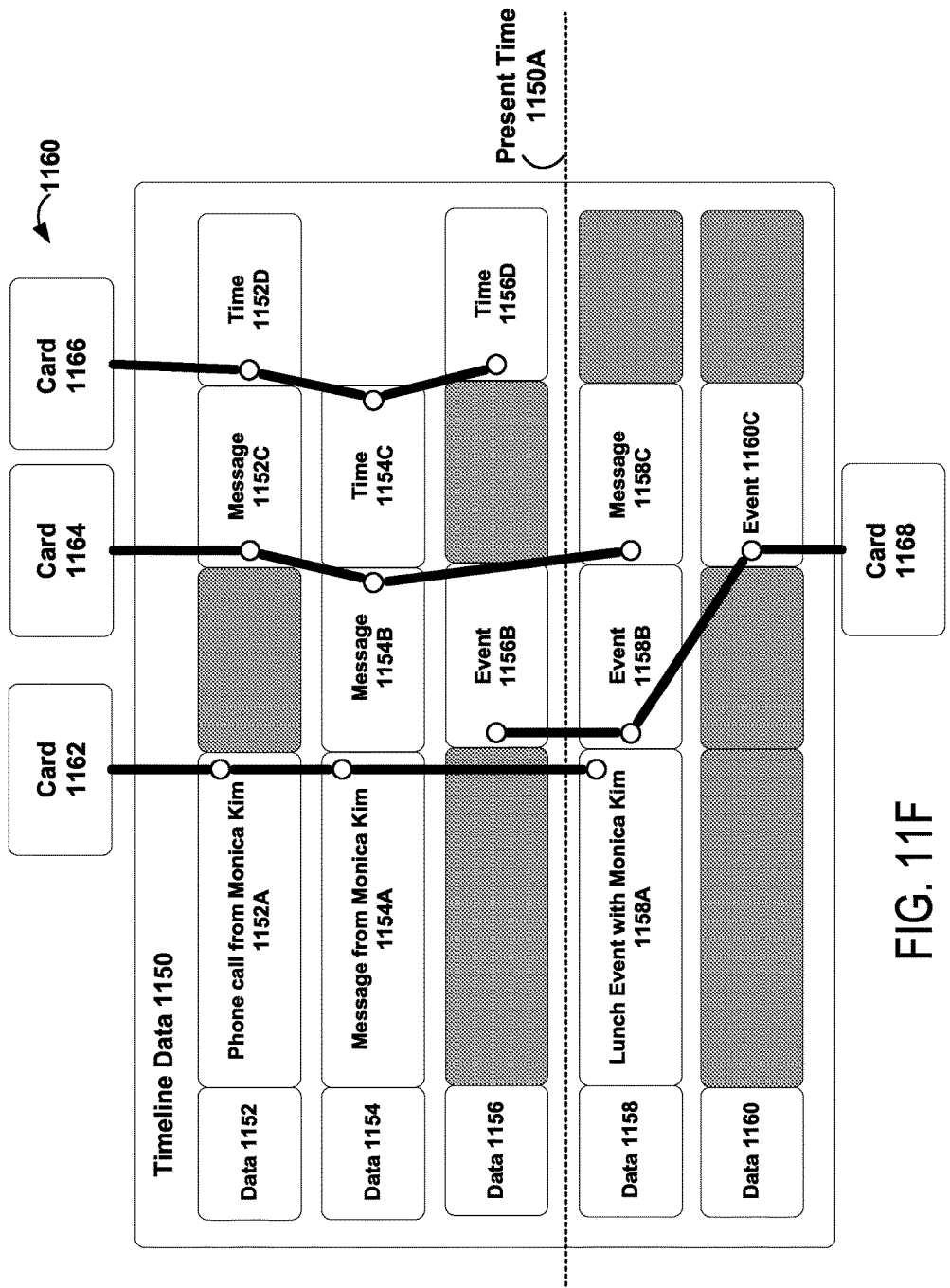
FIG. 11F shows a scenario of timeline data, according to an example embodiment.

In some embodiments, groups of cards may be managed by data records. FIG. 11F shows a scenario of timeline data, according to an example embodiment. For example, scenario 1160 illustrates data records 1152, 1154, 1156, 1158, and 1160, accessible as part of timeline data 1150. It should be noted that each of the data records 1152, 1154, 1156, 1158, and 1160 may provide data for and correspond to a single card on a timeline. For example, data records 1152, 1154, 1156, and 1158 may provide data for cards 1142a, 1142b, 1142c, and 1142e illustrated in FIG. 11E, respectively. Further, timeline data 1150 may include data for displaying timeline 1144B on a graphic display. As such, each data record may correspond to a time when the data record was added to timeline data 1150. In the example shown in FIG. 11F, data record 1152 may have been created before data records 1152-1160, data record 1154 may have been created after data record 1152 but before data record 1156, data record 1156 may have been created after data record 1154 but before data record 1158, and so on. Further, as shown in FIG. 11F, present time line 1150A may illustrate the present time and data records 1158 and 1160 may include events associated with a future time period after the present time associated with present time line 1150A.

In some instances, data records may be linked to other data records. For example, data record 1152 may be linked to data records 1152A, 1152C, and 1152D. Further, data record 1154 may be linked to data records 1154A, 1154B, and 1154C. Yet further, data record 1156 may be linked to data records 1156B and 1156D. Yet further, data record 1158 may be linked to data records 1158A, 1158B, and 1158C. In addition, data record 1160 may be linked to data record 1160C.

In some instances, data records may provide a content type of its respective card. For example, data record 1152 may provide content corresponding to a "Phone call from Monica Kim," as illustrated in data record 1152A. Further, data record 1152 may be linked with content types of a message and a time as illustrated by data records 1152C and 1152D, respectively.

In some instances, data provided by data records may be bundled by content type. For example, the data provided by data records 1152, 1154, and 1158 may be bundled into bundle card 1162 since these data records all relate to a single contact, "Monica Kim." Further, the data provided by data records 1152C, 1154B, and 1158C may be bundled into bundle card 1164 since these data records all include messages. Yet further, the data provided by data records 1152D, 1154C, and 1156D may be bundled into bundle card 1166 since these data records are associated with a specific time. In addition, the content in data records 1156B, 1158B, and 1160C may be bundled into bundle card 1168 since they all are associated with an event.

It should be noted that a single card may be bundled into more than one bundle card. As noted, a single data record in timeline data 1150 may represent a card on a timeline. Further, as illustrated in FIG. 11F, data provided by a single data record may be grouped to multiple bundle cards. For example, data provided from data record 1152 may be copied and bundled into bundle cards 1162, 1164, and 1166. Therefore, data for a single card may be grouped and bundled in to multiple bundle cards.

Figure 12A:
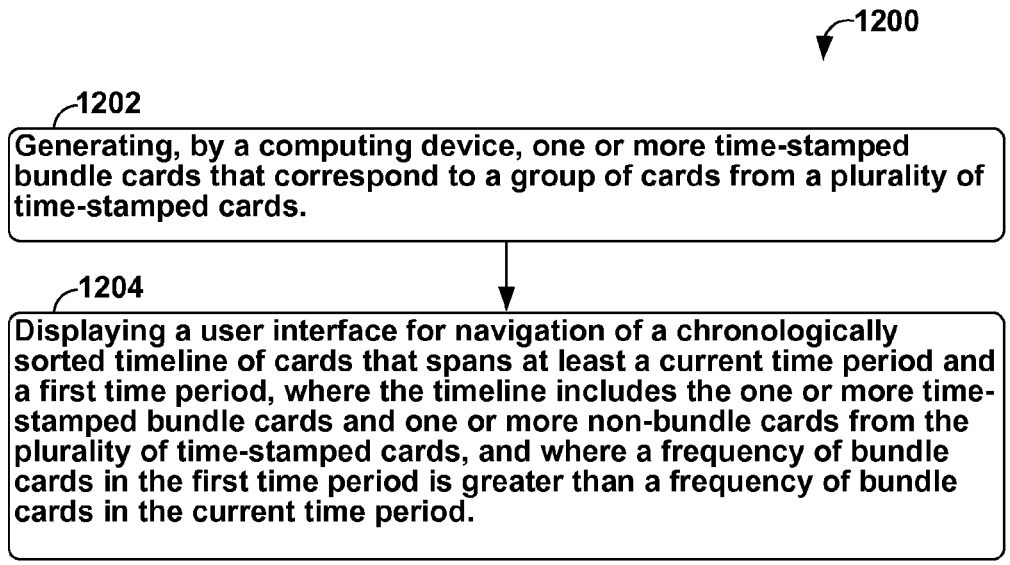
FIG. 12A is a flow chart illustrating a method, according to an example embodiment for grouping cards.

FIG. 12A is a flow chart illustrating a method, according to an example embodiment for grouping cards. In FIG. 12A, method 1200 is described by way of example as being carried out by a computing device, such as a wearable computer, and possibly a wearable computer that includes an HMD. However, it should be understood that example methods, such as method 1200, can be carried out by a wearable computer without wearing a computing device. For example, such methods may be carried out by simply holding the wearable computer in the wearer's hands or placing the wearable computer on a platform such as a desk or a table.

Further, example methods, such as method 1200, can be carried out by devices other than a wearable computer, and/or can be carried out by sub-systems in a wearable computer or in other devices. For example, an example method can be carried out by a device such as a mobile phone, which is programmed to simultaneously display a graphic object in a graphic display and also provide a point-of-view video feed in a physical-world window.

As shown in FIG. 12A, method 1200 begins at block 1202, where a computing device such as an HMD may generate one or more time-stamped bundle cards. In some instances, the one or more time-stamped bundle cards may correspond to a group of cards from a plurality of time-stamped cards.

At block 1204, the computing device may display a user interface for navigation of a chronologically sorted timeline of cards. In some instances, the timeline of cards may span at least a current time period and a first time period, where the timeline includes one or more time-stamped bundle cards and one or more non-bundle cards from the plurality of time-stamped cards. In some instances, a frequency of bundle cards in the first time period may be greater than a frequency of bundle cards in the current time period.

In some embodiments, method 1200 may be carried out by a computing device that is configured as a head-mountable device (HMD). In some embodiments, the first time period from method 1200 may be one of a plurality of time periods. In some instances, the plurality of time periods may include at least one of the following: a) a time period at least one year prior to the present/on-going time period, b) a time period at least one month prior to the present/on-going time period, c) a time period at least one week prior to the present/on-going time period, d) a time period at least one day prior to the present/on-going time period, e) a time period at least one hour after the present/on-going time period, f) a time period at least two hours after the present/on-going time period, g) a time period at least one day after the present/on-going time period, and h) a time period at least two days after the present/on-going time period.

Figure 12B:
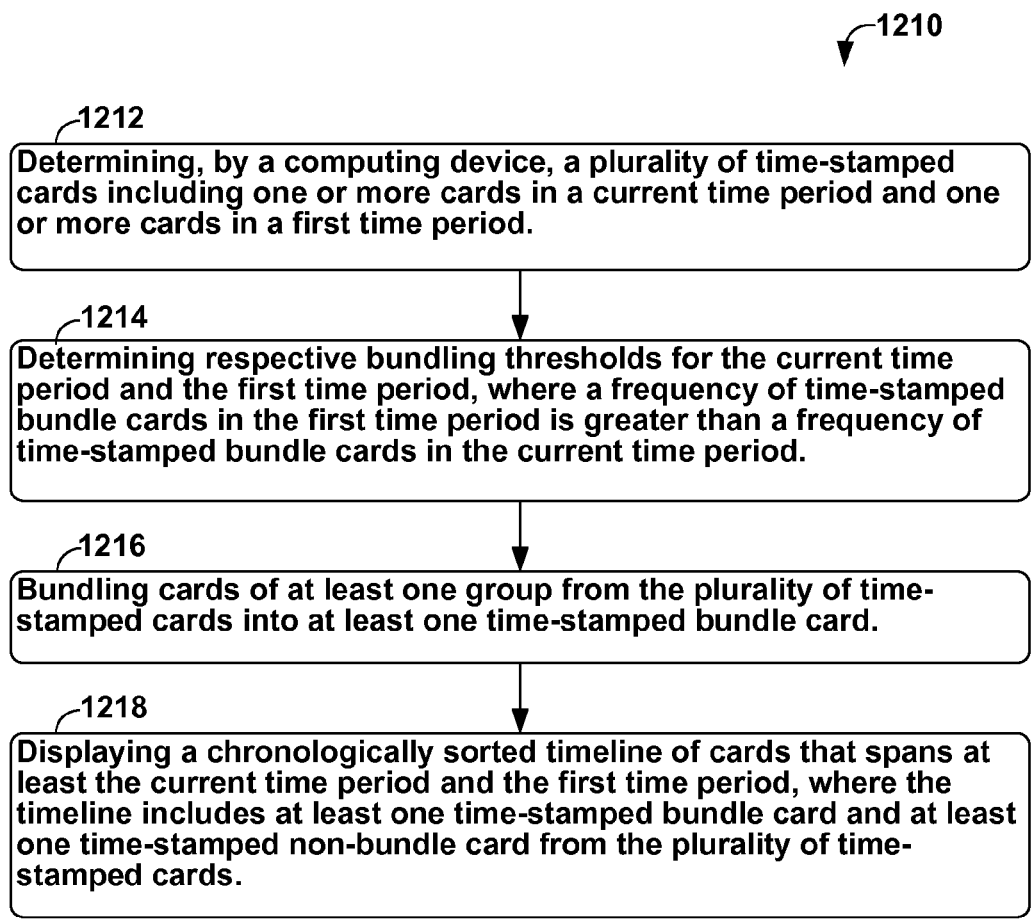
FIG. 12B is a flow chart illustrating another method, according to an example embodiment for grouping cards.

FIG. 12B is a flow chart illustrating another method, according to an example embodiment for grouping cards. In FIG. 12B, method 1210 is described by way of example as being carried out by a computing device, such as a wearable computer, and possibly a wearable computer that includes an HMD, but other techniques and/or device can be used to carry out method 1210, such as those discussed above in the context of method 1200.

In some embodiments, method 1210 may be performed in relation to method 1200 of FIG. 12A. In some instances, steps of method 1210 may be combined with that of method 1200. Further, in some instances, after a computing device performs one or more steps of the method 1200, the computing device may then perform one or more steps illustrated by method 1210.

As shown in FIG. 12B, method 1210 begins at block 1212, where a computing device such as an HMD may determine a plurality of time-stamped cards including one or more cards in a current time period and one or more cards in a first time period.

At block 1214, the computing device may determine respective bundling thresholds for the current time period and the first time period. Further, in some instances, a frequency of time-stamped bundle cards in the first time period may be greater than a frequency of time-stamped bundle cards in the current time period.

At block 1216, the computing device may bundle cards of at least one group from the plurality of time-stamped cards into at least one time-stamped bundle card.

At block 1218, the computing device may display a chronologically sorted timeline of cards that spans at least the current time period and the first time period. In some instances, the timeline may include at least one time-stamped bundle card and at least one time-stamped non-bundle card from the plurality of time-stamped cards.

F. EXAMPLE VISUAL STACK

FIG. 13A shows that three items are in visual stack 1300 between viewport 1310 and main timeline 1330: submenu 1320, contextual menu 1322, and overlay 1324. Submenu 1320 includes three images: an image of "Jane Smith," an image of "Another Person," and an image associated with "Friends," with the image of "Another Person" inside the rectangular tube. Contextual menu 1322 includes two options: a "Share" option and a "Delete" option, with the "Share" inside the rectangular tube. Thus, visual stack 1300 shows contextual menu 1322 for a photo bundle card shown on main timeline 1330 with a "Share" option selected from the contextual menu 1322, and a sharing destination of "Another Person" selected from submenu 1320.

Figure 13B:
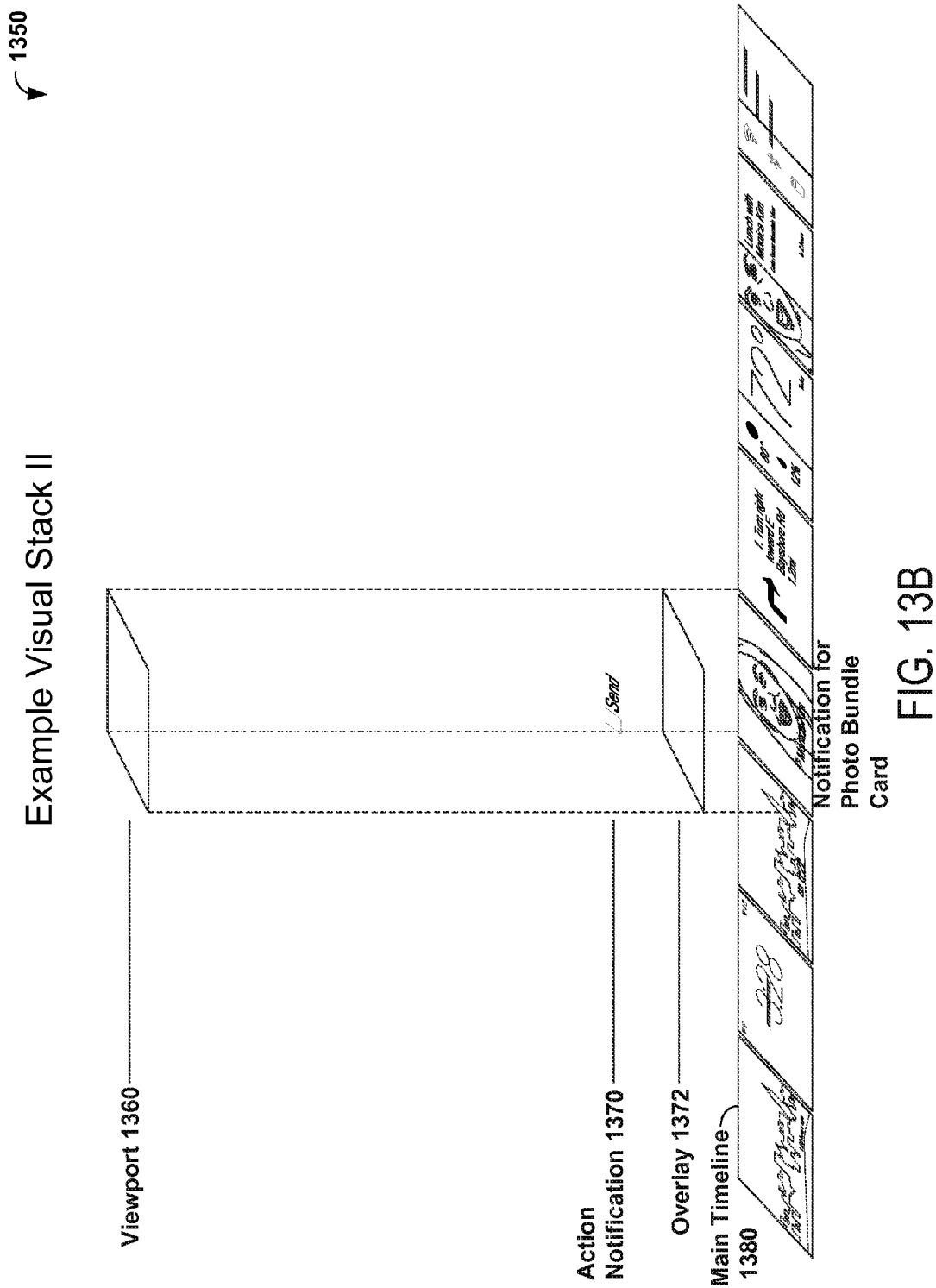
FIG. 13B shows another example visual stack, according to an example embodiment.

FIG. 13B shows example visual stack 1350, according to an example embodiment. From the wearer's perspective, visual stack 1350 is the collection of images viewed looking down viewport 1360 via a rectangular tube shown with dashed lines in FIG. 13A, to main timeline 1380. FIG. 13B shows two items are in visual stack 1350 between viewport 1360 and main timeline 1380: action notification 1370 and overlay 1372. Action notification 1370 shows a "Send" notification. Thus, visual stack 1300 shows a "Send" notification for a photo bundle card shown on main timeline 1380.

In some embodiments, overlay 1372 is completely opaque with respect to main timeline 1380. In these embodiments, the wearer viewing visual stack 1350 sees action notification 1370 and overlay 1372. In other embodiments, overlay 1372 is partially or completely transparent or translucent with respect to main timeline 1380. In these embodiments, the wearer viewing visual stack 1350 sees action notification 1370 and overlay 1372 with some portion(s) of the photo bundle card shown on main timeline 1380 visible, depending on the visibility of an image on main timeline 1380 through overlay 1372.

G. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method, comprising:
   generating, by a computing device comprising a processor, one or more time-stamped bundle cards that correspond to a group of cards from a plurality of time-stamped cards; and
   displaying, by the computing device, a user interface for navigation of a timeline of cards sorted based on time and content type, wherein the timeline spans at least a current time period and a first time period, wherein the timeline comprises the one or more time-stamped bundle cards and one or more non-bundle cards from the plurality of time-stamped cards, and wherein generating the one or more time-stamped bundle cards comprises:
      determining whether a number of cards of a first content type in the first time period is greater than a first threshold number;
      when the number of cards of the first content type in the first time period is greater than the first threshold number, generating a single bundle card for all cards of the first content type in the first time period;
      determining whether a number of cards of the first content type in the current time period is greater than a second threshold number, wherein the second threshold number is different than the first threshold number; and
      when the number of cards of the first content type in the current time period is greater than the second threshold number, generating a single bundle card for all cards of the first content type in the current time period.

2. The computer-implemented method of claim 1, wherein the computing device is a head-mountable device (HMD).

3. The computer-implemented method of claim 1, wherein the first time period is one of a plurality of time periods, and wherein the plurality of time periods includes a future time period and a past time period.

4. The computer-implemented method of claim 1, wherein the first time period is of a greater duration than the current time period.

5. The computer-implemented method of claim 1, wherein the first time period includes at least one of the following: a) a time period at least one year prior to the current time period, b) a time period at least one month prior to the current time period, c) a time period at least one week prior to the current time period, d) a time period at least one day prior to the current time period, e) a time period at least one hour after the current time period, f) a time period at least two hours after the current time period, g) a time period at least one day after the current time period, and h) a time period at least two days after the current time period.

6. The computer-implemented method of claim 1, wherein the timeline of cards spans three or more time periods, including the current time period and the first time period.

7. A computing device, comprising:
   a processor; and
   a non-transitory computer-readable medium configured to store program instructions that, when executed by the processor, cause the computing device to carry out functions comprising:

generating one or more time-stamped bundle cards that correspond to a group of cards from a plurality of time-stamped cards; and displaying a user interface for navigation of a timeline of cards sorted based on time and content type, wherein the timeline spans at least a current time period and a first time period, wherein the timeline comprises the one or more time-stamped bundle cards and one or more non-bundle cards from the plurality of time-stamped cards, and wherein generating the one or more time-stamped bundle cards comprises:

determining whether a number of cards of a first content type in the first time period is greater than a first threshold number;

when the number of cards of the first content type in the first time period is greater than the first threshold number, generating a single bundle card for all cards of the first content type in the first time period;

determining whether a number of cards of the first content type in the current time period is greater than a second threshold number, wherein the second threshold number is different than the first threshold number; and when the number of cards of the first content type in the current time period is greater than the second threshold number, generating a single bundle card for all cards of the first content type in the current time period.

8. The computing device of claim 7, wherein the computing device is a head-mountable device (HMD).

9. The computing device of claim 7, wherein the first time period is of a greater duration than the current time period.

10. A non-transitory computer-readable medium including program instructions that, when executed by a processor of a computing device, cause the computing device to carry out functions comprising:

generating, by the computing device, one or more time-stamped bundle cards that correspond to a group of cards from a plurality of time-stamped cards; and displaying a user interface for navigation of a timeline of cards sorted based on time and content type, wherein the timeline spans at least a current time period and a first time period, wherein the timeline comprises the one or more time-stamped bundle cards and one or more non-bundle cards from the plurality of time-stamped cards, and wherein generating the one or more time-stamped bundle cards comprises:

determining whether a number of cards of a first content type in the first time period is greater than a first threshold number;

when the number of cards of the first content type in the first time period is greater than the first threshold number, generating a single bundle card for all cards of the first content type in the first time period;

determining whether a number of cards of the first content type in the current time period is greater than a second threshold number, wherein the second threshold number is different than the first threshold number; and when the number of cards of the first content type in the current time period is greater than the second threshold number, generating a single bundle card for all cards of the first content type in the current time period.

11. The non-transitory computer-readable medium of claim 10, wherein the first time period is one of a plurality of time periods, and wherein the plurality of time periods includes a future time period and a past time period.

12. The non-transitory computer-readable medium of claim 10, wherein the first time period is of a greater duration than the current time period.

13. A computer-implemented method, comprising:

determining, by a computing device comprising a processor, a plurality of time-stamped cards comprising one or more cards in a current time period and one or more cards in a first time period;

bundling, by the computing device, cards from the plurality of time-stamped cards into at least one time-stamped bundle card, wherein bundling cards from the plurality of time-stamped cards into at least one time-stamped bundle card comprises:

determining a number of time-stamped cards of a first type in the first time period;

determining whether the number of cards of the first type in the first time period is greater than a first threshold number;

when the number of cards of the first type in the first time period is greater than the first threshold number, bundling all cards of the first type in the first time period into a bundle card in the first time period;

determining a number of time-stamped cards of the first type in the current time period;

determining whether the number of cards of the first type in the current time period is greater than a second threshold number, wherein the second threshold is different than the first threshold number; and when the number of cards of the first type in the current time period is greater than the second threshold number, bundling all cards of the first type in the current time period into a bundle card in the current time period; and displaying, by the computing device, a timeline of cards that spans at least the current time period and the first time period, wherein the timeline comprises the at least one time-stamped bundle card and at least one time-stamped non-bundle card from the plurality of time-stamped cards.

14. The computer-implemented method of claim 13, wherein the computing device is a head-mountable device (HMD).

15. The computer-implemented method of claim 13, wherein the first time period is one of a plurality of time periods, and wherein the plurality of time periods includes a future time period and a past time period.

16. The computer-implemented method of claim 13, wherein the first time period is of a greater duration than the current time period.

17. The computer-implemented method of claim 13, wherein the first time period includes at least one of the following: a) a time period at least one year prior to the current time period, b) a time period at least one month prior to the current time period, c) a time period at least one week prior to the current time period, d) a time period at least one day prior to the current time period, e) a time period at least one hour after the current time period, f) a time period at least two hours after the current time period, g) a time period at least one day after the current time period, and h) a time period at least two days after the current time period.

18. The computer-implemented method of claim 13, wherein the timeline of cards spans three or more time periods, including the current time period and the first time period.

19. A non-transitory computer-readable medium including program instructions that, when executed by a processor of a computing device, cause the computing device to carry out functions comprising:
- determining a plurality of time-stamped cards comprising one or more cards in a current time period and one or more cards in a first time period;
- bundling cards from the plurality of time-stamped cards into at least one time-stamped bundle card, wherein bundling cards from the plurality of time-stamped cards into at least one time-stamped bundle card comprises:
  - determining a number of time-stamped cards of a first type in the first time period;
  - determining whether the number of cards of the first type in the first time period is greater than a first threshold number;
  - when the number of cards of the first type in the first time period is greater than the first threshold number, bundling all cards of the first type in the first time period into a bundle card in the first time period;
  - determining a number of time-stamped cards of the first type in the current time period;
  - determining whether the number of cards of the first type in the current time period is greater than a second threshold number, wherein the second threshold is different than the first threshold number; and
  - when the number of cards of the first type in the current time period is greater than the second threshold number, bundling all cards of the first type in the current time period into a bundle card in the current time period; and
- displaying a timeline of cards that spans at least the current time period and the first time period, wherein the timeline comprises the at least one time-stamped bundle card and at least one time-stamped non-bundle card from the plurality of time-stamped cards.

20. The non-transitory computer-readable medium of claim 19, wherein the first time period is one of a plurality of time periods, and wherein the plurality of time periods includes a future time period and a past time period.

21. The non-transitory computer-readable medium of claim 19, wherein the first time period is of a greater duration than the current time period.

* * * * *